US006219665B1

(12) United States Patent
Shiomi

(10) Patent No.: US 6,219,665 B1
(45) Date of Patent: Apr. 17, 2001

(54) RETRIEVAL MENU CREATION DEVICE, A RETRIEVAL MENU CREATION METHOD, AND A RECORDING MEDIUM THAT STORES A RETRIEVAL MENU CREATION PROGRAM

(75) Inventor: Takakazu Shiomi, Hirakata (JP)

(73) Assignee: Matsushita Electric Industrial Co., Ltd., Osaka-fu (JP)

( * ) Notice: Subject to any disclaimer, the term of this patent is extended or adjusted under 35 U.S.C. 154(b) by 0 days.

(21) Appl. No.: 09/092,172

(22) Filed: Jun. 5, 1998

(30) Foreign Application Priority Data

Jun. 6, 1997 (JP) .................................................. 9-149570

(51) Int. Cl.[7] .................................................... G06F 17/30
(52) U.S. Cl. ................................... 707/6; 707/1; 707/100
(58) Field of Search ..................... 707/6, 2, 100, 707/45, 1, 102; 345/352, 354, 146

(56) References Cited

U.S. PATENT DOCUMENTS

| | | |
|---|---|---|
| 5,517,407 | 5/1996 | Weiner . |
| 5,519,865 * | 5/1996 | Kondo et al. ............................ 707/1 |
| 5,551,049 | 8/1996 | Kaplan et al. . |
| 5,555,403 | 9/1996 | Cambot et al. . |
| 5,604,892 | 2/1997 | Nuttall et al. . |
| 5,630,125 | 5/1997 | Zellweger . |
| 5,708,806 | 1/1998 | DeRose et al. . |
| 5,809,499 * | 9/1998 | Wong et al. ............................. 707/6 |
| 6,009,439 * | 12/1999 | Shiomi et al. ........................ 707/104 |

FOREIGN PATENT DOCUMENTS

| | | |
|---|---|---|
| 601759 | 6/1994 | (EP) . |
| 631245 | 12/1994 | (EP) . |
| 704810 | 4/1996 | (EP) . |
| 676004 | 4/1994 | (JP) . |
| 778186 | 3/1995 | (JP) . |
| 9149570 | 6/1997 | (JP) . |

OTHER PUBLICATIONS

"Categorizing Incoming Mail," by Anonymous, IBM Technical Bulletin, Aug. 1992, vol. 32, No. 3.

"Simplification of a Database Query Through the Use of a Category Window,"vol. 33, No. 3B, Aug. 1, 1990.

"Evolving Agents for Personalized Information Filtering," by B. Sheth et al., Proceedings of the Ninth Conference on Artifical Intelligence for Applications, Mar. 1–5, 1993.

"An Interface for Navigating Clustered Document Sets Returned by Queries," by R. Allen et al., COOC'S, 11/93/ CA, USA.

"Recent Trends in Hierarchic Document Clustering: A Critical Review, "by P. Willett, Information Processing & Management, vol. 24, No. 5, pp. 577–597, 1988.

"Comparsion of Hierarchic Agglomerative Clustering Methods for Document Retrieval,", by A. El–Hamdouchi et al., The Computer Journal, vol. 32, No. 3, 1989.

"A Method of Clustering Documents Using Classification," by T. Shiomi, Journal of the Information Processing Society, Jan. 19, 1998.

* cited by examiner

*Primary Examiner*—John Breene
*Assistant Examiner*—Greta L. Robinson
(74) *Attorney, Agent, or Firm*—Price and Gess

(57) ABSTRACT

Data storage unit 101 stores input data. Data feature extraction unit 102 extracts features from the input data, and writes the features in data storage unit 101. Categorization pattern storage unit 103 stores categorization pattern information 700. Relating unit 105 relates the input data to items included in the categorization patterns using the features. First categorization pattern selection unit 106 selects the most suitable categorization pattern for creating a retrieval menu. Menu creation unit 107 creates the retrieval menu based on the selected categorization pattern. Display unit 108 displays the created retrieval menu.

34 Claims, 43 Drawing Sheets

Fig. 9

| | (1) | (2) | (3) |
|---|---|---|---|
| 221 | FOR SALE | FOR SALE — 281 | WANTED — 291 |
| 222 | TOKYO | OSAKA — 282 | AICHI — 292 |
| 223 | SATO | SUZUKI — 283 | TANAKA — 293 |
| 224 | 22 YEARS OLD | 29 YEARS OLD — 284 | 25 YEARS OLD — 294 |
| 225 | UNIVERSITY STUDENT | HOUSEWIFE — 285 | SALARIED WORKER — 295 |
| 226 | PC | STROLLER — 286 | TIRE CHAIN — 296 |
| 227 | 220,000 | 4,000 — 287 | 6,000 — 297 |
| 228 | COLLECTION | TWO YEARS — 288 | |
| | | USE — 289 | |

301  302  303

214  215  216

101

Fig. 10
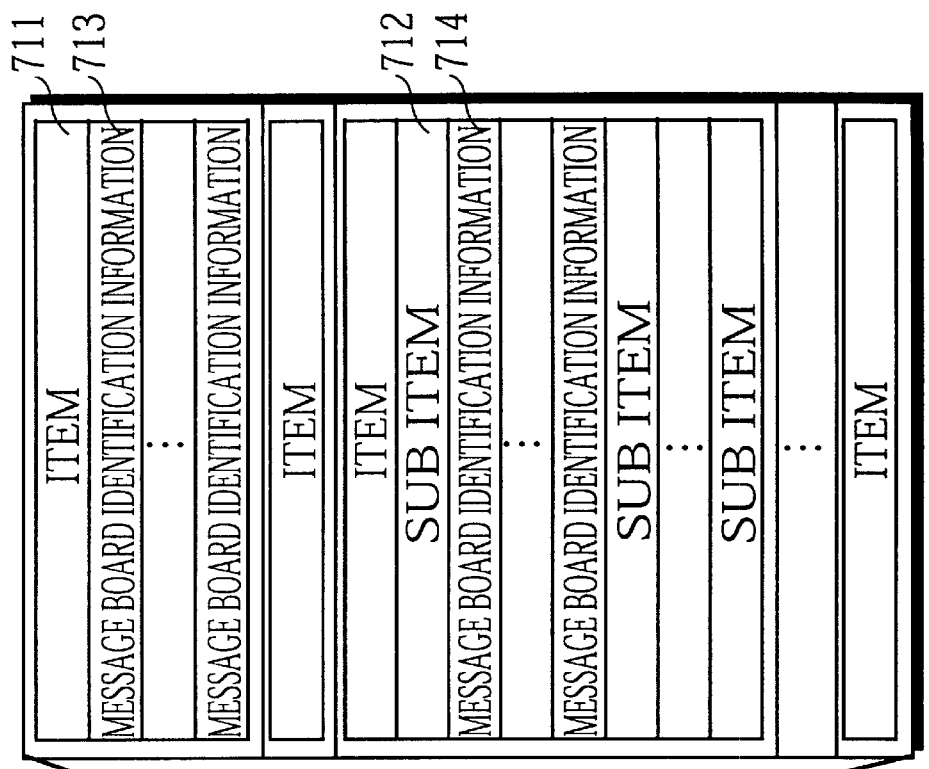
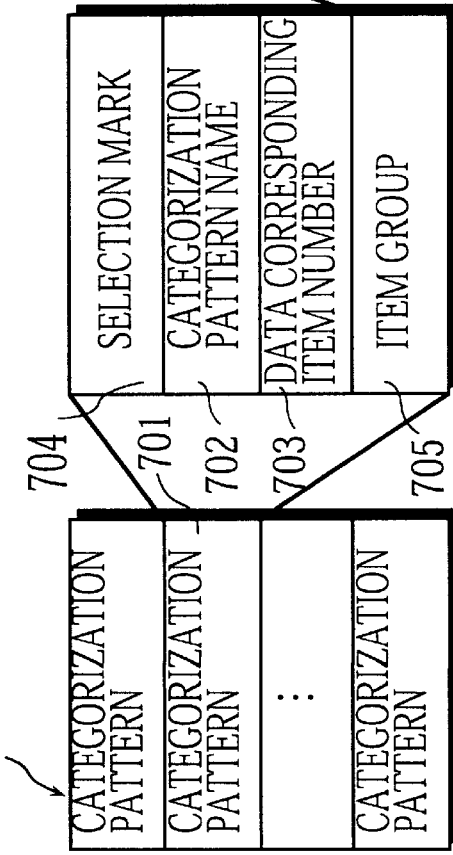

Fig. 11

400 CATEGORIZATION PATTERN INFORMATION

| | | |
|---|---|---|
| AGE | ~9, 10~20, 21~29, 30~39, 40~49, 50~59, 60~ | |
| OCCUPATION | INFANT, ELEMENTARY SCHOOL CHILD, JUNIOR HIGH SCHOOL STUDENT, SENIOR HIGH SCHOOL STUDENT, UNIVERSITY STUDENT, HOUSEWIFE, SALARIED WORKER, TECHNICAL COLLEGE STUDENT, SELF-EMPLOYED WORKER, UNEMPLOYED | |
| GENDER | MALE, FEMALE | |
| LOCATION | HOKKAIDO | |
| | TOHOKU | AOMORI, IWATE, MIYAGI, AKITA, YAMAGATA, FUKUSHIMA |
| | KANTO | TOCHIGI, IBARAGI, CHIBA, GUNMA, SAITAMA, TOKYO, YAMANASHI, KANAGAWA |
| | CHUBU | NIIGATA, TOYAMA, ISHIKAWA, FUKUI, NAGANO, GIFU, SHIZUOKA, AICHI |
| | KINKI | MIE, SHIGA, KYOTO, NARA, WAKAYAMA, OSAKA, HYOGO |
| | CHUGOKU | OKAYAMA, HIROSHIMA, TOTTORI, SHIMANE, YAMAGUCHI |
| | SHIKOKU | KAGAWA, TOKUSHIMA, EHIME, KOCHI |
| | KYUSHU | FUKUOKA, SAGA, NAGASAKI, KUMAMOTO, OITA, MIYAZAKI, KAGOSHIMA, OKINAWA |
| PRICE 1 | ~10,000, 10,000~100,000, 100,000~1,000,000, 1,000,000~ | |
| PRICE 2 | ~1,000, 1,000~3,000, 3,000~5,000, 5,000~10,000, 10,000~ | |

Fig. 13

| | | |
|---|---|---|
| 511 — | AGE | 3 — 521 |
| 512 — | OCCUPATION | 4 — 522 |
| 513 — | GENDER | 5 — 523 |
| 514 — | LOCATION | 8 — 524 |
| 515 — | PRICE 1 | 2 — 525 |
| 516 — | PRICE 2 | 4 — 526 |

650 CATEGORIZATION PATTERN INFORMATION

| AGE | ~9, 10~20, 21~29, 30~39, 40~49, 50~59, 60~ | |
|---|---|---|
| OCCUPATION | INFANT,ELEMENTARY SCHOOL CHILD, JUNIOR HIGH SCHOOL STUDENT, SENIOR HIGH SCHOOL STUDENT, UNIVERSITY STUDENT,HOUSEWIFE, SALARIED WORKER, TECHNICAL COLLEGE STUDENT, SELF-EMPLOYED WORKER,UNEMPLOYED | |
| GENDER | MALE, FEMALE | |
| LOCATION | HOKKAIDO | |
| | TOHOKU | AOMORI, IWATE, MIYAGI, AKITA, YAMAGATA, FUKUSHIMA 611 |
| | KANTO | TOCHIGI, IBARAGI, CHIBA, GUNMA, SAITAMA, TOKYO(I), YAMANASHI, KANAGAWA |
| | CHUBU | NIIGATA, TOYAMA, ISHIKAWA, FUKUI, NAGANO, GIFU, SHIZUOKA, AICHI |
| | KINKI | MIE, SHIGA, KYOTO, NARA, WAKAYAMA, OSAKA, HYOGO |
| | CHUGOKU | OKAYAMA, HIROSHIMA, TOTTORI, SHIMANE, YAMAGUCHI |
| | SHIKOKU | KAGAWA, TOKUSHIMA, EHIME, KOCHI |
| | KYUSHU | FUKUOKA, SAGA, NAGASAKI, KUMAMOTO, OITA, MIYAZAKI, KAGOSHIMA, OKINAWA |
| PRICE 1 | ~10,000, 10,000~100,000, 100,000~1,000,000, 1,000,000~ | |
| PRICE 2 | ~1,000, 1,000~3,000, 3,000~5,000, 5,000~10,000, 10,000~ | |

Fig. 15

651 CATEGORIZATION PATTERN INFORMATION

| AGE | ~9, 10~20, 21~29(1), 30~39, 40~49, 50~59, 60~ | | |
|---|---|---|---|
| OCCUPATION | INFANT, ELEMENTARY SCHOOL CHILD, JUNIOR HIGH SCHOOL STUDENT, SENIOR HIGH SCHOOL STUDENT, UNIVERSITY STUDENT(1) HOUSEWIFE, SALARIED WORKER, TECHNICAL COLLEGE STUDENT, SELF-EMPLOYED WORKER, UNEMPLOYED | | |
| GENDER | MALE, FEMALE | | |
| LOCATION | HOKKAIDO | | |
| | TOHOKU | AOMORI, IWATE, MIYAGI, AKITA, YAMAGATA, FUKUSHIMA | |
| | KANTO | TOCHIGI, IBARAGI, CHIBA, GUNMA, SAITAMA, TOKYO(1), YAMANASHI, KANAGAWA | |
| | CHUBU | NIIGATA, TOYAMA, ISHIKAWA, FUKUI, NAGANO, GIFU, SHIZUOKA, AICHI | |
| | KINKI | MIE, SHIGA, KYOTO, NARA, WAKAYAMA, OSAKA, HYOGO | |
| | CHUGOKU | OKAYAMA, HIROSHIMA, TOTTORI, SHIMANE, YAMAGUCHI | |
| | SHIKOKU | KAGAWA, TOKUSHIMA, EHIME, KOCHI | |
| | KYUSHU | FUKUOKA, SAGA, NAGASAKI, KUMAMOTO, OITA, MIYAZAKI, KAGOSHIMA, OKINAWA | |
| PRICE 1 | ~10,000, 10,000~100,000, 100,000~1,000,000(1), 1,000,000~ | | |
| PRICE 2 | ~1,000, 1,000~3,000, 3,000~5,000, 5,000~10,000, 10,000~(1) | | |

Fig. 16

652 CATEGORIZATION PATTERN INFORMATION — 811

| AGE | ~9, 10~20, 21~29(1)(2)(3), 30~39, 40~49, 50~59, 60~ — 812 | |
|---|---|---|
| OCCUPATION | INFANT, ELEMENTARY SCHOOL CHILD, JUNIOR HIGH SCHOOL STUDENT, SENIOR HIGH SCHOOL STUDENT, UNIVERSITY STUDENT(1), HOUSEWIFE(2), SALARIED WORKER(3), TECHNICAL COLLEGE STUDENT, SELF-EMPLOYED WORKER, UNEMPLOYED — 813 — 814 | |
| GENDER | MALE, FEMALE | |
| LOCATION | HOKKAIDO | |
| | TOHOKU | AOMORI, IWATE, MIYAGI, AKITA, YAMAGATA, FUKUSHIMA — 815 |
| | KANTO | TOCHIGI, IBARAGI, CHIBA, GUNMA, SAITAMA, TOKYO (1), YAMANASHI, KANAGAWA |
| | CHUBU | NIIGATA, TOYAMA, ISHIKAWA, FUKUI, NAGANO, GIFU, SHIZUOKA, AICHI(3) — 816 |
| | KINKI | MIE, SHIGA, KYOTO, NARA, WAKAYAMA, OSAKA(2), HYOGO |
| | CHUGOKU | OKAYAMA, HIROSHIMA, TOTTORI, SHIMANE, YAMAGUCHI — 817 |
| | SHIKOKU | KAGAWA, TOKUSHIMA, EHIME, KOCHI |
| | KYUSHU | FUKUOKA, SAGA, NAGASAKI, KUMAMOTO, OITA, MIYAZAKI, KAGOSHIMA, OKINAWA |
| PRICE 1 | ~10,000(2)(3), 10,000~100,000, 100,000~1,000,000(1), 1,000,000~ | |
| PRICE 2 | ~1,000, 1,000~3,000, 3,000~5,000(2), 5,000~10,000(3), 10,000~(1) — 822 | |

653 CATEGORIZATION PATTERN INFORMATION

| | 1013 1012 | 1010 |
|---|---|---|
| AGE | ~9, 10~20 (4)(11)(15)(16)(17)(19)(20), 21~29 (1)(2)(3)(5)(7)(8)(9)(12)(13)(14)(18), 30~39, 40~49, 50~59, 60~ | |
| OCCUPATION | INFANT, ELEMENTARY SCHOOL CHILD(19), JUNIOR HIGH SCHOOL STUDENT(4)(17)(20), SENIOR HIGH SCHOOL STUDENT(11)(15), UNIVERSITY STUDENT(1)(5)(16), HOUSEWIFE(2)(7), SALARIED WORKER(3)(8)(9)(14), TECHNICAL COLLEGE STUDENT(13)(20), SELF-EMPLOYED WORKER(12), UNEMPLOYED(15) | |
| GENDER | MALE, FEMALE | |
| LOCATION | HOKKAIDO | |
| | TOHOKU | AOMORI, IWATE, MIYAGI, AKITA, YAMAGATA, FUKUSHIMA |
| | KANTO | TOCHIGI, IBARAGI, CHIBA(20), GUNMA(6), SAITAMA(7), TOKYO(1)(17), YAMANASHI, KANAGAWA(13)(14) |
| | CHUBU | NIIGATA, TOYAMA(15), ISHIKAWA, FUKUI(5), NAGANO, GIFU, SHIZUOKA, AICHI(3) |
| | KINKI | MIE, SHIGA, KYOTO(8), NARA(11), WAKAYAMA, OSAKA(2)(18), HYOGO(12) |
| | CHUGOKU | OKAYAMA(16), HIROSHIMA(10), TOTTORI, SHIMANE, YAMAGUCHI(4) |
| | SHIKOKU | KAGAWA(9), TOKUSHIMA, EHIME(19), KOCHI |
| | KYUSHU | FUKUOKA, SAGA, NAGASAKI, KUMAMOTO, OITA, MIYAZAKI, KAGOSHIMA, OKINAWA |
| PRICE1 | ~10,000(2)(3)(4)(5)(7)(8)(9)(10)(11)(13)(15)(16)(17)(18)(19), 10,000~100,000(6)(12)(14)(20), 100,000~1,000,000(1), 1,000,000~ | |
| PRICE2 | ~1,000(4)(13)(15), 1,000~3,000(5)(7)(8)(17), 3,000~5,000(2)(9)(16)(18), 5,000~10,000(3)(10)(11)(19), 10,000~(1)(6)(12)(14)(20) | |

654 CATEGORIZATION PATTERN INFORMATION

| | 1011 / 1013 1012 | 1010 |
|---|---|---|
| 1021 | AGE 2 | ~9, 10~20(4)(11)(15)(16)(17)(19)(20), 21~29(1)(2)(3)(5)(7)(8)(9)(12)(13)(14)(18), 30~39, 40~49, 50~59, 60~ |
| | OCCUPATION 9 | INFANT, ELEMENTARY SCHOOL CHILD(19), JUNIOR HIGH SCHOOL STUDENT(4)(17)(20), SENIOR HIGH SCHOOL STUDENT(11)(15), UNIVERSITY STUDENT(1)(5)(16), HOUSEWIFE(2)(7), SALARIED WORKER(3)(8)(9)(14), TECHNICAL COLLEGE STUDENT(13)(20), SELF-EMPLOYED WORKER(12), UNEMPLOYED(15) |
| | GENDER 0 | MALE, FEMALE |
| | LOCATION 5 | HOKKAIDO | |
| | | TOHOKU | AOMORI, IWATE, MIYAGI, AKITA, YAMAGATA, FUKUSHIMA |
| | | KANTO | TOCHIGI, IBARAGI, CHIBA(20), GUNMA(6), SAITAMA(7), TOKYO(1)(17), YAMANASHI, KANAGAWA(13)(14) |
| | | CHUBU | NIIGATA, TOYAMA(15), ISHIKAWA, FUKUI(5), NAGANO, GIFU, SHIZUOKA, AICHI(3) |
| | | KINKI | MIE, SHIGA, KYOTO(8), NARA(11), WAKAYAMA, OSAKA(2)(18), HYOGO(12) |
| | | CHUGOKU | OKAYAMA(16), HIROSHIMA(10), TOTTORI, SHIMANE, YAMAGUCHI(4) |
| | | SHIKOKU | KAGAWA(9), TOKUSHIMA, EHIME(19), KOCHI |
| | | KYUSHU | FUKUOKA, SAGA, NAGASAKI, KUMAMOTO, OITA, MIYAZAKI, KAGOSHIMA, OKINAWA |
| | PRICE1 3 | ~10,000(2)(3)(4)(5)(7)(8)(9)(10)(11)(13)(15)(16)(17)(18)(19), 10,000~100,000(6)(12)(14)(20), 100,000~1,000,000(1), 1,000,000~ |
| 1022 | PRICE2 5 | ~1,000(4)(13)(15), 1,000~3,000(5)(7)(8)(17), 3,000~5,000(2)(9)(16)(18), 5,000~10,000(3)(10)(11)(19), 10,000~(1)(6)(12)(14)(20) |

Fig. 19

1100 CATEGORIZATION PATTERN INFORMATION

| AGE 2 | ~9, 10~20 (4)(11)(15)(16)(17)(19)(20), 21~29 (1)(2)(3)(5)(7)(8)(9)(12)(13)(14)(18), 30~39, 40~49, 50~59, 60~ |
|---|---|
| OCCUPATION 9 | INFANT,ELEMENTARY SCHOOL CHILD(19), JUNIOR HIGH SCHOOL STUDENT(4)(17)(20), SENIOR HIGH SCHOOL STUDENT(11)(15), UNIVERSITY STUDENT(1)(5)(16), HOUSEWIFE(2)(7), SALARIED WORKER(3)(8)(9)(14), TECHNICAL COLLEGE STUDENT(13)(20), SELF-EMPLOYED WORKER(12), UNEMPLOYED(15) |
| GENDER 0 | MALE, FEMALE |
| LOCATION 5 | HOKKAIDO |
| | TOHOKU  AOMORI, IWATE, MIYAGI, AKITA, YAMAGATA, FUKUSHIMA |
| | KANTO  TOCHIGI, IBARAGI, CHIBA(20), GUNMA(6), SAITAMA(7), TOKYO(1)(17), YAMANASHI, KANAGAWA(13)(14) |
| | CHUBU  NIIGATA, TOYAMA(15), ISHIKAWA, FUKUI(5), NAGANO, GIFU, SHIZUOKA, AICHI(3) |
| | KINKI  MIE, SHIGA, KYOTO(8), NARA(11), WAKAYAMA, OSAKA(2)(18), HYOGO(12) |
| | CHUGOKU  OKAYAMA(16), HIROSHIMA(10), TOTTORI, SHIMANE, YAMAGUCHI(4) |
| | SHIKOKU  KAGAWA(9), TOKUSHIMA, EHIME(19), KOCHI |
| | KYUSHU  FUKUOKA, SAGA, NAGASAKI, KUMAMOTO, OITA, MIYAZAKI, KAGOSHIMA, OKINAWA |
| PRICE1 3 | ~10,000(2)(3)(4)(5)(7)(8)(9)(10)(11)(13)(15)(16)(17)(18)(19), 10,000~100,000(6)(12)(14)(20), 100,000~1,000,000(1), 1,000,000~ |
| PRICE2 5 | ~1,000(4)(13)(15), 1,000~3,000(5)(7)(8)(17), 3,000~5,000(2)(9)(16)(18), 5,000~10,000(3)(10)(11)(19), 10,000~(1)(6)(12)(14)(20) |

Fig. 24

1600 CATEGORIZATION PATTERN INFORMATION

| AGE 2 | ~9、10~20 (4)(11)(15)(16)(17)(19)(20)、 21~29 (1)(2)(3)(5)(7)(8)(9)(12)(13)(14)(18)、 30~39、40~49、50~59、60~ | |
|---|---|---|
| OCCUPATION 9 | INFANT,ELEMENTARY SCHOOL CHILD(19)、JUNIOR HIGH SCHOOL STUDENT(4)(17)(20)、SENIOR HIGH SCHOOL STUDENT(11)(15)、UNIVERSITY STUDENT(1)(5)(16)、HOUSEWIFE(2)(7)、SALARIED WORKER(3)(8)(9)(14)、TECHNICAL COLLEGE STUDENT(13)(20)、SELF-EMPLOYED WORKER(12)、UNEMPLOYED(15) | |
| GENDER 0 | MALE, FEMALE | |
| LOCATION 5 | HOKKAIDO | |
| | TOHOKU | AOMORI, IWATE, MIYAGI, AKITA, YAMAGATA, FUKUSHIMA |
| | KANTO | TOCHIGI, IBARAGI, CHIBA(20)、GUNMA(6)、SAITAMA(7)、TOKYO(1)(17)、YAMANASHI, KANAGAWA(13)(14) |
| | CHUBU | NIIGATA, TOYAMA(15)、ISHIKAWA, FUKUI(5)、NAGANO, GIFU, SHIZUOKA, AICHI(3) |
| | KINKI | MIE, SHIGA, KYOTO(8)、NARA(11)、WAKAYAMA、OSAKA(2)(18)、HYOGO(12) |
| | CHUGOKU | OKAYAMA(16)、HIROSHIMA(10)、TOTTORI, SHIMANE, YAMAGUCHI(4) |
| | SHIKOKU | KAGAWA(9)、TOKUSHIMA, EHIME(19)、KOCHI |
| | KYUSHU | FUKUOKA, SAGA, NAGASAKI, KUMAMOTO, OITA, MIYAZAKI, KAGOSHIMA, OKINAWA |
| PRICE1 3 | ~10,000(2)(3)(4)(5)(7)(8)(9)(10)(11)(13)(15)(16)(17)(18)(19)、10,000~100,000(6)(12)(14)(20)、100,000~1,000,000(1)、1,000,000~ | |
| PRICE2 5 | ~1,000(4)(13)(15)、1,000~3,000(5)(7)(8)(17)、3,000~5,000(2)(9)(16)(18)、5,000~10,000(3)(10)(11)(19)、10,000~(1)(6)(12)(14)(20) | |

1601 (pointing to LOCATION row)

Fig. 25

1620 CATEGORIZATION PATTERN INFORMATION

| AGE 7 | ~9, 10~20 (4)(11)(15)(16)(17)(19)(20), 21~29 (1)(2)(3)(5)(7)(8)(9)(12)(13)(14)(18), 30~39, 40~49, 50~59, 60~ | |
|---|---|---|
| OCCUPATION 9 | INFANT,ELEMENTARY SCHOOL CHILD(19), JUNIOR HIGH SCHOOL STUDENT(4)(17)(20), SENIOR HIGH SCHOOL STUDENT(11)(15), UNIVERSITY STUDENT(1)(5)(16), HOUSEWIFE(2)(7), SALARIED WORKER(3)(8)(9)(14), TECHNICAL COLLEGE STUDENT(13)(20), SELF-EMPLOYED WORKER(12), UNEMPLOYED(15) | |
| GENDER 0 | MALE, FEMALE | |
| LOCATION 5 | HOKKAIDO | |
| | TOHOKU | AOMORI, IWATE, MIYAGI, AKITA, YAMAGATA, FUKUSHIMA |
| | KANTO | TOCHIGI, IBARAGI, CHIBA(20), GUNMA(6), SAITAMA(7), TOKYO(1)(17), YAMANASHI, KANAGAWA(13)(14) |
| | CHUBU | NIIGATA, TOYAMA(15), ISHIKAWA, FUKUI(5), NAGANO, GIFU, SHIZUOKA, AICHI(3) |
| | KINKI | MIE, SHIGA, KYOTO(8), NARA(11), WAKAYAMA, OSAKA(2)(18), HYOGO(12) |
| | CHUGOKU | OKAYAMA(16), HIROSHIMA(10), TOTTORI, SHIMANE, YAMAGUCHI(4) |
| | SHIKOKU | KAGAWA(9), TOKUSHIMA, EHIME(19), KOCHI |
| | KYUSHU | FUKUOKA, SAGA, NAGASAKI, KUMAMOTO, OITA, MIYAZAKI, KAGOSHIMA, OKINAWA |
| PRICE1 3 | ~10,000(2)(3)(4)(5)(7)(8)(9)(10)(11)(13)(15)(16)(17)(18)(19), 10,000~100,000(6)(12)(14)(20), 100,000~1,000,000(1), 1,000,000~ | |
| PRICE2 5 (1611) | ~1,000(4)(13)(15), 1,000~3,000(5)(7)(8)(17), 3,000~5,000(2)(9)(16)(18), 5,000~10,000(3)(10)(11)(19), 10,000~(1)(6)(12)(14)(20) — 1612 | |

1601 → LOCATION 5
1602 → PRICE2

Fig. 30

THE/WEATHER/OF/THE/KEIHANSHIN/AREA

●/TODAY'S/WEATHER/

OSAKA/ : /FINE/

KYOTO/ : /FINE/

KOBE/ : /FINE/

●/TOMORROW'S/WEATHER/

OSAKA/ : /CLOUDY/

KYOTO/ : /FINE/

KOBE/ : /FINE/

Fig. 31

| WORD | FREQUENCY IN USE |
|---|---|
| FINE | 5 |
| WEATHER | 3 |
| OSAKA | 2 |
| KYOTO | 2 |
| KOBE | 2 |
| KEIHANSHIN | 1 |
| AREA | 1 |
| TODAY'S | 1 |
| TOMORROW'S | 1 |
| CLOUDY | 1 |

Fig. 35

| | | | |
|---|---|---|---|
| 2603 | (3) | ECONOMY | |
| 2602 | (2) | POLITICS | |
| 2601 | (1) | EIGHT REGIONS OF JAPAN | 2611 2641 2642 2643 2644 2645 2646 2647 |
| 2612 | | | |
| 2621 | | HOKKAIDO | HOKKAIDO, SAPPORO, ASAHIKAWA, HAKODATE, KUSHIRO, OTARU, TOMAKOMAI, ··· — 2631 |
| 2622 | | TOHOKU | TOHOKU, AOMORI, IWATE, MIYAGI, AKITA, YAMAGATA, ··· — 2632 |
| 2623 | | KANTO | KANTO, SAITAMA, TOKYO, YAMANASHI, KANAGAWA, YOKOHAMA, ··· — 2633 |
| 2624 | | CHUBU | NIIGATA, TOYAMA, ISHIKAWA, FUKUI, NAGANO, GIFU, ··· — 2634 |
| 2625 | | KINKI | KYOTO, NARA, WAKAYAMA, OSAKA, HYOGO, KOBE, ··· — 2635 |
| 2626 | | CHUGOKU | OKAYAMA, HIROSHIMA, TOTTORI, SHIMANE, YAMAGUCHI, MATSUE, ··· — 2636 |
| 2627 | | SHIKOKU | SHIKOKU, KAGAWA, TOKUSHIMA, EHIME, KOCHI, TAKAMATSU, ··· — 2637 |
| 2628 | | KYUSHU | KYUSHU, FUKUOKA, SAGA, NAGASAKI, KUMAMOTO, OITA, ··· — 2638 |

| IMPORTANT WORD | (CORRESPONDING CATEGORIZATION NUMBER)-(CATEGORIZATION NAME) | | |
|---|---|---|---|
| FINE | | | |
| WEATHER | (14) – (6) | | |
| OSAKA | (1) – (5) | | |
| | (12) – (2) | | |
| KYOTO | (1) – (5) | | |
| KOBE | (1) – (5) | | |

Fig. 37

| | |
|---|---|
| (14) – (6) | 2861 |
| (1) – (5) | 2862 |
| (12) – (2) | 2863 |

Fig. 38

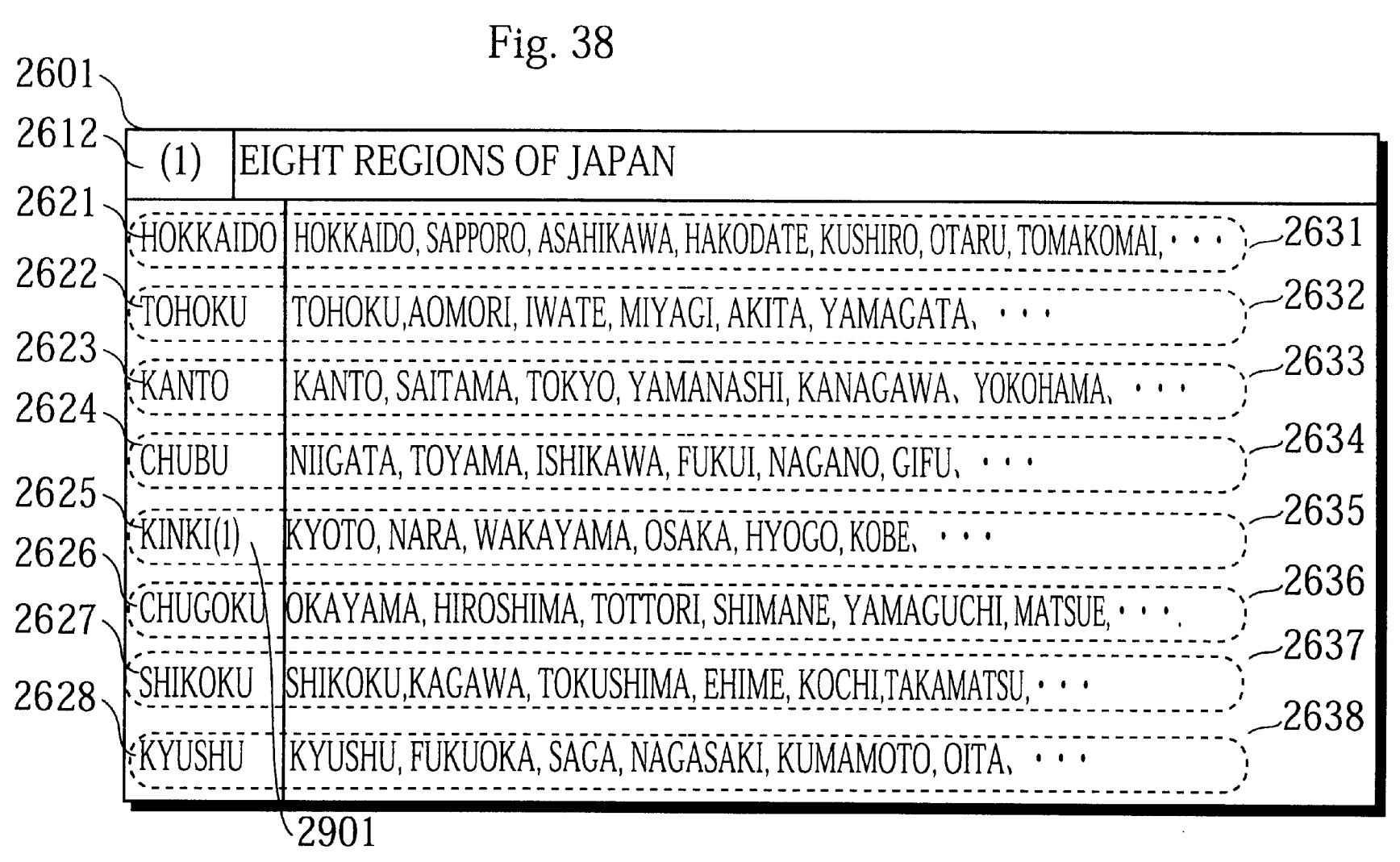

| (1) | EIGHT REGIONS OF JAPAN | |
|---|---|---|
| HOKKAIDO | HOKKAIDO, SAPPORO, ASAHIKAWA, HAKODATE, KUSHIRO, OTARU, TOMAKOMAI,··· | 2631 |
| TOHOKU | TOHOKU,AOMORI, IWATE, MIYAGI, AKITA, YAMAGATA,··· | 2632 |
| KANTO | KANTO, SAITAMA, TOKYO, YAMANASHI, KANAGAWA, YOKOHAMA,··· | 2633 |
| CHUBU | NIIGATA, TOYAMA, ISHIKAWA, FUKUI, NAGANO, GIFU,··· | 2634 |
| KINKI(1) | KYOTO, NARA, WAKAYAMA, OSAKA, HYOGO, KOBE,··· | 2635 |
| CHUGOKU | OKAYAMA, HIROSHIMA, TOTTORI, SHIMANE, YAMAGUCHI, MATSUE,··· | 2636 |
| SHIKOKU | SHIKOKU,KAGAWA, TOKUSHIMA, EHIME, KOCHI,TAKAMATSU,··· | 2637 |
| KYUSHU | KYUSHU, FUKUOKA, SAGA, NAGASAKI, KUMAMOTO, OITA,··· | 2638 |

(EXPRESSION"1")
$$P = \alpha \cdot n + \beta \cdot f(m) + \gamma \cdot \frac{1}{1+\sigma^2}$$

EIGHT REGIONS OF JAPAN
TOHOKU : 1 PIECE OF DATA
KANTO : 2 PIECES OF DATA
CHUBU : 3 PIECES OF DATA
KINKI : 5 PIECES OF DATA
CHUGOKU : 2 PIECES OF DATA
SHIKOKU : 1 PIECE OF DATA

RETRIEVAL MENU CREATION DEVICE, A RETRIEVAL MENU CREATION METHOD, AND A RECORDING MEDIUM THAT STORES A RETRIEVAL MENU CREATION PROGRAM

BACKGROUND OF THE INVENTION (1) Field of the Invention

The present invention relates to a retrieval menu creation device that creates retrieval menus from data according to the contents of the data, a retrieval menu creation method, and a recording medium that stores a retrieval menu creation program.

(2) Description of the Related Art

A large amount of data is now available to ordinary users via networks, for instance, the Internet. "A Method of Clustering Documents Using Classification Patterns" (Information Processing Society of Japan SIG Notes, 97-NL-117-14) introduces a menus retrieval system that creates retrieval menus according to the contents of data so that even a user who is unfamilar with the use of information technology may easily select desired information from the large amount of available data. FIG. 1 is a block diagram that shows the construction of the menu retrieval system.

The menu retrieval system shown in FIG. 1 includes data storage unit 3501, thesaurus storage unit 3502, data feature extraction unit 3503, data relating unit 3504, menu creation unit 3503, and display unit 3506.

Data storage unit 3501 stores the document data that has been obtained via a network and the features that has been extracted by data features extraction unit 3503. FIG. 2A shows an example of the data stored in data storage unit 3501. As shown in FIG. 2A, data storage unit 3501 stores document data 3621, 3622, and 3623 that have been obtained via a network, and features 3601, 3602, and 3603 that have been extracted by data feature extraction unit 3503.

Thesaurus storage unit 3502 stores thesauruses. A thesaurus is a dictionary in which words categorized according to meaning are arranged in a tree. In a thesaurus that thesaurus storage unit 3502 stores, the word with the highest concept is arranged at the root, words with the lowest concept are arranged at the leaves, and words having similar meanings are arranged close to each other.

FIG. 2B shows thesaurus 3511, a thesaurus that thesaurus storage unit 3502 stores. In thesaurus 3511, "means of transport" 3618 is the root, and "car" 3617 and "railway" 3616 are connected to "means of transport" 3618. "Truck" 3611 and "bus" 3612 are connected to "car" 3617, and "steam train" 3613 and "electric train" 3614 are connected to "railway" 3616.

According to thesaurus 3511, "means of transport" 3618 is a higher concept than "car" 3617 and "railway" 3616, "car" 3617 is the conception higher than "truck" 3611 and "bus" 3612, and "railway" 3616 is the conception higher than "steam train" 3613 and "electric train" 3614.

Data feature extraction unit 3503 extracts features of document data that data storage unit 3501 stores. More specifically, data feature extraction unit 3503 extracts words that are often used in the document data as the features. FIG. 2A shows that data feature extraction unit 3503 extracts feature 3601 "bus" as the feature of document data 3621, feature 3602 "truck" as that of document data 3622, and feature 3603 "electric train" as that of document data 3623.

Date relating unit 3504 finds the word that correspond to the feature of document data in a thesaurus. For instance, data relating unit 3504 finds that "bus" 3612 in thesaurus 3511 corresponds to feature 3601 "bus", "truck" 3611 in thesaurus 3511 corresponds to feature 3602 "truck", and "electric train" 3614 in thesaurus 3511 corresponds to feature 3603 "electric train". Accordingly, each of the features is connected to the corresponding word in thesaurus 3511a as shown in FIG. 3.

Menu creation unit 3505 extracts each word whose corresponding feature has been found by data relating unit 3504, and the words that are connected to the words whose corresponding features have been found by data relating unit 3504 from thesaurus 3511a, and creates a menu construction. More specifically, menu creation unit 3505 extracts "truck" 3611 corresponding to feature 3602 "truck", "bus" 3612 corresponding to feature 3601 "bus", "electric train" 3614 corresponding to feature 3603 "electric train", "car" 3617 connected with "truck" 3611, "railway" 3616 connected to "electric train" 3614, and "means of transport" 3618 connected to "car" 3617 from thesaurus 3511a shown in FIG. 3, and creates menu construction 3511b shown in FIG. 4A.

Display unit 3506 displays retrieval menus based on the created menu construction. More specifically, display unit 3506 displays retrieval menu 3700 in which the title is "means of transport" and the choices are "car" 3702 and "railway" 3703 as shown in FIG. 4B based on menu construction 3511b shown in FIG. 4A. When the user selects "car" 3702, display unit 3506 displays retrieval menu 3710 in which the title is "car" 3711 and the choices are "truck" 3712 and "bus" 3713 as shown in FIG. 4C.

In the example of the conventional art that has been described, these retrieval menus using one thesaurus are created based on the data obtained via a network. Even a user who is unfamilar with the use of information technology may easily retrieve necessary information with these retrieval menus. The above-described example, however, has problems. Firstly, these retrieval menus are created using one thesaurus, so that it is not possible to retrieve data when the word used for retrieval is not included in the thesaurus in which the words are categorized according to meaning sand arranged in a tree. More specifically, while the word "road" can be considered to be related to the word "means of transport", the word "road" is not related to any word in thesaurus 3511 in which the words are arranged in terms of "means of transport".

Secondly, retrieval menus in which the choices of a retrieval menu and the choices of another retrieval menu categorize data in different terms and are not related to each other in meaning can not be created based on a thesaurus. More specifically, the choices "up to 10", "11 to 20", and "over 21" in the retrieval menu "age" and the choices "student", "salaried worker", and "housewife" in the retrieval menu "occupation" categorize data in different terms and are not related to each other in meaning. As a result, retrieval menus that include the retrieval menu "occupation" below the retrieval menu "age" may not be created based on one thesaurus.

Thirdly, when data is added to or changed in a thesaurus, it is necessary to maintain the structure of the thesaurus in which data is categorized according to meaning and arranged in a tree. The addition or the change of data in a thesaurus is very complicated.

SUMMARY OF THE INVENTION

The object of the present invention is to provide a retrieval menu creation device that creates retrieval menus by relating data to choices included in categorization patterns in which the choices in each categorization pattern categorize data in different terms and are not related to each other in meaning, and to provide a recoding medium that records a retrieval menu creation method and a retrieval menu creation program.

The above-mentioned project is achieved by a retrieval menu creation device that may create retrieval menus based on a plurality of pieces of input data and may include a data storage unit for storing the plurality of piece of input data, a categorization pattern storage unit for storing a plurality of categorization patterns each of which includes a plurality of items wherein no item that is included in a categorization pattern may be related to any item that is included in another categorization pattern, a relating unit for relating pieces of input data that are stored in the data storage unit to corresponding items, a categorization pattern selection unit for selecting categorization patterns from the plurality of categorization patterns that are stored in the categorization pattern storage unit based on a first predetermined standard, and a menu extraction unit for extracting items to which pieces of input data are related from the selected categorization patterns, and for creating a retrieval menu which includes the extracted items as choices.

The retrieval menu creation device stores a plurality of categorization patterns which each include a plurality of items. Any item included in one of the categorization patterns is related to none of the items included in another categorization pattern. The retrieval menu creation device relates input data to items included in the categorization patterns, selects a categorization pattern, and creates a retrieval menu using the selected categorization pattern. As a result, useful retrieval menu to which input data is satisfactorily related may be created.

The above-mentioned object is also achieved by the retrieval menu creation device wherein the categorization pattern selection unit may include an item number count unit for counting a number of items related to input data for each of the plurality of categorization patterns, and an item number selection unit for selecting categorization patterns in which the number of items related to input data is close to a second predetermined number.

The retrieval menu creation device counts the number of items to which input data is related, for each of the categorization patterns, and selects a categorization pattern based on the counted numbers. As a result, when creating retrieval menus, the retrieval menu creation device may select the categorization pattern which has the counted number that is closest to the most suitable value with the highest priority and create a retrieval menu using the selected categorization pattern. Retrieval menus that are effectively used may be created.

The above-mentioned object is also achieved by the retrieval menu creation device wherein the categorization pattern selection unit may include a priority ranking unit for storing a priority ranking for each of the plurality of categorization patterns, and a priority ranking selection unit forwarding a priority ranking for each of the plurality of categorization patterns, and for selecting categorization patterns using the read priority rankings.

The retrieval menu creation device stores the priority ranking of each of the categorization patterns, and selects a categorization pattern according to the priority rankings. As a result, when priority rankings are set according to the user's demand, retrieval menus may be created according to the user's demand.

The above-mentioned object is also achieved by the retrieval menu creation device that may further include a switch reception unit of reciving a user indication to switch from a retrieval menu that is displayed on the display unit to another retrieval menu, and a second categorization pattern selection unit for selecting, when the switch reception unit receives the user indication to switch from a retrieval menu that is displayed on the display unit to another retrieval menu, categorization patterns from categorization patterns apart from the categorization patterns that was selected by the categorization pattern selection unit, based on the first predetermined standard that was used by the categorization pattern selection unit, wherein the menu extraction unit may create another retrieval menu from the categorization patterns that has been selected by the second categorization pattern selection unit.

When receiving the instructions to switch the displayed retrieval menu to another one from the user, the retrieval menu creation device selects a categorization pattern from the categorization patterns other than the ones that have been already selected. As a result, another categorization pattern may be selected and a retrieval menu may be created according to the user's instructions. The displayed menu may be switched to another one according to the user's demand.

The above-mentioned object is also achieved by the retrieval menu creation device that may further include an input reception unit for receiving choices that have been selected by a user from the choices in the retrieval menu, wherein the relating unit may further include a selection input data extraction unit for extracting each piece of input data that has been related to items corresponding to the selected choices as selection data, a relation cancel unit for canceling relations between each extracted piece of input data and items, and a selection input data relating unit for relating the selection data to items included in categorization patterns apart from categorization patterns that include the item corresponding to the selected choice, wherein the categorization pattern selection unit may select categorization patterns that include items to which the selection data was related by the selection input data relating unit, based on the first predetermined standard, wherein the menu extraction unit may create another retrieval menu from the selected categorization patterns, and wherein the display unit may display the other retrieval menu that has been created by the menu extraction unit.

The retrieval men creation device newly relates the input data that has been related to the choices that the user has selected to items in other categorization patterns, and creates another retrieval menu. As a result, retrieval menus in which the choices in each categorization pattern categorize data in different terms and are not related to each other in meaning may be created. The input data that the user demands may be retrieved quickly.

BRIEF DESCRIPTION OF THE DRAWINGS

These and other objects, advantages and features of the invention will become apparent from the following description thereof taken in conjunction with the accompanying drawings which illustrate a specific embodiment of the invention. In the Drawings:

FIG. 9 shows examples of the feature information that the data storage unit of the retrieval menu creation device whose construction is shown in FIG. 5 stores;

FIG. 10 shows the data structure of the categorization pattern information that the categorization pattern storage unit in the retrieval menu creation device whose construction is shown in FIG. 5 stores;

Fig. 11 shows an example of the categorization pattern information that the categorization pattern storage unit in the retrieval menu creation device whose construction is shown in FIG. 5 stores;

FIG. 13 shows an example of the priority ranking information that the priority ranking storage unit in the retrieval menu creation device whose construction is shown in FIG. 5 stores;

FIG. 14 shows an example of the categorization pattern information that the categorization pattern storage unit in the retrieval menu creation device whose construction is shown in FIG. 5 stores;

FIG. 15 shows an example of the categorization pattern information that the categorization pattern storage unit in the retrieval menu creation device whose construction is shown in FIG. 5 stores;

FIG. 16 shows an example of the categorization pattern information that the categorization pattern storage unit in the retrieval menu creation device whose construction is shown in FIG. 5 stores;

FIG. 17 shows an example of the categorization pattern information that the categorization pattern storage unit in the retrieval menu creation device whose construction is shown in FIG. 5 stores;

FIG. 18 shows an example of the categorization pattern information that the categorization pattern storage unit in the retrieval menu creation device whose construction is shown in FIG. 5 stores;

FIG. 19 shows an example of the categorization pattern information that the categorization pattern storage unit in the retrieval menu creation device whose construction is shown in FIG. 5 stores;

FIG. 24 shows an example of the categorization pattern information that the categorization pattern storage unit in the retrieval menu creation device whose construction is shown in FIG. 5 stores;

FIG. 25 shows an example of the categorization pattern information that the categorization pattern storage unit in the retrieval menu creation device whose construction is shown in FIG. 5 stores;

FIG. 30 shows the rods obtained by the morphological analysis on a piece of the document data that is shown in FIG. 29

FIG. 31 shows the frequency in the use of each of the words obtained by the morphological analysis on a piece of the document data shown in FIG. 29 in the piece of document data;

FIG. 35 shows an example of the categorization pattern information that the categorization pattern storage unit of the retrieval menu creation device whose construction is shown in FIG. 28 stores;

FIG. 36 shows important words, and sets of a related categorization pattern number and the related number identifying a categorization item that the relating unit of the retrieval menu creation device whose construction is shown in FIG. 28 stores;

FIG. 37 shows sets of a categorization pattern number and the number identifying a categorization item that the relating unit of the retrieval menu creation device whose construction is shown in FIG. 28 stores after the repetition of a set is excluded;

FIG. 38 shows a categorization pattern that a document data identification number is added to and the categorization pattern storage unit of the retrieval menu creation device whose construction is shown in FIG. 28 stores;

DESCRIPTION OF THE PREFERRED EMBODIMENTS

1. The First Embodiment

Retrieval menu creation device 100 is described below as the first embodiment of the present invention, with reference to the figures.

1.1 The Construction of Retrieval Menu Creation Device

Figure 1:
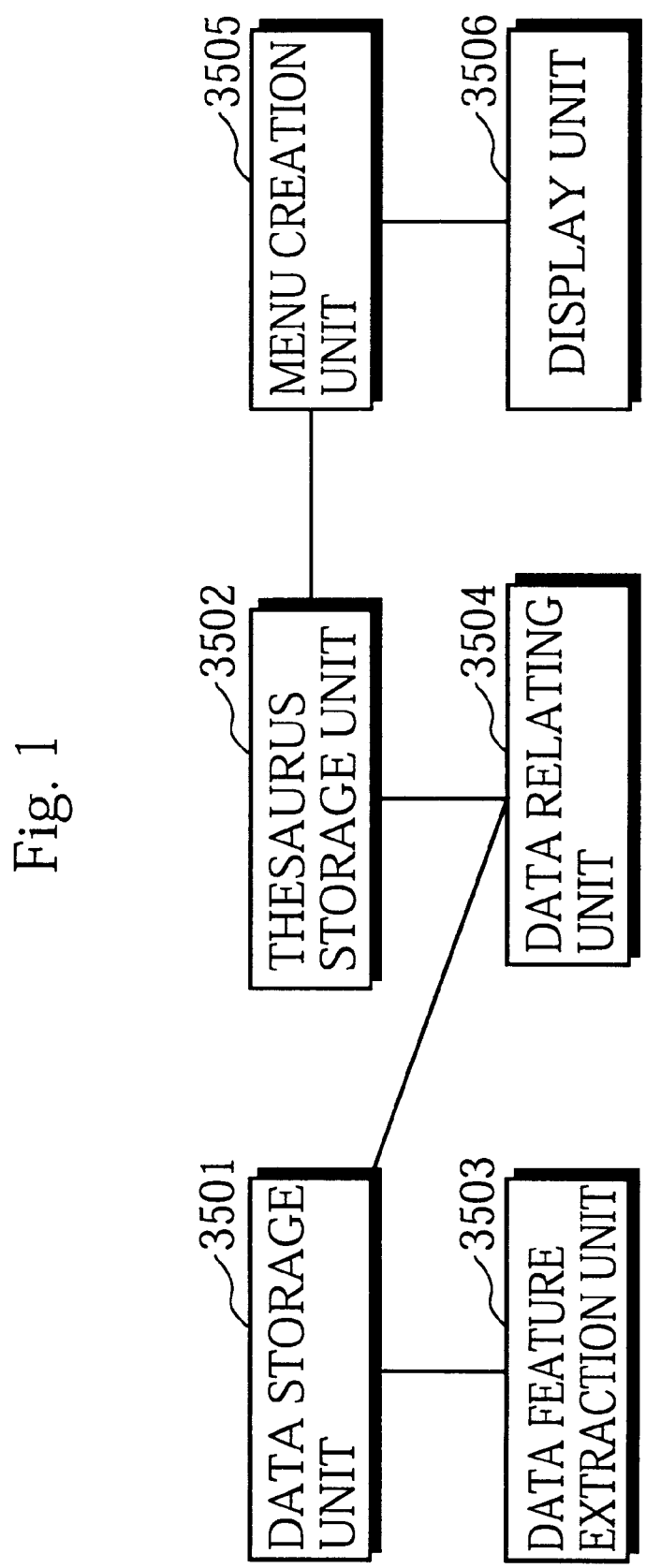
FIG. 1 is a block digram of the construction of a conventional menu retrieval system.
Figure 2A:
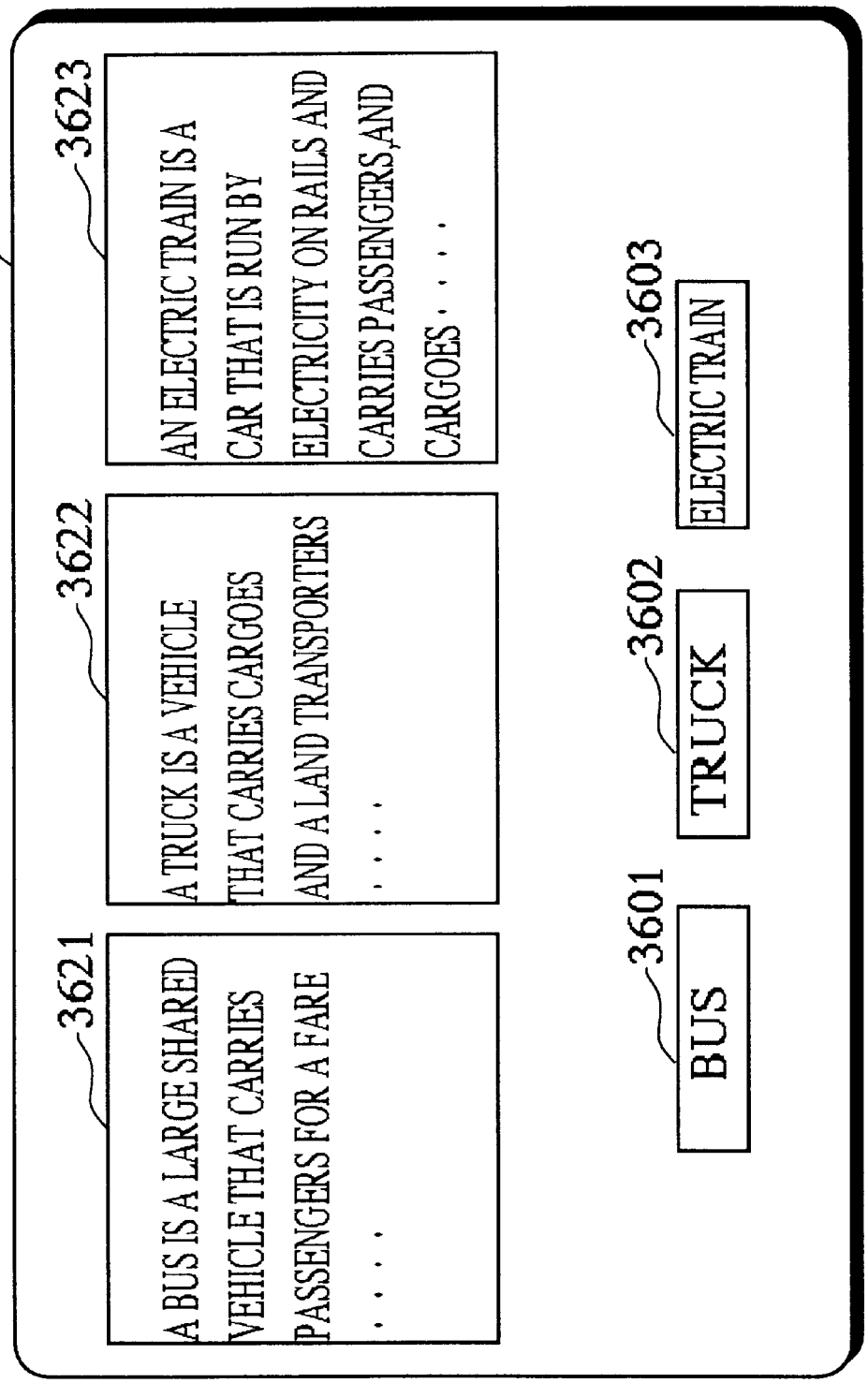
FIG. 2A shows examples of the data that the data storage unit in the menu retrieval system shown in FIG. 1 stores.
Figure 2B:
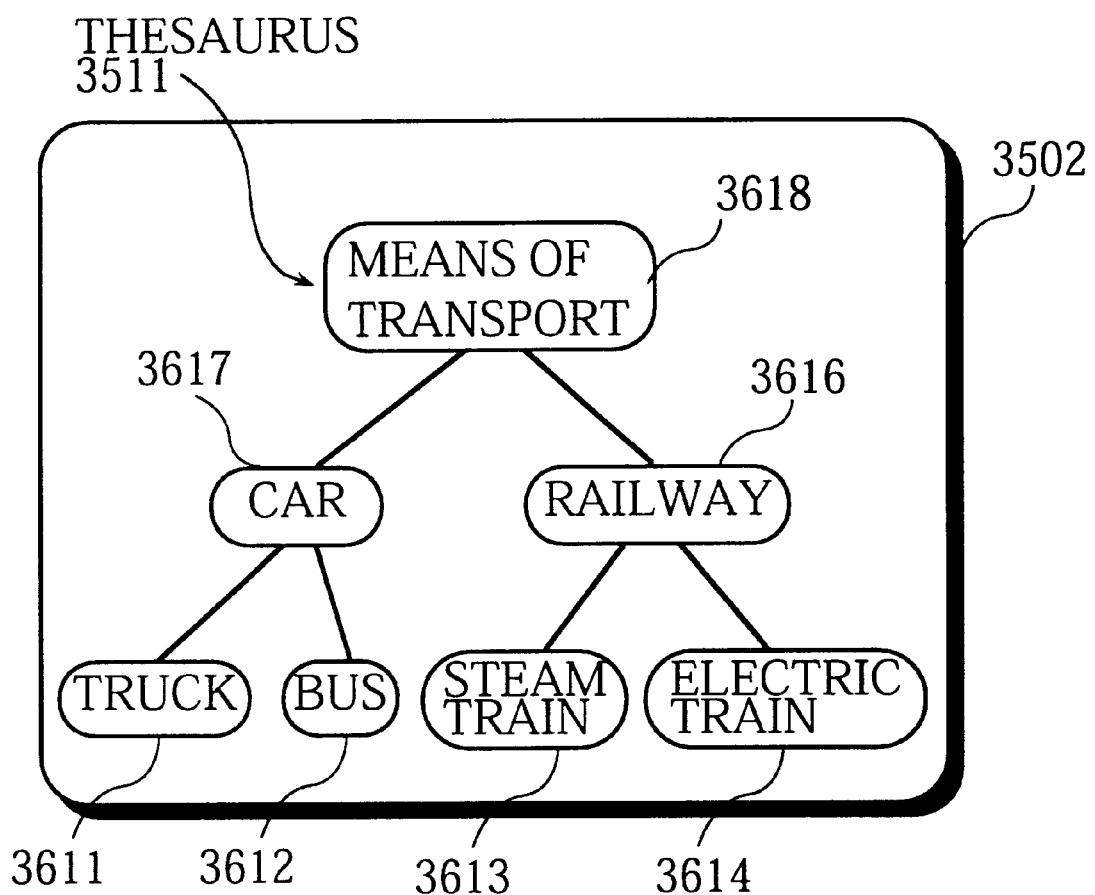
FIG. 2B shows a thesaurus that the thesaurus storage unit in the menu retrieval system shown in FIG. 1 stores.
Figure 3:
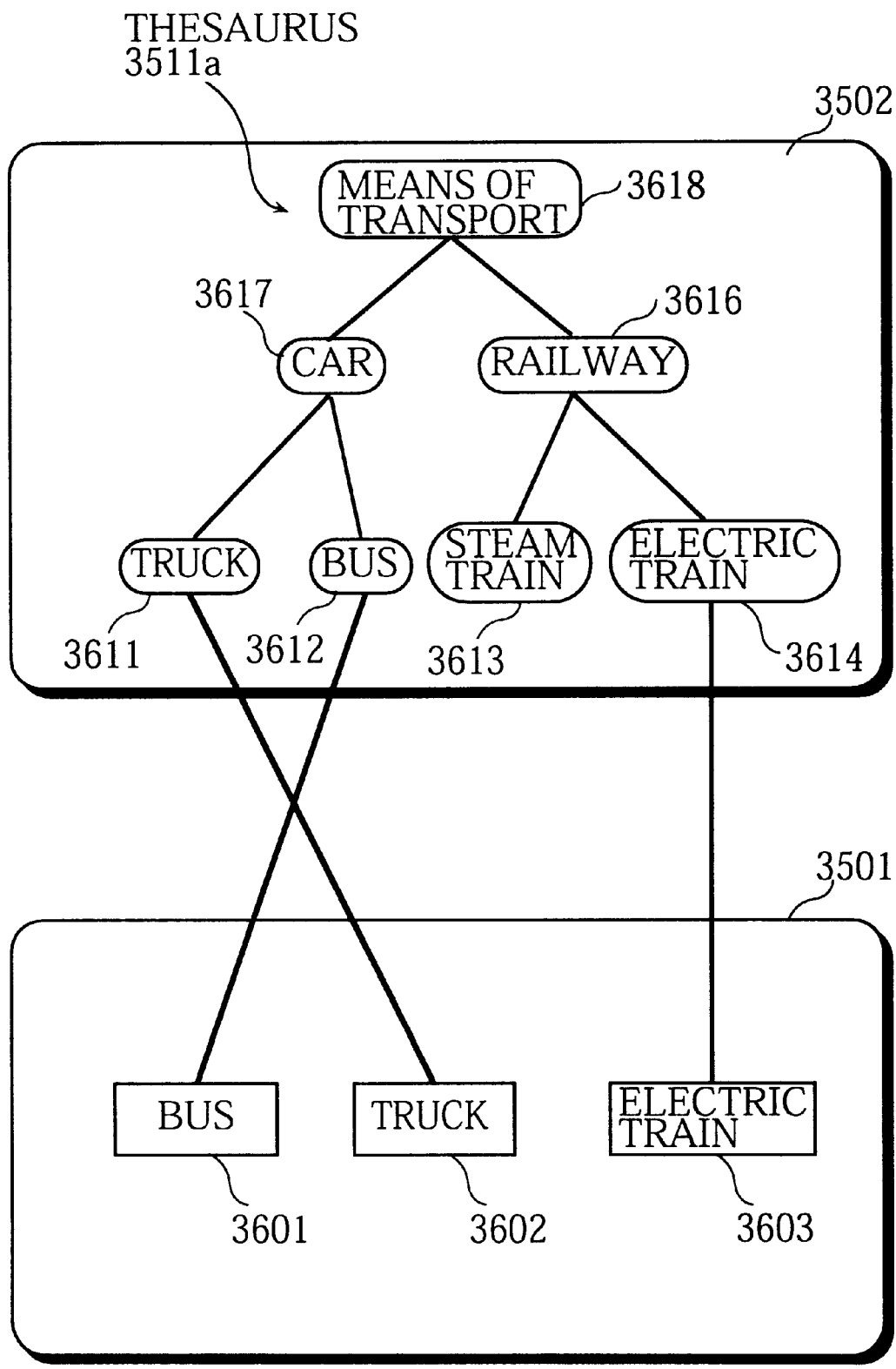
FIG. 3 shows the data that the data storage unit in the menu retrieval system shown in FIG. 1 stores, and the corresponding words in a thesaurus that the thesaurus storage unit stores.
Figure 4A:
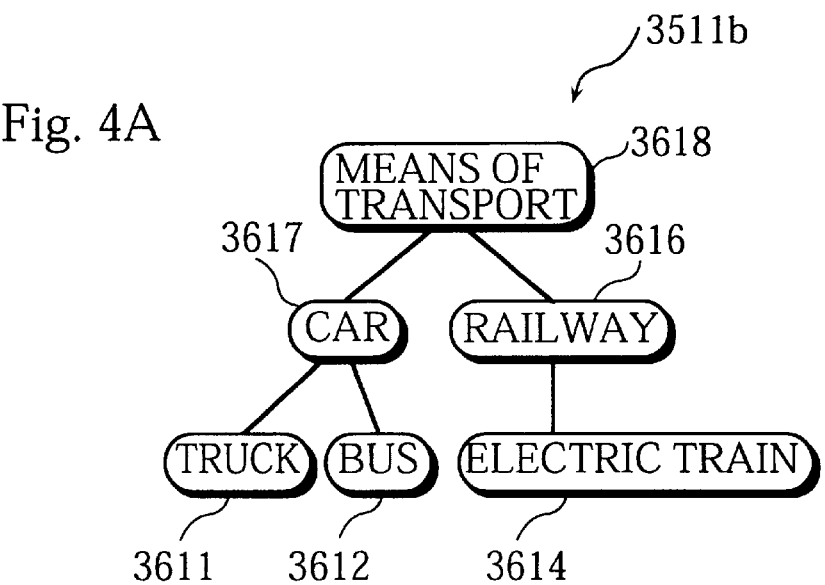
FIG. 4A shows the layer structure of retrieval menus that the menu retrieval system whose construction is shown in FIG. 1 creates.
Figure 4B:
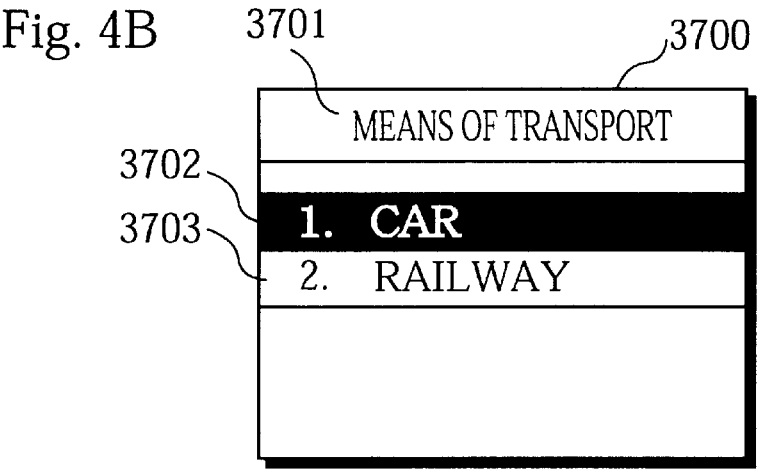
FIG. 4B shows a retrieval menu that the display unit of the menu retrieval system whose construction is shown in FIG. 1 displays.
Figure 4C:
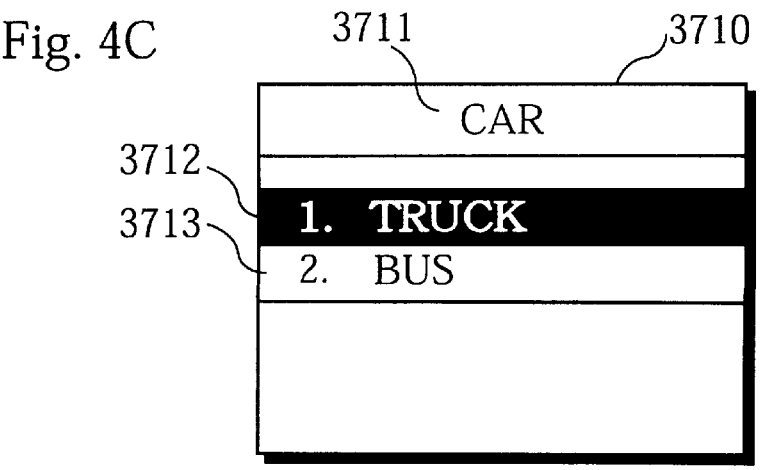
FIG. 4C shows a retrieval menu that the display unit of the menu retrieval system whose construction is shown in FIG. 1 displays.
Figure 5:
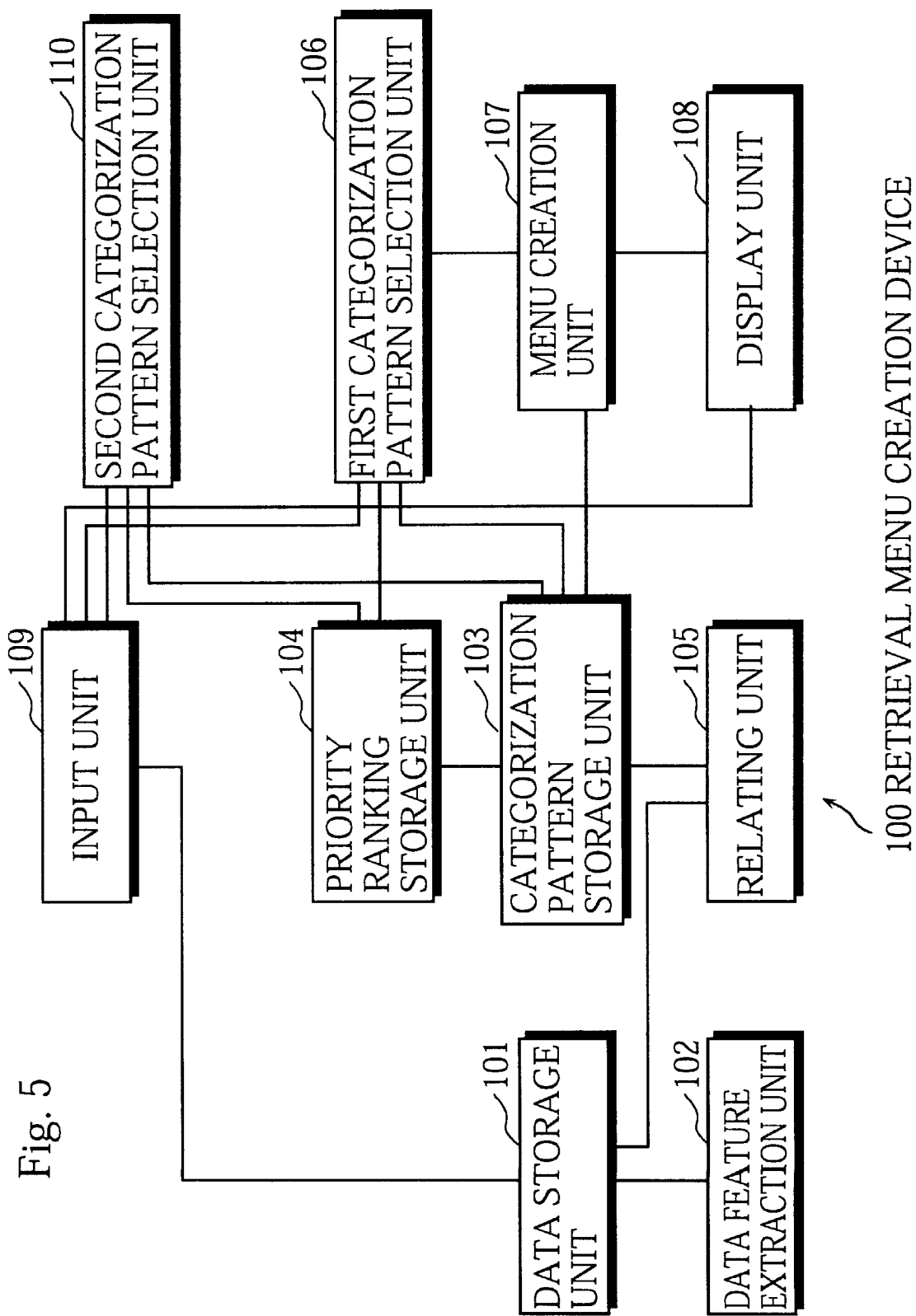
FIG. 5 shows a construction of a retrieval menu creation device according to the first embodiment of the present invention.

FIG. 5 is a block diagram showing the construction of retrieval menu creation device 100.

Retrieval menu creation device 100 includes data storage unit 101, data feature extraction unit 102, categorization pattern storage unit 103, priority ranking storage unit 104, relating unit 105, first categorization pattern selection unit 106, menu creation unit 107, display unit 108, input unit 109, and second categorization pattern selection unit 110.

1.1.1 Data Storage Unit 101

Data storage unit 101 stores input data, for instance, message board information 260 transmitted via a network. Data storage unit 101 stores feature information 270 that includes features output from data feature extraction unit 102. Data storage unit 101 is composed of a magnetic disk unit or another storage device.

The reception unit that is not shown in FIG. 5 receives input data from outside via a network. The data writing unit that is not shown in FIG. 5 writes the received input data in data storage unit 101.

The reception unit may read input data from a dictionary, a thesaurus, an encyclopedia, or the like recorded in, for instance, a CD-ROM, a recording medium that a computer may read.

(1) Message Board Information 260

Figure 6:
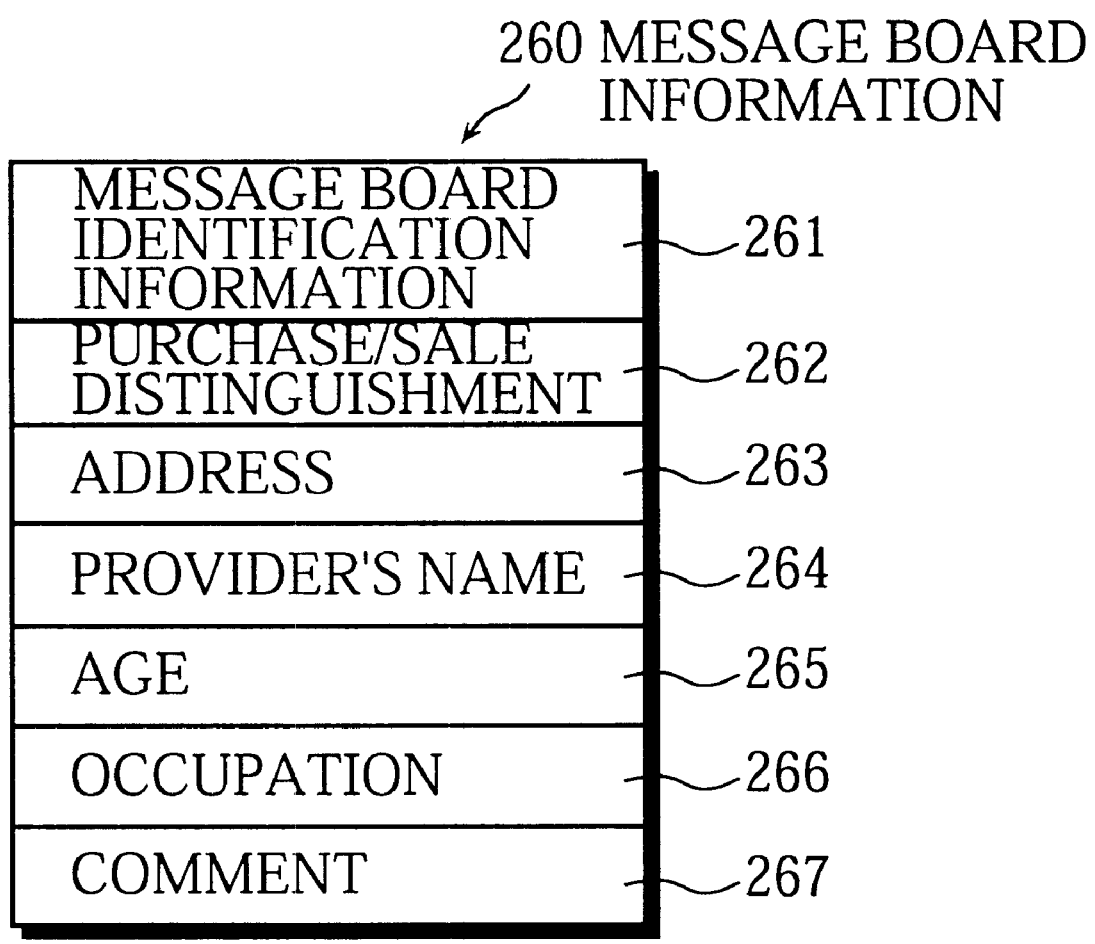
FIG. 6 shows the data structure of the message board information that the data storage unit of the retrieval menu creation device whose construction is shown in FIG. 5 stores.

Message board information 260 is used to distribute information about buying and selling among many people, and includes message board identification information 261, purchase/sale distinguishment 262, address 263, information provider's name 264, age 265, occupation 266, and comment 267 as shown in FIG. 6.

Message board identification information 261 is the data identifier for identifying message board information 260. While referencing numbers based on the order in which the input data arrives are generally used for information board identification information 261, any data indentifier may be used for the identification. Purchase/sale distinguishment 262 shows whether the information on a message board is about a purchase or a sale. Address 263 shows the address of the information provider. Information provider's name 264 shows the name of the information provider. Age 265 shows the age of the information provider. Occupation 266 shows the occupation of the information provider. Comment 267 is a document indicating what is to be bought or sold and the terms including the price or the conditions.

Figure 7:
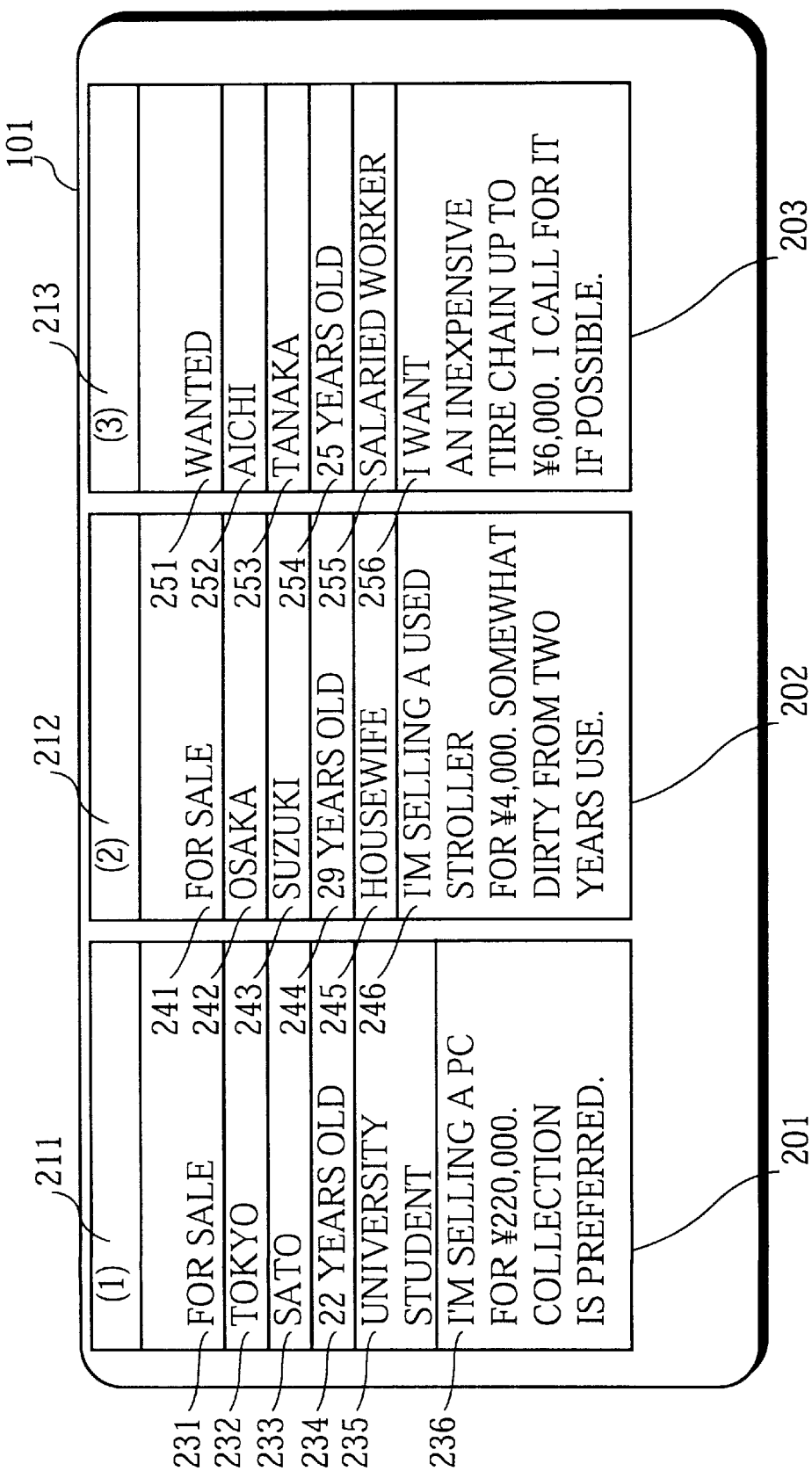
FIG. 7 shows examples of message board information that the data storage unit of the retrieval menu creation device whose construction is shown in FIG. 5 stores.

FIG. 7 shows examples of message board information 260 that data storage unit 101 stores. As shown in FIG. 7, data storage unit 101 stores message board information 201, 202, and 203 that gives information on buying or selling and have been obtained via a network. Message board information 201 includes message board identification information 211, purchase/sale distinguishment 231, address 232, information provider's name 233, age 234, occupation 235, ad comment 236. Message board information 202 includes message board identification information 212, purchase/sale distinguishment 241, address 242, information provider's name 243, age 244, occupation 245, and comment 246. Message board information 203 includes message board identification information 213, purchase/sale distinguishment 251, address 252, information provider's name 253, age 254, occupation 255, and comment 256.

(2) Feature Information 270

Figure 8:
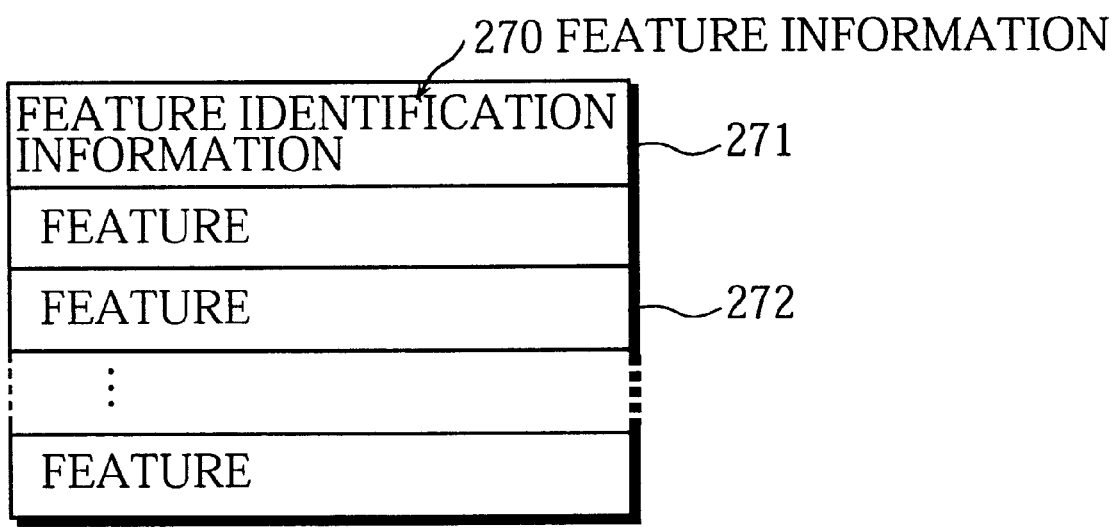
FIG. 8 shows the data structure of the feature information that the data storage unit of the retrieval menu creation device whose construction is shown in FIG. 5 stores.

Feature information 270 includes feature identification information 271 and features 272 as shwon in FIG. 8.

One piece of feature information 270 corresponds to one piece of message board information 260. Feature identification information 271 includes the same information as message board identification information 261 in message board information 260 that corresponds to feature information 270, and identifies feature information 270.

Features 272 are extracted by data feature extraction unit 102 and are stored in data storage unit 101. Features 272 will be explained later.

FIG. 9 shows examples of feature information 270 that are stored in data storage unit 101. As shown in FIG. 9, data storage unit 101 store feature information 301, 302, and 303. Feature information 301 includes feature identification information 214 and features 221, 222, 223, 224, 225, 226, and 228. Feature identification information 214 has the same reference number as message board identification information 211, and shows that feature information 301 corresponds to message board information 201. Feature information 302 includes feature identification information 215 and features 281, 282, 283, 284, 285, 286, 287, 288, and 289. Feature identification information 215 has the same reference number as message board identification information 212, and shows that feature information 302 corresponds to message board information 202. Feature information 303 includes feature identification information 216 and features 291, 292, 293, 294, 295, 296, and 297. Feature identification information 216 has the same reference number as message board identification information 213, and shows that feature information 303 corresponds to message board information 203.

1.1.2 Date Feature Extraction Unit 102

Data feature extraction unit 102 reads message board identification information 261, purchase/sale distinguishment 262, address 263, information provider's name 264, age 265, occupation 266, and comment 267 included in each piece of message board information 260 that is stored in data storage unit 101.

Data feature extraction unit 102 performs a morphological analysis on comment 267 that has been read by data feature extraction unit 102, divides comment 267 into morphemes, and extracts the nouns from the morphemes.

In this specification, the morphological analysis is performed for dividing a document into morphemes, the smallest units with a meaning, and for finding the part of speech of each of the morphemes. Morphological analysis is not described in detail here, but is explained in "Natural Language Processing" (Iwanami Shoten Publishers, April 1996, pp117–137).

Data feature extraction unit 102 writes message board identification information 261 that has been read by data feature extraction unit 102 as feature identification information in data storage unit 101. Data feature extraction unit 102 writes purchase/sale distinguishment 262, address 263, information provider's name 264, age 265, occupation 266 which each have been read by data feature extraction unit 102, and the nouns that have been extracted by data feature extraction unit 102, as features in data storage unit 101.

Purchase/sale distinguishment 262 in message board information 260, which only shows whether the information on the message board is about buying or selling, is written as a feature by data feature extraction unit 102 without change. Address 263, information provider's name 264, age 265, and occupation 266 are also written as features without change. On the other hand, comment 267 is a document that indicates what it to be bought or sold and the terms including the price or the conditions, so that comment 267 may not be suitable for use as a feature in its original form. Data feature extraction unit 102 performs a morphological analysis on and extracts the nouns from comment 267, and writes the extracted nouns as features in data storage unit 101.

As described above, the data structure determines whether a piece of input data is used as a feature as it s or features are extracted from the input data by means or morphological analysis.

Data feature extraction unit 102 will be explained with reference to the examples shown in FIGS. 7 and 9.

Firstly, data feature extraction unit 102 reads message board identification information 211 "(1)", purchase/sale distinguishment 231 "For Sale", address 232 "Tokyo", information provider's name 233 "Sato", age 234 "22 years old", occupation 235 "student", and comment 236 "I'm selling a PC for ¥220,000. Collection is preferred." from message board information 201 stored in data storage unit 101. Then data feature extraction unit 102 performs a morphological analysis on comment 236 "I'm selling a PC for ¥220,000. Collection is preferred." that has been read, and divides comment 236 into morphemes "I'm", "selling", "a", "PC", "for", "¥", "200,000", ".", "Collection ", "is", "preferred", and ".". Data feature extraction unit 102 extracts nouns "PC", "200,000", "Collection", from the morphemes. Data feature extraction unit 102 writes message board identification information 211 "(1)" that has been read as feature identification information and purchase/sale distinguishment 231 "For Sale" that has been read, address 232 "Tokyo", information provider's name 233 "Sato", age 234 "22 years old", occupation 235 "student", and the extracted nouns "PC", "220,000", and "Collection" as features in data storage unit 101.

Data feature extraction unit 102 writes the feature identification information and the features in data storage unit 101 for message board information 202 and 203 that is stored in data storage unit 101 in the same manner as has been described.

1.1.3 Categorization Pattern Storage Unit 103

Categorization pattern storage unit 103 stores categorization pattern information 700. Categorization pattern storage unit 103 is composed of a magnetic disk unit or another storage device.

When a retrieval menu that includes the choices for selecting input data is created, the choices are created base on categorization pattern information 700. Categorization pattern information 700 includes at least one categorization pattern 701 as shown in FIG. 10.

Categorization pattern 701 includes categorization pattern name 702 and item group 705. Categorization pattern 701 can further include data corresponding item number 703 or selection mark 704.

Item group 705 includes at least one item 711. At least one piece of message board identification information 713 can be added to item 711. Item 711 can include at least one subitem 712 that belongs to item 711. Subitem 712 can include at least one message board identification information 714.

Categorization pattern name 702 is a title that represents the information in categorization pattern 701.

Categorization pattern storage unit 103 stores the number of the items corresponding to data as data corresponding item number 703 that first categorization pattern selection unit 106 has written, for each categorization pattern.

Categorization pattern storage unit 103 stores a selection mark that first categorization pattern selection unit 106 has written as selection mark 704.

Data corresponding item number 703 and selection mark 704 will be explained later.

Message board identification information 713 and 714 are the same kind of information as message board identification information 261.

No item that is include in a categorization pattern is related to an item that is included in another categorization pattern.

FIG. 11 shows categorization pattern information 400 that is an example of categorization pattern information 700 that is stored in categorization pattern storage unit 103.

Categorization pattern information 400 includes categorization patterns 421, 431, 441, 451, 461, and 471.

Categorization pattern names 411 "age", 412 "occupation", 413 "gender", 414 "location", 415 "price 1", and 416 "price 2" are given to categorization patterns 421, 431, 441, 451, 461, and 471, respectively.

Categorization pattern 421 includes item group 420 that includes seven items, "~19", "10~20", "21~29", "30~39", "40~49", "50~59", and "60~", which categorize people into seven groups by age.

Categorization pattern 431 includes item group 430 that includes 10 items, "infant", "elementary school child", "junior high school student", "senior high school student", "university student", "housewife", "salaried worker", "technical college student", "self-employed worker", and "unemployed", which categorize people into 10 groups by occupation.

Categorization pattern 441 includes item group 440 that includes two items, "male", and "female", which categorize people into two groups by gender.

Categorization pattern 451 includes item group 450 that includes eight items, "Hokkaido", "Tohoku", "Kanto", "Chucu", "Kinki", "Chugoku", "Shikoku", and "Kyushu", which categorize the prefectures in Japan into eight regions. Each of the items included in item group 450 further includes subitems. For instance, item 452 "Tohoku" includes subitems 453 "Aomori", 454 "Iwate", 455 "Miyagi", 456 "Akita", 457 "Yamagata", and 458 "Fukushima", which represent prefectures. Categorization pattern 451 includes the items and the subitems in a bilevel structure.

Categorization pattern 461 to which categorization pattern name 415 "price 1" is given includes item group 460 that inlcudes four items, "~10,000", "10,000~100,000", "100,000~1,000,000", and "1,000,000~". Categorization pattern 471 to which categorization pattern name 416 "price 2" is given includes item group 470 that includes five items, "~1,000", "1,000~3,000", "3,000~5,000", "5,000~10,000", and "10,000~". Catgorization patterns 461 and 471 categorize the same subject, prices, but include different items. Catgorization pattern information 400 may include a plurality of categorization patterns that categorize the same subject on different terms.

1.1.4 Priority Ranking Storage Unit 104

Priority ranking storage unit 104 stores priority ranking information 750 which includes priority rankings for each categorization pattern 701. Priority ranking storage unit 104 is composed of a magnetic disk unit or another storage device.

Figure 12:
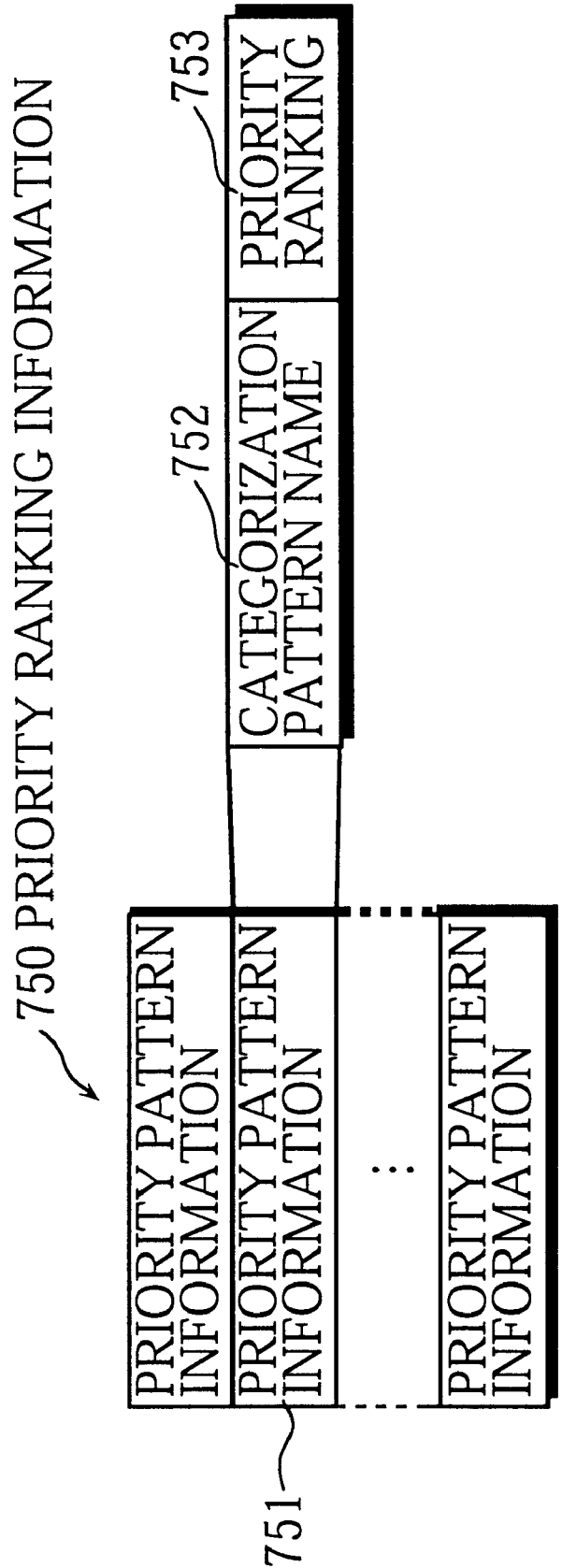
FIG. 12 shows the data structure of the priority ranking information that the priority ranking storage unit in the retrieval menu creation device show construction is shown in FIG. 5 stores.

Priority ranking information 750 includes at least one piece of priority pattern information 751 as shown in FIG. 12. Priority pattern information 751 includes categorization pattern name 752 and priority ranking 753. Categorization pattern name 752 is the same kind of information as categorization pattern name 702 shown in FIG. 10. Priority ranking 753 shows the degree of user demand for the categorization pattern that is represented by categorization pattern name 752. Larger numerical values represent stronger user demand.

FIG. 13 shows priority ranking information 760 as an example of priority ranking information 750. As shown in FIG. 13, categorization pattern names 511 "age", 512 "occupation", 513 "gender", 514 "location", 515 "price 1", and 516 "price 2" correspond to priority rankings 521 "3", 522 "4", 523 "5", 524 "8", 525 "2", and 526 "4", respectively. This means that catgorization patterns 421, 431, 441, 451, 461, and 471 shown in FIG. 11 have priority "3", "4", "5", "0", "2", and "4", respectively.

In the present embodiment, catgorization pattern names and the corresponding priority rankins are included in priority ranking information 760, so that the priority ranking of a catgorization pattern may be obtained using the corresponding categorization pattern name. Priority ranking information 750 may include the storage location of a categorization pattern instead of categorization pattern name 752. In this case, categorization pattern information 700 includes the storage location of the categorization pattern instead of categorization pattern name 702.

Contrary to the above explanation, smaller numerical values may represent higher priority rankings.

1.1.5 Relating Unit 105

Relating unit 105 relates message board information that is stored in data storage unit 101 to items in categorization pattern stored in categorization pattern storage unit 103 using the feature information corresponding to the message board information that is also stored in data storage unit 101.

The specific operation performed by relating unit 105 will be explained with reference to FIGS. 9 and 11.

Relating unit 105 reads feature identification information 214 and feature 221 include in feature information 301, and compares feature 221 with items and subitems included in categorization patterns 421, 431, 441, 451, 461, and 471 that are stored in categorization pattern storage unit 103. When an item or a subitem that corresponds to feature 221 is found, or when an item or a subitem tat includes feature 221 is found, relating unit 105 adds feature identification information 214 to the item or the subitem that is found to correspond to or include feature 221 as message board identification information. As described above relating unit 105 relates feature information 301 to an item or a subitem.

Relating unit 105 cppares features 222, 223, 224, 225, 226, 227, and 228 included in feature information 301 with items or subitems included in the categorization patterns, and adds feature identification information 214 to the items or the subitems that are found to correspond to or include the features as message board identification information in the same manner a sin the case of feature 221.

Relating unit 105 compares the features included in feature information 302 with the items and the subitems included in the categorization patterns, and adds feature identification information 215 to the items or the subitems that are found to correspond to or include the features as message board identification information in the same manner as in the case of features included in feature information 301.

For instance, relating unit 105 reads feature identification information 214 "(1)" and feature 221 "For Sale" that are included in feature information 301, and compares feature 221 with the items and the subitems that are included in categorization patterns 421, 431, 441, 451, 461, and 471 one after another. No item or subitem included in categorization patterns 421, 431, 441, 451, 461, and 471 corresponds to or includes feature 221 "For Sale", so that relating unit 105 reads the next feature, feature 222 "Tokyo".

Relating unit 105 compares feature 222 "Tokyo" with the items and the subitems included in categorization patterns 421, 431, 441, 451, 461, and 471. Feature 222 "Tokyo" correspond to the subitem "Tokyo" that is included in categorization pattern 451, so that relating unit 105 adds feature identification information 214 "(1)" to the subitem "Tokyo" that is included in categorization pattern 451 as message board identification information.

FIG. 14 shows the categorization pattern information 650 when feature identifictaion information 214 "(1)" is added to the subitem "Tokyo" that is included in categorization patterns 451 as message board identification information. As shown in FIG. 14, reference number 611 represents the message board identification information that is added to the subitem.

Relating unit 105 adds feature identification information 214 "(1)" to items or subitems for other features, features 223, 224, 225, 226, 227, and 228 included in feature information 301 in the same manner.

No item or subitem is found to correspond to features 223 "Sato", 226 "PC", ad 228 "Collection", so that relating unit 105 adds feature identification information 214 "(1)" to no item or subitem for these features.

When comparing a feature represented by numerical data with items and subitems, for example, feature 227 "220, 000", relating unit 105 searches for the item or the subitem represented by the range of numbers that includes the numerical data. In the present embodiment, relating unit 105 relates message board information 201 to the items included in categorization patterns 461 and 471, which are represented by categorization pattern names 415 "price 1" ad 416 "price 2", respectively.

FIG. 15 shows categorization pattern information 651 that is stored in categorization pattern storage unit 103 after message board information 201 is related to the items and the subitems using the features included in feature information 301. Reference numbers 611 to 615 represent message board identification information 211 "(1)" included in message board information 201 that is added to the items and the subitems by relating unit 105.

FIG. 16 shows categorization pattern information 652 after feature information 301, 302, and 303 is related to the items and the subitems using the feature included in feature information 301, 302, and 303. Reference numbers 811 to 822 represent the message board identification information that is included in message board information 201, 202, ad 203 and is added to the items and the subitems by relating unit 105.

FIG. 17 shows categorization pattern information 653 after 20 pieces of feature information including feature information 301, 302, and 303, is related to the items and the subitems using the features included in 20 pieces of feature information.

1.1.6 First Categorization Pattern Selection Unit 106

First categorization pattern selection unit 106 selects the most suitable categorization pattern for creating a retrieval menu from the categorization pattern information that is stored in categorization pattern storage unit 103, using the priority ranking information stored in priority ranking storage unit 104. In doing so, first categorization pattern selection unit 106 operates according to a predetermined standard that will be described below.

First categorization pattern selection unit 106 reads categorization pattern information 700 that is stored in categorization pattern storage unit 103 for each categorization pattern 701. First categorization pattern selection unit 106 counts the number of the items and the subitems to which message board identification information 713 is added for each categorization pattern 701. First categorization pattern selection unit 106 writes the number of items and subitems in each categorization pattern information 700 in categorization pattern storage unit 103 as data corresponding item number 703.

The operation by first categorization pattern selection unit 106 will be explained with reference to categorization pattern information 653 shown in FIG. 17.

First categorization pattern selection unit 106 reads categorization pattern 1010 from categorization pattern information 653, judges whether message board identification information is added to each of the items included in categorization pattern 1010, and counts the number of the items to which message board identification information is added.

Two items, items 1012 and 1013, to which the input data is related are included in categorization pattern 1010, so that first categorization pattern selection unit 106 counts the number of the items "2", and writes "2" in categorization pattern 1010 as data corresponding item number.

In the case of a categorization pattern including the items and the subitems in a bilevel structure, for instance, the categorization pattern represented by categorization pattern name 1021 "location", first categorization pattern selection unit 106 counts the number of the items including the subitems to which message board identification information is added.

FIG. 18 shows categorization pattern information 654 where the number of the items to which message board identification information is added is written for each of the categorization patterns.

When a retrieval menu displays too small a number of choices on a screen, it is impossible for the user to retrieve data quickly because the user will have to proceed through many retrieval menus in a multilevel structure. When a retrieval menu displays too large a number of choices on a screen, it is also impossible for the user to retrieve data quickly because there will be too many choices to be compared at once. As a result, when creating a retrieval menu, first categorization pattern selection unit 106 determines the most suitable number of choices for one screen in advance, and selects the categorization pattern that includes a number of related items which is closest to the most suitable predetermined number of choices as the most suitable categorization pattern, For instance, in categorization pattern information 654 shown in FIG. 18, the number of the related items included in both of the categorization patterns that are represented by categorization pattern names 1021 "location" and 1022 "price 2" is "5". when the most suitable predetermined number of choices is "6", the number "5" is closest to the most suitable predetermined number of choices "6", so that first categorization pattern selection unit 106 judges that the categorization patterns that are represented by categorization pattern names 1021 and 1022 as the most suitable categorization pattern.

First categorization pattern selection unit 106 selects the most suitable categorization pattern in the same manner as described above. When finding a plurality of most suitable categorization patterns, first categorization pattern selection unit 106 selects one categorization pattern in the manner described below.

First categorization pattern selection unit 106 reads the priority rankings corresponding to the categorization pattern names representing the plurality of categorization patterns that are judged most suitable from priority ranking storage unit 104, and compares the read priority rankings. For instance, first categorization pattern selection unit 106 reads priority ranking "8" corresponding to categorization pattern name "location" and priority ranking "4" corresponding to categorization pattern name "price 2" from priority ranking information 760 shown in FIG. 13. First categorization pattern selection unit 106 compares the read priority rankings "8" and "4", and judges that the categorization pattern represented by categorization pattern name 1021 "location" that has the higher priority ranking is the most suitable categorization pattern.

When a plurality of categorization patterns that are judged most suitable have the same priority ranking, first categorization pattern selection unit 106 may select one categorization pattern at random or according to the registration order of the categorization patterns.

First categorization pattern selection unit 106 adds the selection mark "○" to the categorization pattern 701 that is stored in categorization pattern storage unit 103 and is determined to be most suitable as selection mark 704.

FIG. 19 shows categorization pattern information 1100 after selection mark "○" is added to the categorization pattern that is represented by categorization pattern name "location" as selection mark 1111.

1.1.7 Menu Creation Unit 107

Menu creation unit 107 extracts the items to which the corresponding message board information is related from the categorization pattern that has been selected by first categorization pattern selection unit 106, and creates a retrieval menu including the extracted items as choices. The operation performed by menu creation unit 107 will be explained in detail with reference to the figures.

Menu creation unit 107 extracts categorization pattern 701 that includes selection mark 704 "○" from categorization pattern information 700 stored in categorization pattern storage unit 103, and the items to which message board identification information 713 has been added and the items that include the subitems to which message board identification information 714 has been added from each extracted categorization pattern 701. Menu creation unit 107 counts the number of pieces of message board identification information 713 that have been added to an item and the number of pieces of message board identification information 714 that have been added to the subitems included in an item for each of the extracted items. Menu creation unit 107 adds together the number of pieces of counted message board identification information 713 and the number of pieces of the counted message board identification information 714 for each of the extracted items, and obtains the number of pieces of the message board identification information that have been added to each of the extracted items.

Menu creation unit 107 creates at least one set of an item and the number of pieces of message board information that have been related to the item, and outputs each of the sets on display unit 108.

The operation performed by menu creation unit 107 will be explained in detail with reference to FIG. 19.

Figure 20:
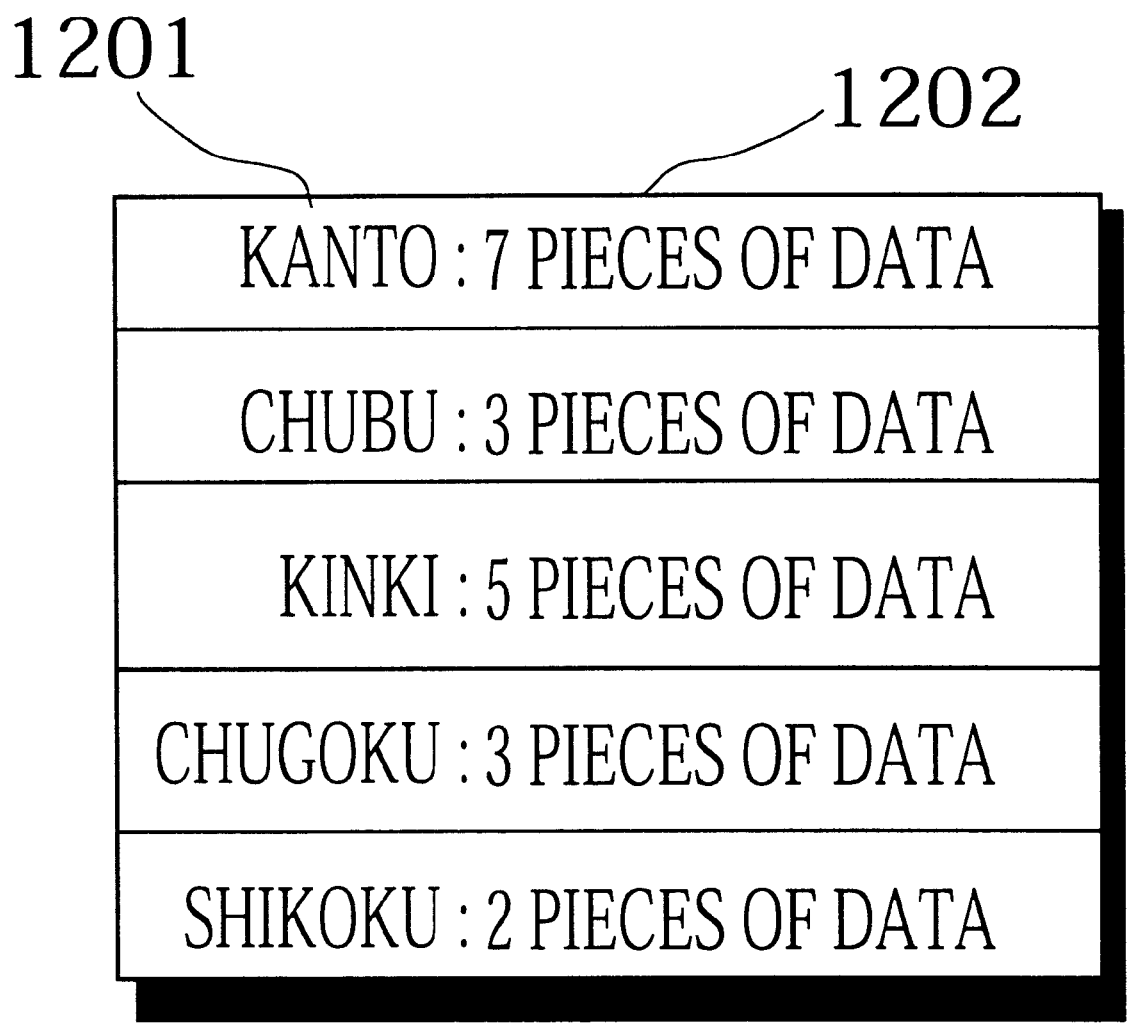
FIG. 20 shows a retrieval menu that the retrieval menu creation device whose construction is shown in FIG. 5 creates.

Menu creation unit 107 extracts categorization pattern 1120 to which selection mark 1111 "○" is added. Menu creation unit 107 extracts items 1123 "Kanto", 1124 "Chubu", 1125 "Kinki", 1126 "Chugoku", and 1127 "Shikoku" which each include subitems to which message board identification information has been added from items 1121 "Hokkaido", 1122 "Tohoku", 1123 "Kanto", 1124 "Chubu", 1125 "Kinki", 1126 "Chugoku", 1127 "Shikoku", and 1128 "Kyushu" included in categorization pattern 1120. In this example shown in FIG. 19, no message board identification information is added to the items themselves included in categorization pattern 1120. Menu creation unit 107 counts the number of pieces of the message board identification information that are added to the subitems included in the five items, items 1123 "Kanto", 1124 "Chubu", 1125 "Kinki", 1126 "Chugoku", and 1127 "Shikoku" for each of the items. Menu creation unit 107 creates five sets of an item that has been extracted and the number of pieces of the message board identification information that have been added to the item. FIG. 20 shows the five sets of item 1201 and message board identification information 1202 created by menu creation unit 107. Menu creation unit 107 outputs the five sets of an item that have been extracted and the number of pieces of the message board identification information that have been counted for the extracted item on display unit 108.

1.1.8 Display Unit 108

Display unit 108 receives at least one set of an item and the number of pieces of the message board identification information that have been added to the item from menu creation unit 107. Display unit 108 displays a bar chart that includes each of the received sets and a bar whose length is proportional to the number of pieces of the message board identification information for each of the received sets as s retrieval menu, based on each of the received sets. Display unit 108 also displays s cursor for selecting an item.

Figure 21:
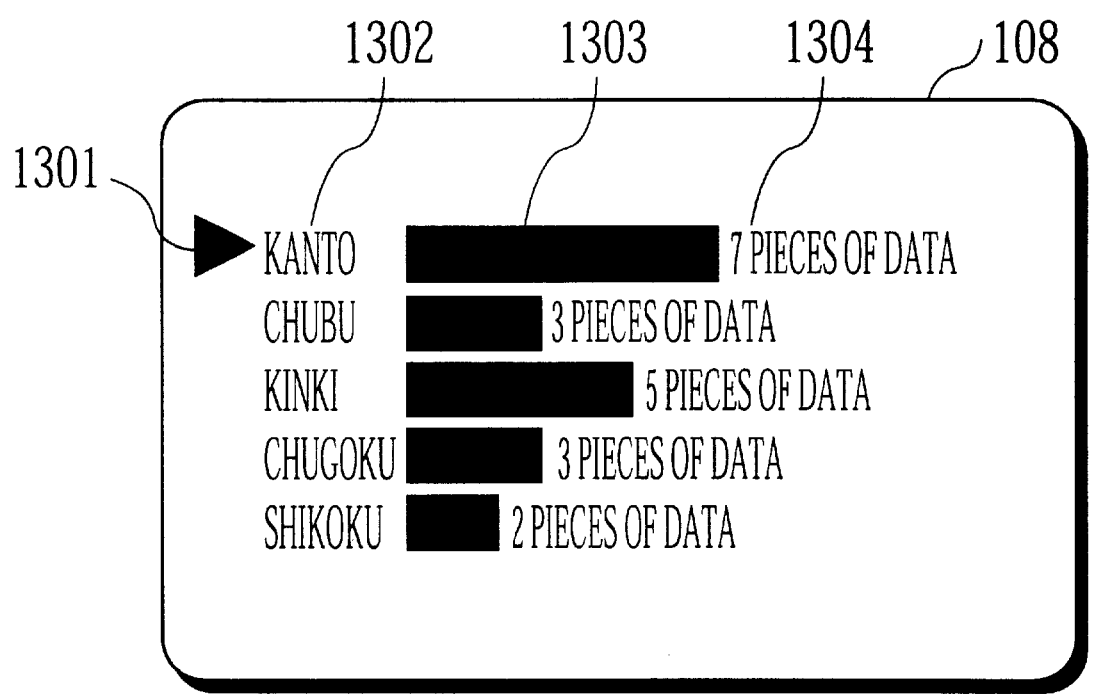
FIG. 21 shows a retrieval men that the display unit of the retrieval menu creation device whose construction is shown in FIG. 5 displays.

FIG. 21 shows a retrieval menu displayed by display unit 108. The retrieval menu in FIG. 21 shows a bar chart that includes five sets of item 1302, bar 1303, and the number of pieces of message board identification information 1304, and cursor 1301 for selecting one of the items.

While displaying a bar chart that includes sets of an item, a bar, and the number of pieces of the message board identification information in FIG. 21, display unit 108 may display sets of an item and the number of pieces of the message board identification information.

When displaying a retrieval menu and receiving the instruction "to move up" from input unit 109, display unit 108 moves cursor 1301 so that the cursor indicates the item that is placed one line above the previously indicated item. When displaying a retrieval menu and receiving the instructions "to move down" from input unit 109, display unit 108 moves cursor 1301 so that the cursor indicates the item that is placed one line below the previously indicated item.

When receiving the instructions "to execute" from input unit 109, display unit 108 selects the item that is indicated with cursor 1301, and reads a piece of message board identification information that has been added to the selected item from categorization pattern information 700 stored in categorization pattern storage unit 103. Display unit 108 reads the message board information 260 identified by the read message board identification information from data storage unit 101, and displays the read message board information 260.

When displaying the message board information 260 and when receiving the instructions "to move down" from input unit 109, display unit 108 reads another piece of message board identification information that is placed behind the read message board identification information that has been added to the above-mentioned selected item from a categorization pattern information 700 stored in categorization pattern storage unit 103. Display unit 108 reads the message board information 260 identified by this newly read message board identification information from data storage unit 101, and displays the secondly-read message board information 260.

When displaying the firstly-read message board information 260 and receiving the instructions "to move up" from input unit 109, display unit 108 reads another piece of message board identification information that is placed ahead of the firstly-read message board identification information that has been added to the above-mentioned selected item from categorization pattern information 700 stored in categorization pattern storage unit 103. Display unit 108 reads the message board information 260 identified by the newly-read message board identification information from data storage unit 101, and displays the newly-read message board information 260.

Figure 23:
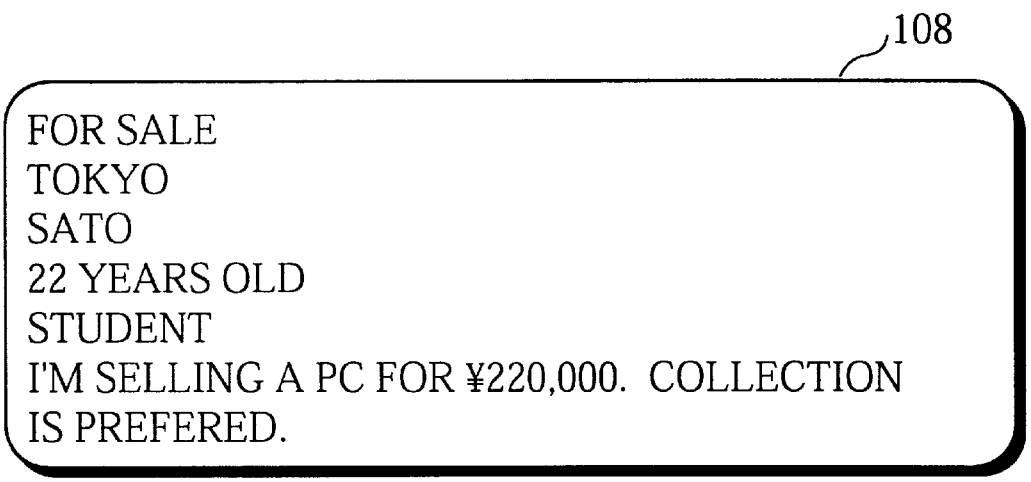
FIG. 23 shows a retrieval menu that the display unit of the retrieval menu creation device whose construction is shown in FIG. 5 displays.

For instance, when displaying the retrieval menu shown in FIG. 21 and when receiving the instructions "to execute" from input unit 109, display unit 108 reads a piece of message board identification information, that is, message board identification information "(1)" that has been added to the item "Kanto" included in categorization pattern information. Display unit 108 reads message board information 201 identified by message board identification information "(1)" from data storage unit 101, and displays message board information 201. FIG. 23 shows message board information 201 that is displayed on display unit 100. When the user presses cursor keys 1401 or 1402, another piece of message board information is read and displayed on display unit 108.

1.1.9 Input Unit 109

Figure 22:
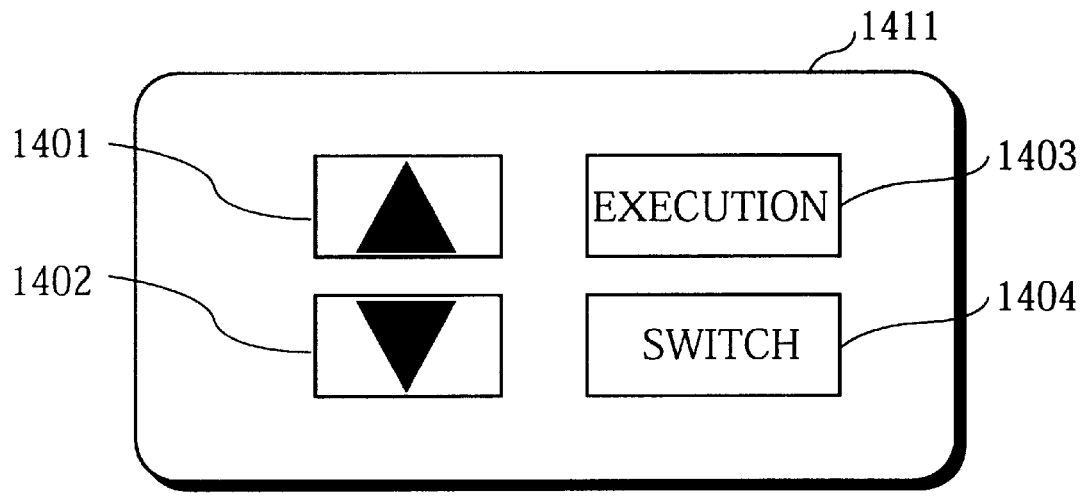
FIG. 22 shows an example of the input unit of the retrieval menu creation device whose construction is shown in FIG. 5.

Input unit 109 includes up-cursor key 1401, down-cursor key 1402, execution key 1403, and switch key 1404 as shown in FIG. 22, and accepts input from the user.

When a retrieval menu is displayed by display unit 108 and up-cursor key 1401 is pressed by the user, input unit 109 outputs the instructions "to move up" to display unit 108. When a retrieval menus is displayed by display unit 108 and down-cursor key 1402 is pressed by the user, input unit 109 outputs the instructions "to move down" to display unit 108.

When execution key 1403 is pressed by the user, input unit 109 outputs the instructions "to execute" to display unit 108.

When switch key 1404 is pressed by the user, input unit 109 outputs the instructions "to switch" to second categorization pattern selection unit 110.

While input unit 109 includes the four function keys, up-cursor key 1401, down-cursor key 1402, execution key 1403, and switch key 1404, four keys included in the keyboard of a standard computer may be assigned the function of these four function keys.

1.1.10 Second Categorization Pattern Selection Unit 110

When display unit 108 displays the retrieval menu shown in FIG. 21 and the user does not want to use the choices in the present retrieval menu, second categorization pattern selection unit 110 is used for creating another retrieval menu.

On receiving the instruction "to switch" from input unit 109, second categorization pattern selection unit 110 detects selection mark 704 "○" from categorization pattern information 700 stored in categorization pattern storage unit 103, and changes the selection mark 704 "○" to the mark "●" that indicates that the categorization pattern has been used, and writes the mark "●" in the categorization pattern information 700.

For instance, in categorization pattern information 1100 shown in FIG. 19, selection mark 1111 "○" is added to categorization pattern 1120 that is now selected. Second categorization pattern selection unit 110 reads selection mark 1111 "○", changes selection mark 1111 "○" to the mark "●", and writes the mark "●" in the categorization pattern information 1100. FIG. 24 shows categorization pattern information 1600 in which mark 1601 "●" is added to the categorization pattern that has been already used.

Second categorization pattern selection unit 110 selects the most suitable categorization pattern from the categorization patterns to which no mark "●" is added in the same manner as first categorization pattern selection unit 106. For instance, second categorization pattern selection unit 110 selects categorization pattern 1612 that is represented by categorization pattern name 1611 "price 2" in FIG. 25.

Second categorization pattern selection unit 110 adds the selection mark "○" to the selected categorization pattern that indicates that the categorization pattern has been selected. FIG. 25 shows categorization pattern information 1620 in which the selection mark "○" is added to the categorization pattern that has been newly selected. Selection mark 1602 "○" is added to categorization pattern 1612 and indicates that categorization pattern 1612 has been newly selected.

When a categorization pattern that may be selected is included in categorization pattern information 1620, that is, when a categorization pattern to which no mark "●" is added is included in categorization pattern information 1620, and when switch key 1404 is pressed, second categorization pattern selection unit 110 may select a new categorization pattern. For instance, second categorization pattern selection unit 110 may select a new categorization pattern three times more in the case of categorization pattern information 1620 shown in FIG. 25.

When second categorization pattern selection unit 110 selects a new categorization pattern, menu creation unit 107 creates a retrieval menu using the categorization pattern information that includes the categorization pattern to which the selection mark "○" is added, and display unit 108 displays the newly created retrieval menu.

1.2 The Operation by Retrieval Menu Creation Device 100

The operation by retrieval menu creation device 100 will be explained.

1.2.1 The Operation when Creating a Retrieval Menu

The operation performed by retrieval menu creation device 100 when creating a retrieval menu will be explained with reference to the flowchart shown in FIG. 26.

Data feature extraction unit 102 extracts the features from message board information 260 stored in data storage unit 101, and writes the extracted features as feature information 270 in data storage unit 101 (Step S1801). Relating unit 105 extracts feature identification information 271 from the feature information 270 stored in data storage unit 101 (Step S1802), extracts one feature 272 that is included in the feature information 270 (Step S1803), and compares the extracted feature 272 with the items included in the categorization pattern information that is stored in categorization pattern storage unit 103 (Step S1804). When one item that corresponds to the feature 272 is found in the items, relating unit 105 relates the feature information 270 to the item by adding the feature identification information 271 to the item (Step S1805). Relating unit 105 extracts a feature, compares the feature with the items, and relates the feature information 270 to the item that is found to correspond to the feature for each of the features included in the feature information 270 (Steps S1804 to S1806). Relating unit 105 extracts the feature identification information and each of the features, compares the features with the items, and relates the feature information to the items that are found to correspond to the features for each piece of the feature information that is stored in data storage unit 101 (Steps S1802 to S1807). When each piece of the feature information is related to the items, first categorization pattern selection unit 106 counts the number of items to which message board identification information is added for each of the categorization patterns (Step S1808), and selects the categorization pattern having the counted number that is closest to a predetermined most suitable number, as the most suitable categorization pattern (Step S1809). When a plurality of categorization patterns are selected at Step S1809, first categorization pattern selection unit 106 refers to priority ranking storage unit 104, and selects the categorization pattern having the highest priority ranking among the plurality of categorization patterns. First categorization pattern selection unit 106 adds a selection mark "○" to the selected categorization pattern and indicates that the categorization pattern has been selected (Step S1810). Menu creation unit 107 creates a retrieval menu that includes the choices corresponding to the items included in the selected categorization pattern (Step S1811), and display unit 108 displays the created retrieval menu (Step S1812).

1.2.2 The Operation when Pressing the Switch Key

Figure 27:
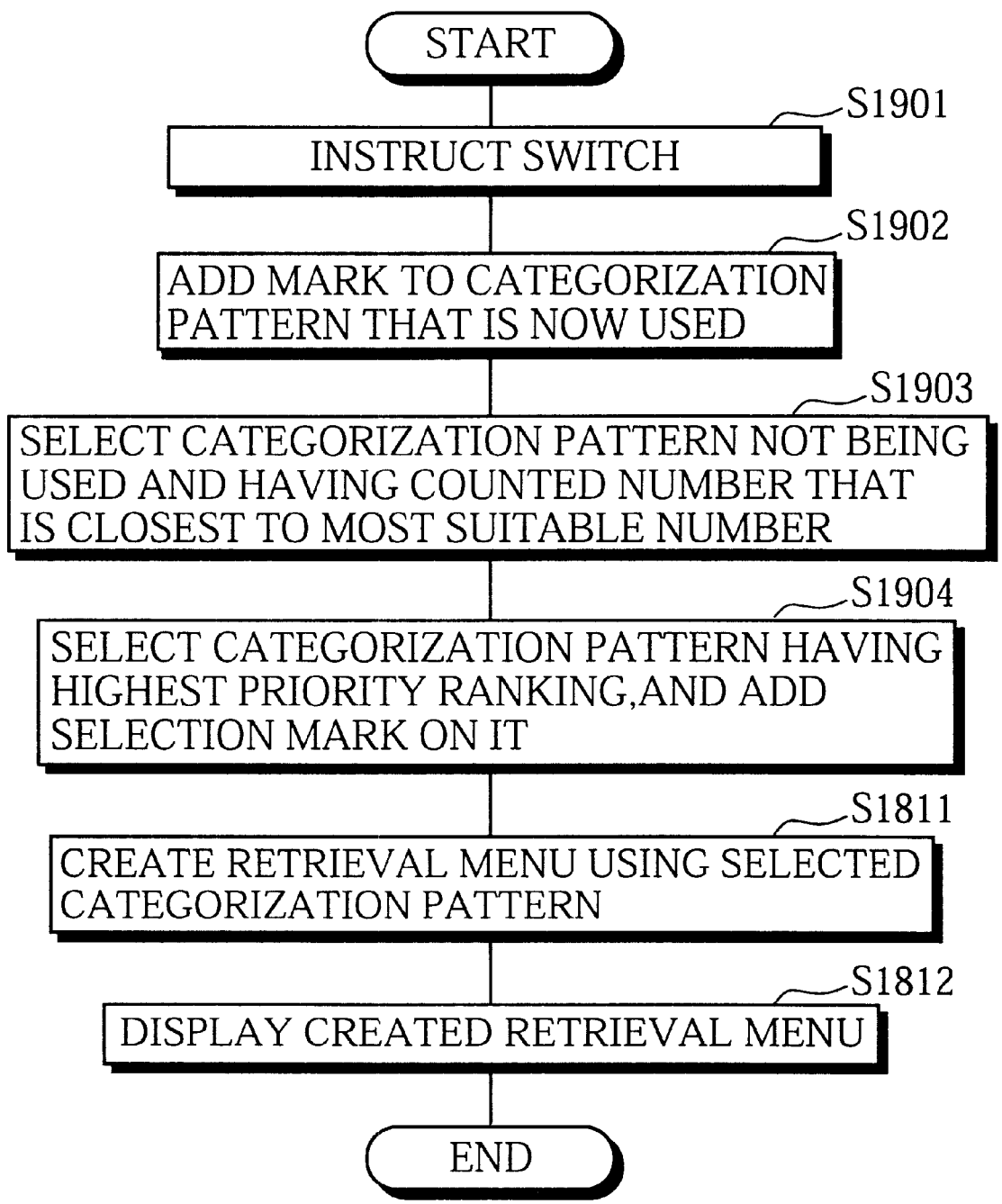
FIG. 27 is the flowchart illustrating the process for creating a retrieval menu performed by the retrieval menu creation device whose construction is shown in FIG. 5.

The operation performed by retrieval menu creation device 100 when the switch key is pressed and another retrieval menu is created with reference to the flowchart shown in FIG. 27.

Figure 26:
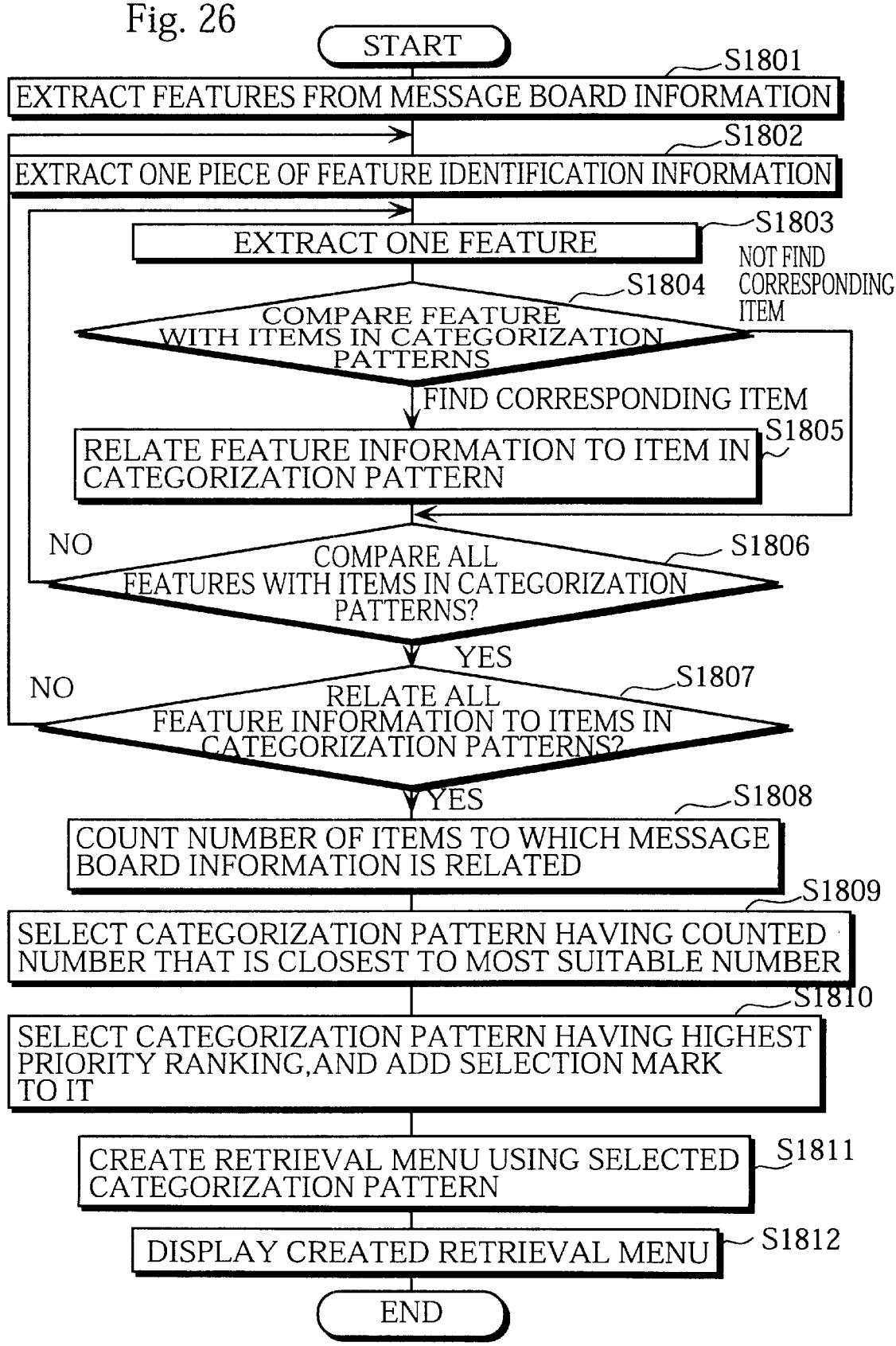
FIG. 26 is the flowchart illustrating the process performed by the retrieval menu creation device whose construction is shown in FIG. 5.

The operation performed at Steps S1811 and S1812 in FIG. 27 is the same as that performed at Steps S1811 and S1812 in FIG. 26. The operation performed at Steps S1811 and S1812 in FIG. 27 will not be explained in order to simplify the explanation.

When switch key 1404 is pressed by the user, input unit 109 outputs the instructions "to switch" to second categorization pattern selection unit 110, and instructs second categorization pattern selection unit 110 to switch the present retrieval menu to another one (Step S1901). Second categorization pattern selection unit 110 adds a mark "●" to the selected categorization pattern and indicates that the categorization pattern has been already used (Step S1902). Second categorization pattern selection unit 110 selects the categorization pattern having the number of related items that is closest to the predetermined most suitable number as the most suitable categorization pattern among the categorization patterns to which no mark "●" is added, that is, among the categorization patterns that have not been used (Step S1903). When a plurality of categorization patterns are selected at Step S1903, second categorization pattern selection unit 110 refers to priority ranking storage unit 104, and selects the categorization pattern having the highest priority ranking among the plurality of categorization patterns. Second categorization pattern selection unit 110 adds a selection mark "○" to the selected categorization pattern and indicates that the categorization pattern has been newly selected (Step S1904). Menu creation unit 107 creates a new retrieval menu using the categorization pattern to which the selection mark "○" has been newly added, and display unit 108 displays the newly created retrieval menu (Steps S1811 and S1812).

2. The Second Embodiment

Retrieval menu creation device 2100 according to the second embodiment of the present invention will be explained with reference to the figures.

2.1 The Construction of Retrieval Menu Creation Device 2100

Figure 28:
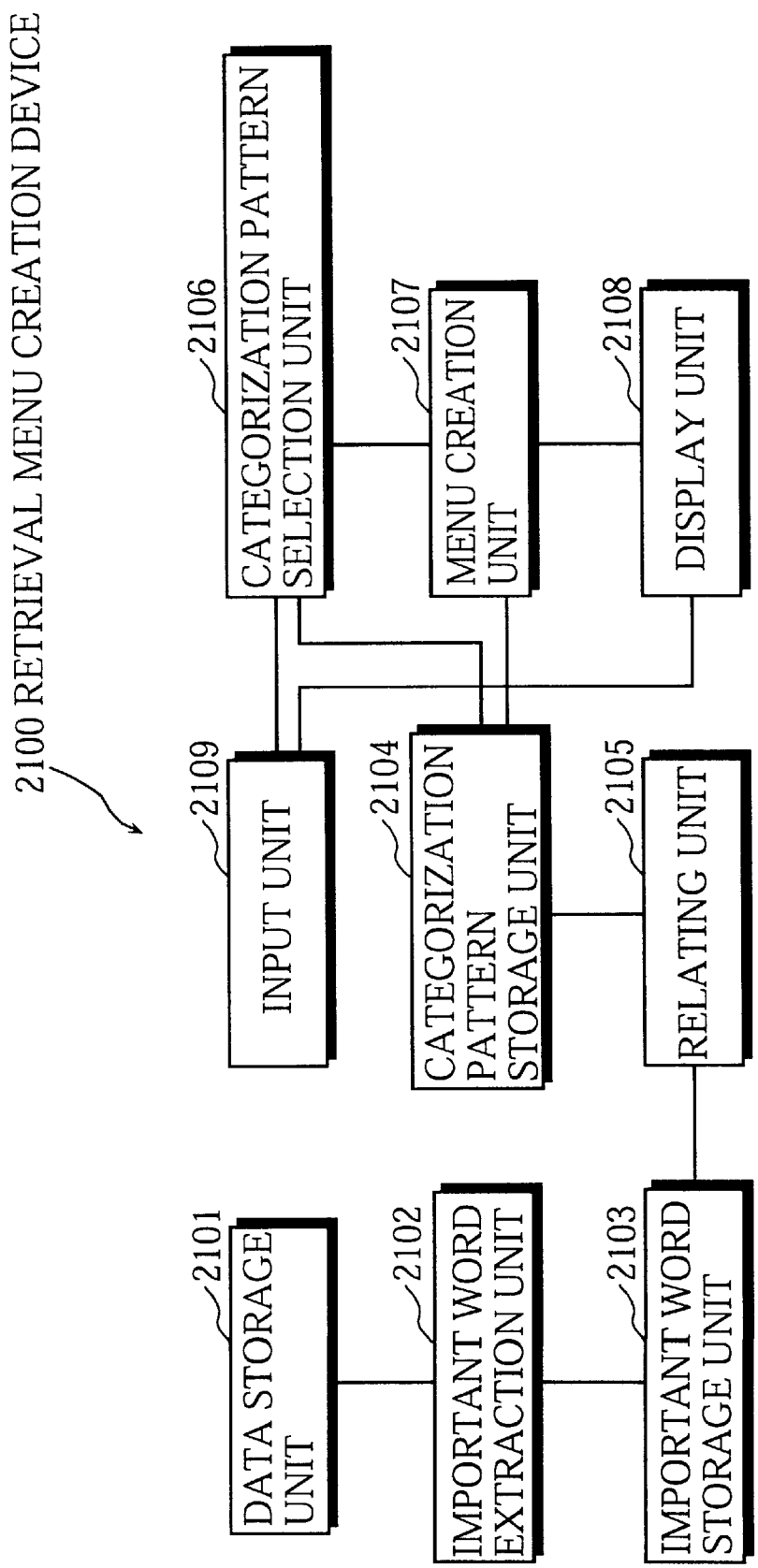
FIG. 28 shows a construction of a retrieval menu creation device according to the second embodiment of the present invention.

FIG. 28 is a block diagram that shows the construction of retrieval menu creation device 2100.

Retrieval menu creation device 2100 includes data storage unit 2101, important word extraction unit 2102, important word storage unit 2103, categorization pattern storage unit 2104, relating unit 2105, categorization pattern selection unit 2106, menu creation unit 2107, display unit 2108, and input unit 2109.

2.1.1 Data Storage Unit 2101

Data storage unit 2101 is composed of a magnetic disk unit or another storage device. Data storage unit 2101 adds an identification number to document data transmitted via a network, and stores the document data to which an identification number is added. An identification number is the number for specifying a piece of document data. Identification numbers are allotted to document data according to the reception order of the document data.

Figure 29:
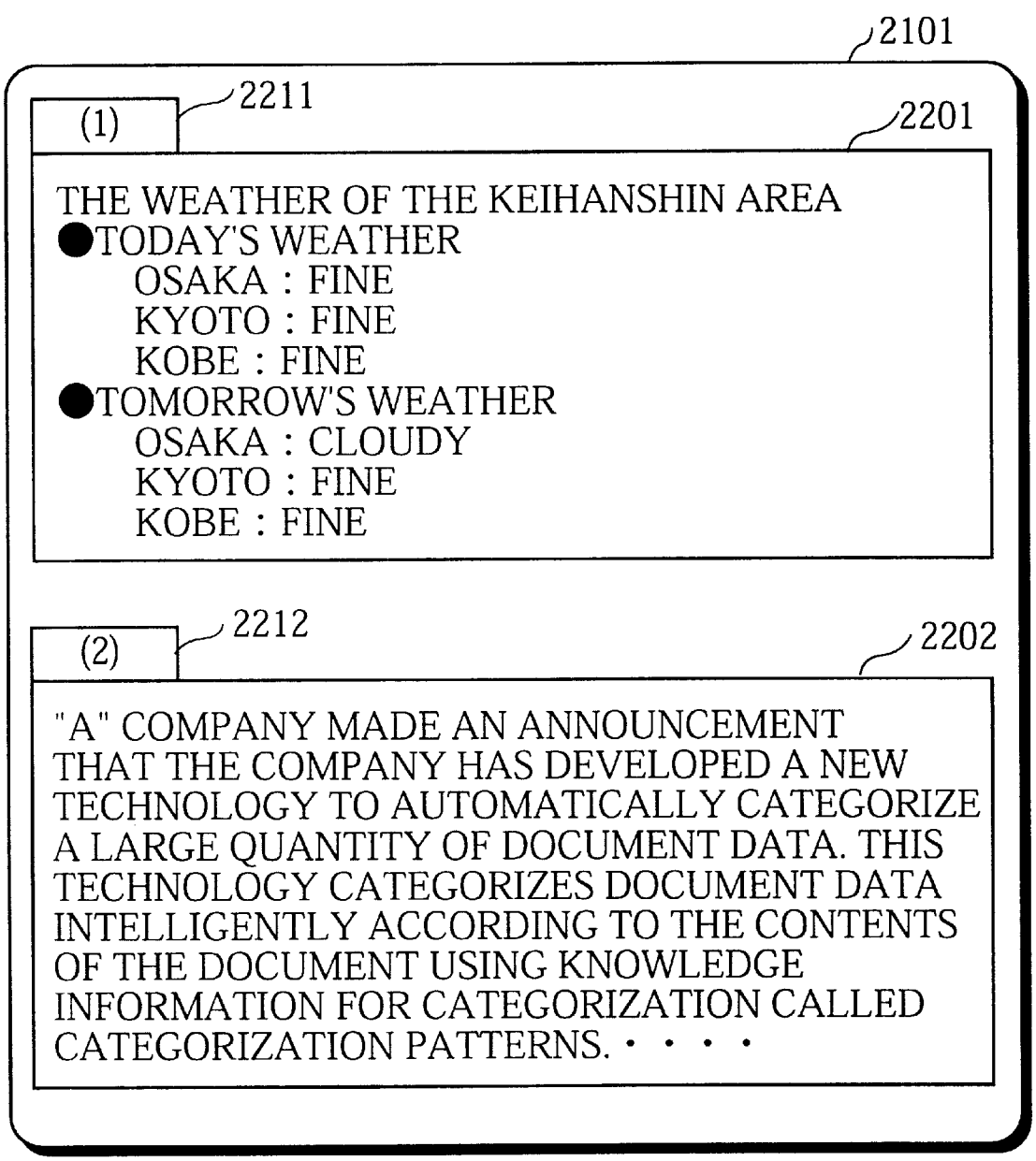
FIG. 29 shows examples of the data that the data storage unit of the retrieval menu creation device whose construction is shown in FIG. 28 stores.

Data storage unit 2101 stores document data 2201, 2202, and the like as shown in FIG. 29. Document data 2201, 2202, or the like represents a newspaper article obtained via a network. Identification numbers 2211 "(1)" and 2212 "(2)" are added to document data 2201 and 2202, respectively.

2.1.2 Important Word Extraction Unit 2102

Important word extraction unit 2102 reads the document data that is stored in data storage unit 2101, performs a morphological analysis on each piece of the read document data, and divides the document data into at least one morpheme.

When the document data is written in Japanese, important word extraction unit 2102 extracts at least one content word from one of the morphemes into which the document data is divided. When the document data is written in English, important word extraction unit 2102 includes a stop word list in which the words that represent no important words are registered. More specifically, prepositions and substantive verbs are stored in the stop word list. Important word extraction unit 2102 excludes the morphemes that are registered in the stop word list.

Important word extraction unit 2102 counts the frequency in the use of a content word in a piece of document data for each of the extracted content words that are included in the document data, and extracts the content words up to a predetermined number in the order of decreasing frequency, with determining the predetermined number of content words as the important words. An important word is an example of a feature.

Important word extraction unit 2102 reads the identification number that is added to the document data stored in data storage unit 2101.

Important word extraction unit 2102 outputs the read identification number and the predetermined number of content words to important word storage unit 2103.

Important word extraction unit 2102 extracts the important words and reads the identification number for each of the document data that is stored in data storage unit 2101, and outputs the identification numbers and the predetermined number of content words, that is, the important words to important word storage unit 2103.

In this specification, a content word represents a noun, an adjective, a verb, or an adverb that conveys a substantial meaning, that is, a concept or an image.

The operation by important word extraction unit 2102 will be explained using document data 2201 shown in FIG. 29 as an example.

Important word extraction unit 2102 performs a morphological analysis on document data 2201 stored in data storage unit 2101, and divides document data 2201 into words as shown in FIG. 30. The "/" in FIG. 30 represents the end of one word. Important word extraction unit 2102 extracts content words as the candidates for the important words from the words shown in FIG. 30, and counts the frequency in the use of a content word in document data 2201 for each of the content words. FIG. 31 shows the ten extracted words and the frequency in the use of each of the words in document data 2201. Important word extraction unit 2102 extracts five content words from the ten extracted content words, that is, the ten candidates for the important words in the order of decreasing frequency, and determines the five content words as the important words. The five words, "fine", "weather", "Osaka", "Kyoto", and "Kobe" are extracted as the important words.

While important word extraction unit 2102 extracts the important words according to the frequency in the use in document data 2201 in the present embodiment, important word extraction unit 2102 may extract the important words in another manner.

Important word extraction unit 2102 may determine the important words according to the position in which a word is included in document data. For instance, the word that is included in the title of the top of document data may be determined as an important word.

Important word extraction unit 2102 may determine the important words according to the function of a word in document data. For instance, important word extraction unit 2102 performs a morphological analysis on document data, divides the document into morphemes, and analyzes the grammatical construction of the sentence using the morphemes for finding the sentence structure, with finding the subjects included in the document data. Important word extraction unit 2102 may determine the subjects as the important words.

Important word extraction unit 2102 may compare the frequency in the use of a word in standard document data with that in the document data to be retrieved, and determine the important words according to the comparison. More specifically, important word extraction unit 2102 may determine the word that is included in the document data to be retrieved more frequently than in the standard document data as an important word.

While the number of important words is five in the present embodiment, the number may be any, for instance, four, three, six, or seven. The content word that is used in a piece of document data more than a predetermined number of times may be determined as an important word, and any number of content words may be determined as important words.

2.1.3 Important Word Storage Unit 2103

Important word storage unit 2103 receives the identification number and the predetermined number of important words from important word extraction unit 2102 for each piece of document data, and stores the identification numbers and the important words as important word information 2530. As receiving the same number of identification numbers and the same number of sets of important words as the number of pieces of document data stored in data storage unit 2101, important word storage unit 2103 stores the same number of pieces of important word information 2530 as the number of pieces of document data stored in data storage unit 2101. Important word storage unit 2103 is composed of a memory or another storage device.

Figure 32:
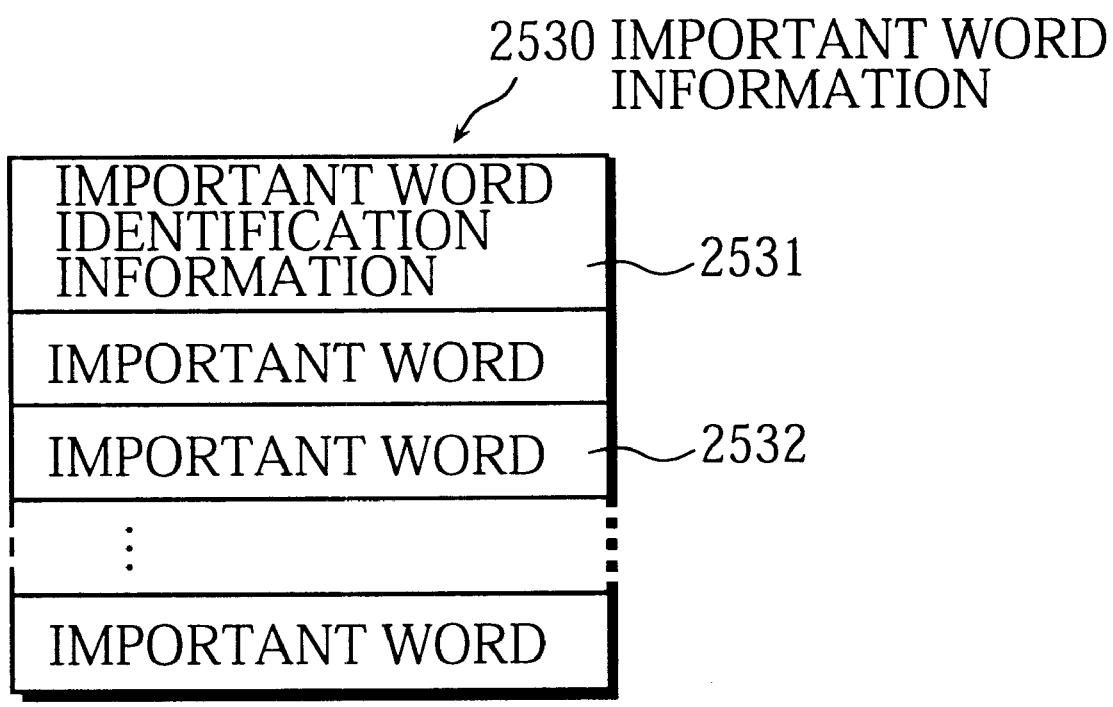
FIG. 32 shows the data structure of the important word information that the important word storage unit of the retrieval menu creation device whose construction is shown in FIG. 28 stores.

FIG. 32 shows the construction of important word information 2530. Important word information 2530 includes important word identification information 2531 and a predetermined number of important words 2532. Important word identification information 2531 represents the identification number that important word storage unit 2103 has received from important word extraction unit 2102. The predetermined number of important words represent the important words that important word storage unit 2103 has received from important word extraction unit 2102.

The predetermined number represents the number of the content words extracted by important word extraction unit 2102. Important word extraction unit 2102 counts the frequency in the use of a content word in a piece of document data for each of the content words, and extracts content words in the order of the decreasing frequency up to the predetermined number.

Figure 33:
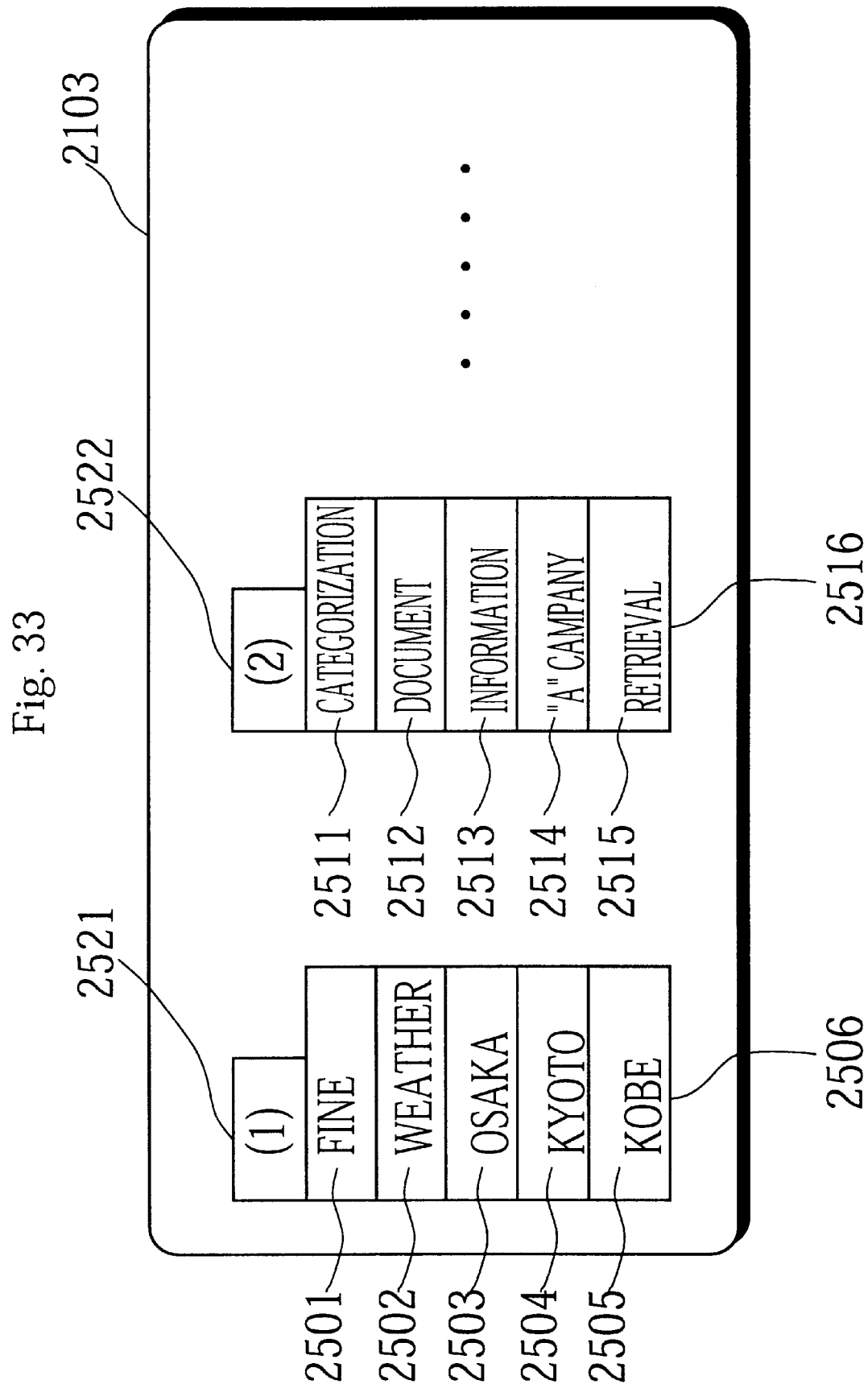
FIG. 33 shows examples of the important word information that the important word storage unit of the retrieval menu creation device whose construction is shown in FIG. 28 stores.

FIG. 33 shows an example of important word storage unit 2530 stored in important word storage unit 2103. As shown in FIG. 33, important word information 2103 stores important word information 2506 and 2516, important word information 2506 includes important word identification information 2521 and important words 2501 to 2505, and important word information 2516 includes important word identification information 2522 and important words 2511 to 2515.

Important words 2501 to 2505 have been extracted from document data 2201, and important words 2511 to 2515 have been extracted from document data 2202. Important word identification information 2521 and identification number 2211 included in document data 2201 represents the same information, and important word identification information 2522 and identification number 2212 included in document data 2202 represents the same information. This means that important word information 2506 corresponds to document data 2201, and important word information 2516 corresponds to document data 2202.

2.1.4 Categorization Pattern Storage Unit 2104

Categorization pattern storage unit 2104 stores categorization pattern information 2700 that categorizes document data according to the key words. Categorization pattern storage unit 2104 is composed of a magnetic disk unit or another storage device.

Figure 34:
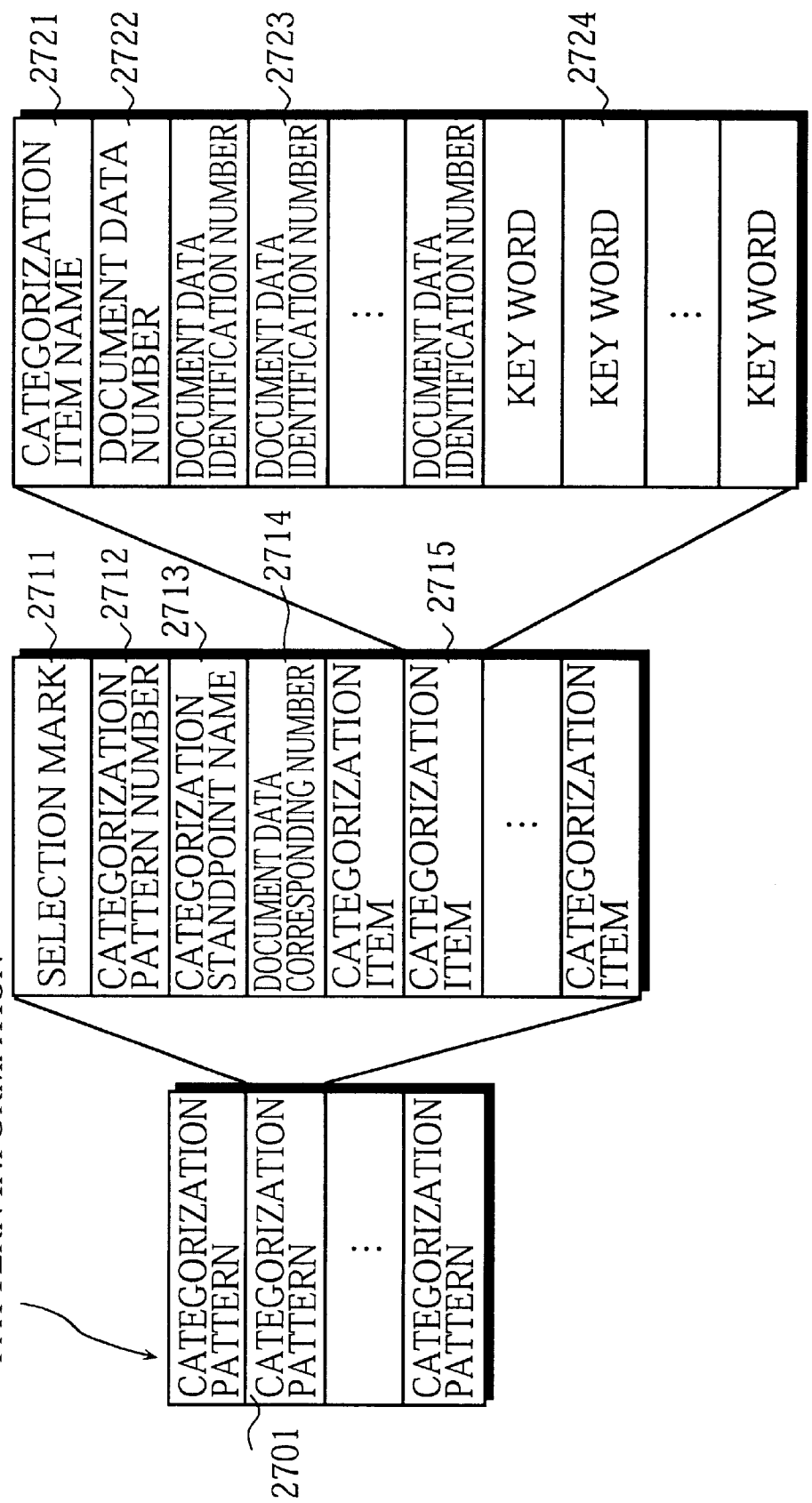
FIG. 34 shows the data structure of the categorization pattern information that the categorization pattern storage unit in the retrieval menu creation device whose construction is shown in FIG. 28 stores.

Categorization pattern information 2700 includes at least one categorization pattern 2701 as shown in FIG. 34.

Categorization pattern 2701 includes selection mark 2711, categorization pattern number 2712, categorization standpoint name 2713, document data corresponding number 2714, and at least one categorization item 2715. One categorization item 2715 includes categorization item name 2721, document data number 2722, document data identification number 2723, and at least one key word 2724.

The function of selection mark 2711 is the same as that of selection mark 704, and the explanation will not given in order to simplify the explanation.

Categorization pattern number 2712 identifies categorization pattern 2701.

Categorization standpoint name 2713 represents the title of categorization pattern 2701.

Document data corresponding number 2714 represents the number of types of the document data that is identified by the document data identification numbers included in categorization pattern 2701.

Categorization item name 2721 represents the name of categorization item 2715.

Document data number 2722 represents the number of document data identification numbers that are included in categorization item 2715.

Document data identification number 2723 identifies the corresponding document data stored in data storage unit 2101.

Key word 2724 is used when a piece of document data is related to a categorization item.

FIG. 35 shows categorization pattern information 2600 as an example of categorization pattern information 2700 stored in categorization pattern storage unit 2104. As shown in FIG. 35, categorization pattern storage unit 2104 stores categorization pattern information 2600. Categorization pattern information 2600 includes categorization patterns 2601, 2602, and 2603.

Categorization pattern 2601 includes categorization standpoint 2611 "Eight Regions of Japan", categorization pattern number 2612 "(1)" that identifies the corresponding categorization pattern, and categorization items 2631, 2632, 2633, 2634, 2635, 2636, 2637, and 2638.

Categorization item 2631 includes categorization item name 2621 "Hokkaido", and key words 2641 "Hokkaido", 2642 "Sapporo", 2643 "Asahikawa", 2644 "Hakodate", 2645 "Kushiro", 2646 "Otaru", and 2647 "Tomakomai".

Categorization item 2632 includes categorization item name, and a plurality of key words.

Categorization items 2633, 2634, 2635, 2636, 2637, and 2638 also includes categorization item names and key words.

2.1.5 Relating Unit 2105

(1) Relating an Important Word to a Set of a Categorization Pattern and a Categorization Item Relating unit 2105 reads important word 2501 "fine" from important word information 2506 stored in important word storage unit 2103.

Relating unit 2105 reads key word 2641 "Hokkaido" that is included in categorization item 2631 in categorization pattern 2601 in categorization pattern information 2600 stored in categorization pattern storage unit 2104, and compares important word 2501 "fine" with key word 2641 "Hokkaido". On finding that key word 2641 "Hokkaido" does not correspond to important word 2501 "fine", relating unit 2105 reads the next key word, key word 2642 "Sapporo" that is included in categorization item 2631, and compares important word 2501 "fine" with key word 2642 "Sapporo". Relating unit 2105 reads each of the key words that are included in categorization item 2631 one after another and compares each of the key words with important word 2501 "fine" before finding the key word that corresponds to important word 2501 "fine".

Relating unit 2105 finds that none of the key words that are included in categorization item 2631 corresponds to important word 2501 "fine". Relating unit 2105 reads each of the key words that are included in categorization item 2632 one after another and compares each of the key words with important word 2501 "fine" before finding the key word that corresponds to important word 2501 "fine".

On finding that none of the key words that are included in categorization item 2632 corresponds to important word 2501 "fine", relating unit 2105 reads each of the key words that are included in categorization items 2633 to 2638 one after another and compares each of the key words with important word 2501 "fine" before finding the key word that corresponds to important word 2501 "fine".

On finding no key word that corresponds to important word 2501 "fine" in categorization pattern 2601, relating unit 2105 reads each of the key words that are included in categorization patterns 2602, 2603, and the like one after another and compares each of the key words with important word 2501 "fine" before finding the key word that corresponds to important word 2501 "fine". As a result, relating unit 2105 finds no key word that corresponds to important word 2501 "fine" in categorization pattern information 2600. Then relating unit 2105 reads important word 2502 "weather" from important word information 2506 that is stored in important word storage unit 2103, and searches for the key word that corresponds to important word 2502 "weather" in categorization pattern information 2600. As a result, relating unit 2105 finds the key word that corresponds to important word 2502 "weather" in the key words that are included in the sixth categorization item in the categorization pattern that is represented by categorization pattern number "(14)" and is not shown in FIG. 35. Relating unit 2105 stores important word 2502 "weather", categorization pattern number "(14)", and the sixth categorization item, with relating important word 2502 "weather" to the set of categorization pattern number "(14)" and the number identifying the categorization item.

In the same manner, relating unit 2105 reads important words 2503 "Osaka", 2504 "Kyoto", 2505 "Kobe" included in important word information 2506 that is stored in important word storage unit 2103 one after another, and searches for the corresponding key word for each of important words 2503 "Osaka", 2504 "Kyoto", 2505 "Kobe" in the key words that are included in categorization pattern information 2600. When finding the corresponding key word, relating unit 2105 stores the important word, the categorization pattern number that includes the corresponding key word, and the categorization item that includes the corresponding key word, with relating the important word to the set of the categorization pattern number and the number identifying the categorization item.

In this manner, when finding the key word corresponding to an important word for each of the important words included in a piece of important word information that is stored in important word storage unit 2103 from categorization pattern information 2600, relating unit 2105 stores the important word, the categorization pattern number, and the number identifying the categorization item as shown in FIG. 36. More specifically, relating unit 2105 stores important word 2802 "weather", categorization pattern number 2821 "(14)", and the number identifying a categorization item 2822 "(6)", with relating important word 2802 "weather" to the set of categorization pattern number 2821 "(14)" and the number identifying a categorization item 2822 "(6)". Relating unit 2105 stores important word 2803 "Osaka", categorization pattern number 2831 "(1)", and the number identifying a categorization item 2832 "(5)", categorization pattern number 2833 "(12)", and the number identifying a categorization item 2834 "(2)", with relating important word 2803 "Osaka" to the set of categorization pattern number 2831 "(1)" and the number identifying a categorization item 2832 "(5)", and to the set of categorization pattern number 2833 "(12)" and the number identifying a categorization item 2834 "(2)". Relating unit 2105 stores important word 2804 "Kyoto", categorization pattern number 2841 "(1)", and the number identifying a categorization item 2842 "(5)", with relating important word 2804 "Kyoto" to the set of categorization pattern number 2841 "(1)" and the number identifying a categorization item 2842 "(5)". Relating unit 2105 stores important word 2805 "Kobe", categorization pattern number 2851 "(1)", and the number identifying a categorization item 2852 "(5)", with relating important word 2805 "Kobe" to the set of categorization pattern number 2851 "(1)" and the number identifying a categorization item 2852 "(5)". In this example, relating unit 2105 relates important word 2801 "fine" to no set of a categorization pattern number and the number identifying a categorization item.

(2) Exclusion of the Repetition of a Set

The set of the categorization pattern number "(1)" and the number identifying a categorization item "(5)" is found three times in FIG. 36. Relating unit 2105 excludes the two repetitions of the set. Relating unit 2105 stores set 2861 that is the set of categorization pattern number "(14)" and the number identifying a categorization item "(6)", set 2862 that is the set of categorization pattern number "(1)" and the number identifying a categorization item "(5)", and set 2863 that is the set of categorization pattern number "(12)" and the number identifying a categorization item "(2)" as shown in FIG. 37.

(3) Relating Document Identification Numbers

The categorization pattern numbers and the numbers that identify the categorization items shown in FIG. 37 are related to each other using the important words extracted from document data 2201. In the case of set 2862, for instance, relating unit 2105 adds identification number "(1)" to categorization item 2635 that is included in categorization pattern 2601 as shown in FIG. 38 in order to relate document data 2201 to categorization item 2635.

(4) Writing the Number of Pieces of Document data

Relating unit 2105 counts the number of the identification numbers that are added to a categorization item for each of the categorization items, and writes the counted number in the categorization item for each of the categorization items.

Relating unit 2105 counts the number of types of the document data that is related to the categorization items included in a categorization pattern for each of the categorization patterns, and stores the counted number of types of the document data as the document data corresponding number in the categorization pattern for each of the categorization patterns. Even when a piece of document data is repeatedly related to a plurality of categorization items, the document data is counted once.

Figure 39:
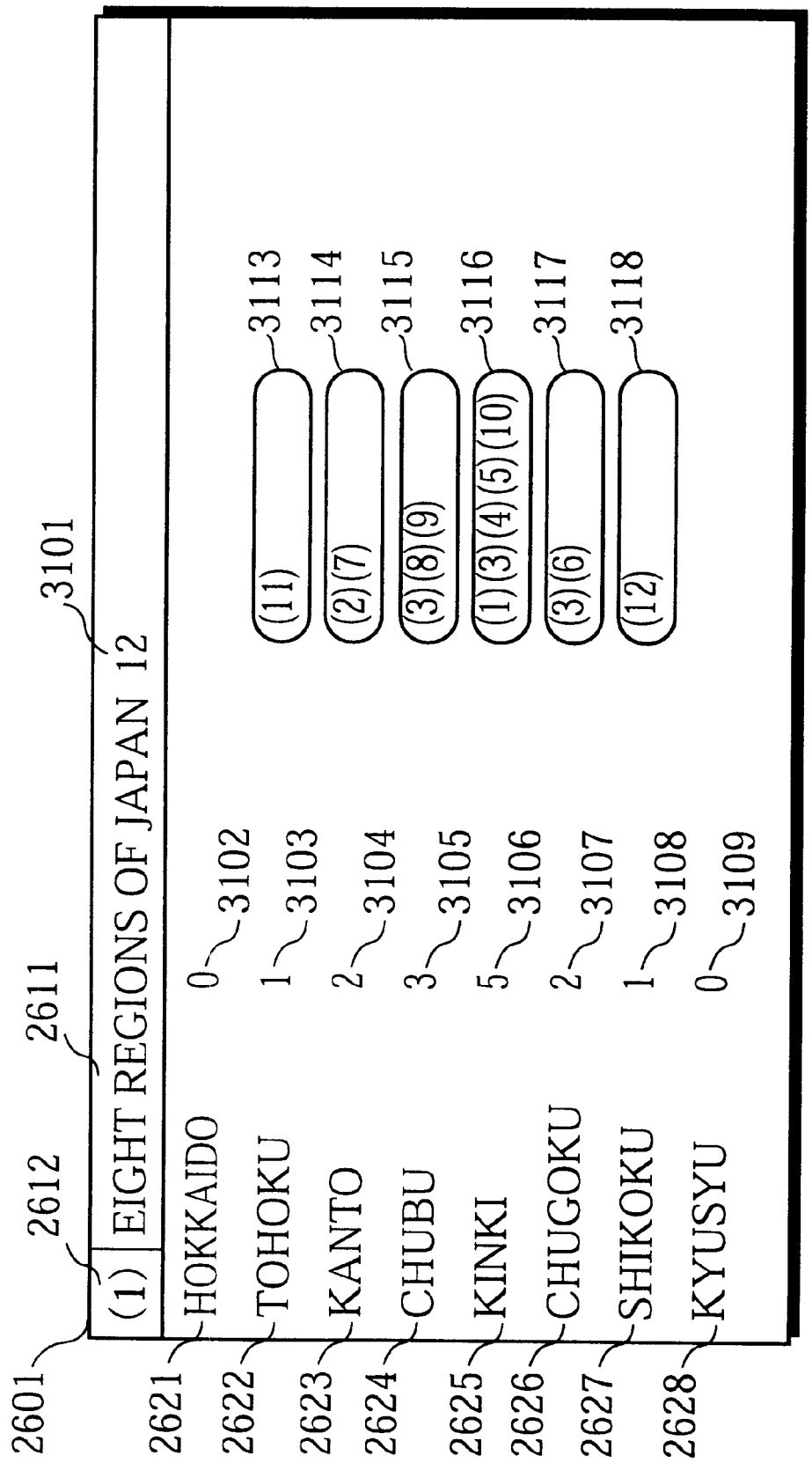
FIG. 39 shows a categorization pattern that document data identification numbers are added to and the categorization pattern storage unit of the retrieval menu creation device whose construction is shown in FIG. 28 stores.

FIG. 39 shows categorization pattern 2601 when relating unit 2105 finishes writing the counted number in the categorization item for each of the categorization items and storing the counted number of types of the document data in the categorization pattern for each of the categorization patterns. In FIG. 39 the key words that are included in the categorization items corresponding to the categorization item names are not shown.

In FIG. 39, reference numbers 3113 to 3118 represent the identification numbers that are added to each of the categorization items, each of reference numbers 3102 to 3109 represents the number of piece of the document data that has been related to each of the categorization items, and reference number 3101 represents the document data corresponding number. While the number of pieces of the document data that is added to the categorization items sums up to "14", the number of types of the document data that is added to the categorization patterns is "12" since the identification number "(3)" is added to the three categorization items. As a result, the document data corresponding number is "12".

2.1.6 Categorization Pattern Selection Unit 2106

Categorization pattern selection unit 2106 selects categorization patterns using the categorization pattern information in which document data is related to the categorization items. Categorization pattern selection unit 2106 evaluates the categorization patterns using the evaluation expression, expression "1" shown in FIG. 40A.

Figures 40A, 40B:
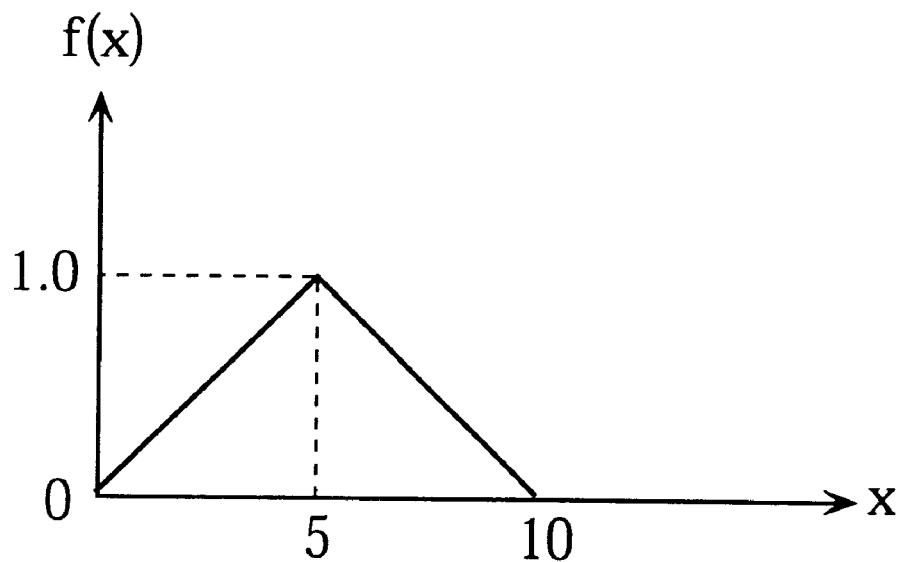
FIG. 40A shows an evaluation expression that is used when the categorization pattern selection unit of the retrieval menu creation device whose construction is shown in FIG. 28 evaluates categorization patterns.
FIG. 40B shows the function in the second term of an evaluation expression that is used when the categorization pattern selection unit of the retrieval menu creation device whose construction is shown in FIG. 28 evaluates categorization patterns.

In expression "1", the value "P" represents the evaluation value of a categorization pattern, the value "n" in the first term represents the number of pieces of document data that is related to the categorization items included in the categorization pattern. The value "m" in the second term represents the number of categorization items to which document data is related. FIG. 40B shows that the number of categorization items is the argument in the function f(x). When the value "x" is "5", the value of the function t(x) is a maximum of "1". When the value "x" is "0" or "10", the value of the function f(x) is a minimum of "0". The value "$\sigma^2$" in the third term represents the variance of the number of pieces of the document data. The values "$\alpha$", "$\beta$", and "$\gamma$" represent constants.

The first term in the expression "1" shows that the evaluation value of a categorization pattern increases as the number of pieces of the document data that is related to the categorization items in the categorization pattern increases. The second term in the expression "1" shows that the evaluation value of a categorization pattern increases as the number of categorization items that document data is related to and is included in the categorization pattern becomes closer to "5". The third term in the expression "1" shows that the evaluation value of a categorization pattern increases as the variance of the number of piece of the document data that is related to the categorization items in the categorization pattern decreases.

The evaluation value of categorization pattern 2601 shown in FIG. 39 will be calculated below using the evaluation expression, expression "1". The value of each of the constants "$\alpha$", "$\beta$", and "$\gamma$" is "1".

The document data corresponding number of categorization pattern 2601 is "12". The value of the first term in the evaluation expression, expression "1" is "12".

In categorization pattern 2601, the number of categorization items to which document data is related is "6". The value of the second term in the evaluation expression, expression "1" is "0.8" using the function f(x) shown in FIG. 40B.

Then the value of the third term in the evaluation expression, expression "1" is obtained by focusing on the categorization items to which document data is related. The average number of pieces of the document data that is related to each of the above-mentioned categorization items is calculated. The average number is (1+2+3+5+2+1)/6= 2.33. The variance of the number of pieces of the related document data is calculated using the calculated average number. $\sigma^2=(1-2.33)^2+(2-2.33)^2+(3-2.33)^2+(5-3.22)^2+(2-2.33)^2+(1-2.33)^2=11.33$. The value of the third term in the evaluation expression, expression "1" is 1/(1+11.33)–0.08.

The evaluation value of categorization pattern 2601 is 12+0.8+0.08–12.88.

The value of each of the constants "$\alpha$", "$\beta$", and "$\gamma$" is set as "1" in the present embodiment. These variants are included in the expression for maintaining the balance among the value of each of the terms, so that the value of each of the constants may be set as any number.

Due to the first term in the evaluation expression, expression "1", a retrieval menu is created based on the categorization pattern including the largest number of the categorization items to which input data is related with the highest priority. As a result, useful retrieval menus may be created. Due to the second term in the evaluation expression, expression "1", a retrieval menu is created based on the categorization pattern including the most appropriate number of categorization items to which input data is related with the highest priority. As a result, useful retrieval menus may be created. Due to the third term in the evaluation expression, expression "1", a retrieval menu is created based on the categorization pattern in which the number of pieces of input data related to each of the categorization items is most equally distributed with the highest priority. As a result, useful retrieval menus may be created.

As mentioned above, categorization pattern selection unit 2106 calculates the evaluation value of each of the categorization patterns, and selects the categorization pattern that has the greatest evaluation value as the most appropriate categorization pattern.

Categorization pattern selection unit 2106 adds a selection mark "o" to the categorization pattern that has been selected as the most appropriate categorization pattern.

2.1.7 Menu Creation Unit 2107

Menu creation unit 2107 extracts the categorization pattern to which categorization pattern selection unit 2106 adds a selection mark "o" from categorization pattern storage unit 2104, and extracts the categorization standpoint name and the categorization items to which document data identification numbers are added from the extracted categorization pattern, Menu creation unit 2107 extracts at least one set of a categorization item name included in the extracted categorization items and the number of pieces of the document data that is related to the corresponding categorization item, with outputting the categorization standpoint name and each of the extracted sets to display unit 2108. When selecting categorization pattern 2601 shown in FIG. 39, menu creation unit 2107 creates a table which includes the categorization standpoint name and sets of a categorization item name and the number of pieces of document data that is related to the corresponding categorization item as shown in FIG. 41A.

2.1.8 Display Unit 2108

Display unit 2108 receives the categorization standpoint name and at least one set of a categorization item name and the number of pieces of document data that is related to the corresponding categorization item from menu creation unit 2107. Display unit 2108 displays a bar chart that includes the categorization standpoint, each of the received sets, and a bar whose length is proportional to the number of pieces of document data for each of the received sets as a retrieval menu. Display unit 2108 also displays a cursor for selecting a categorization item.

Figures 41A, 41B:
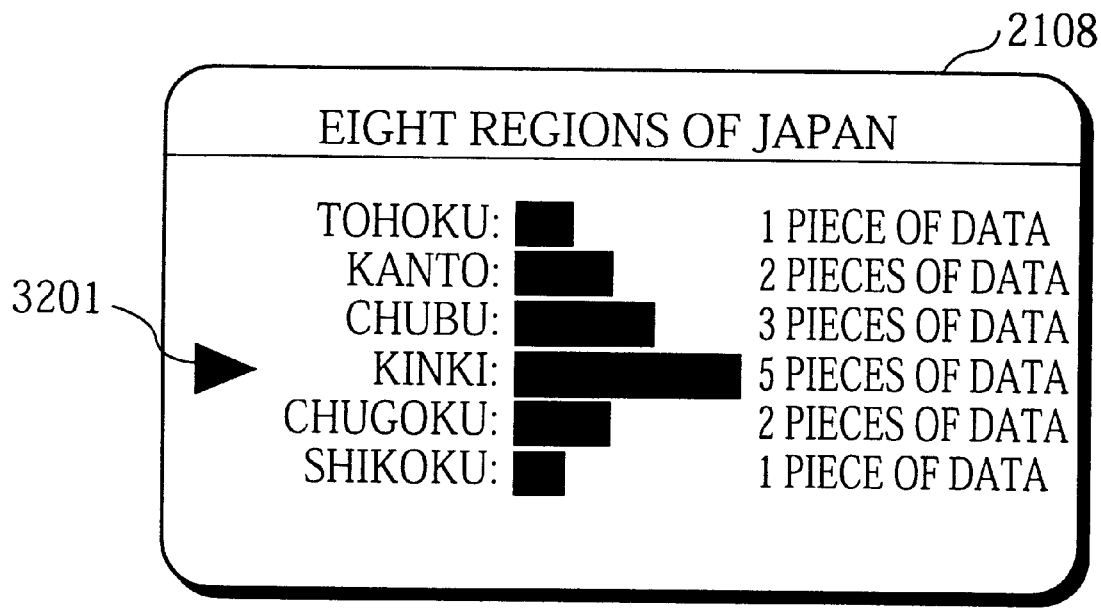
FIG. 41A shows a retrieval menu that the menu creation unit of the retrieval menu creation device whose construction is shown in FIG. 28 creates.
FIG. 41B shows a retrieval menu that the display unit of the retrieval menu creation device whose construction is shown in FIG. 28 displays.

FIG. 41B shows a retrieval menu that display unit 2108 creates. FIG. 41B also shows cursor 3201 for selecting input data.

When receiving the instructions "to move up" from input until 2109, display unit 2108 moves cursor 3201 so that the cursor indicates the categorization item that is placed one line above the previously indicated categorization item. When receiving the instructions "to move down" from input unit 2109, display unit 2100 moves cursor 3201 so that the cursor indicates the categorization item that is placed one line below the previously indicated categorization item.

When receiving the instructions "to select" from input unit 2109, display unit 2108 reads a document data identification number that has been added to the categorization item represented by the categorization item name that cursor 3201 indicates, and reads the document data that is identified by the read document data identification number from data storage unit 2101. Display unit 2108 displays the read document data.

More specifically, when displaying the retrieval menu shown in FIG. 41B and receiving the instructions "to select" from input unit 2109, display unit 2108 reads document data identification number "(1)" that has been added to the categorization item represented by the categorization item name "Kinki". Display unit 2108 reads document data 2201 that is identified by document data identification number "(1)" from data storage unit 2101, and displays document data 2201.

Display unit 2108 may display each of the received sets of a categorization item name and the number of pieces of document data as a retrieval menu.

2.1.9 Input Unit 2109

Figure 42:
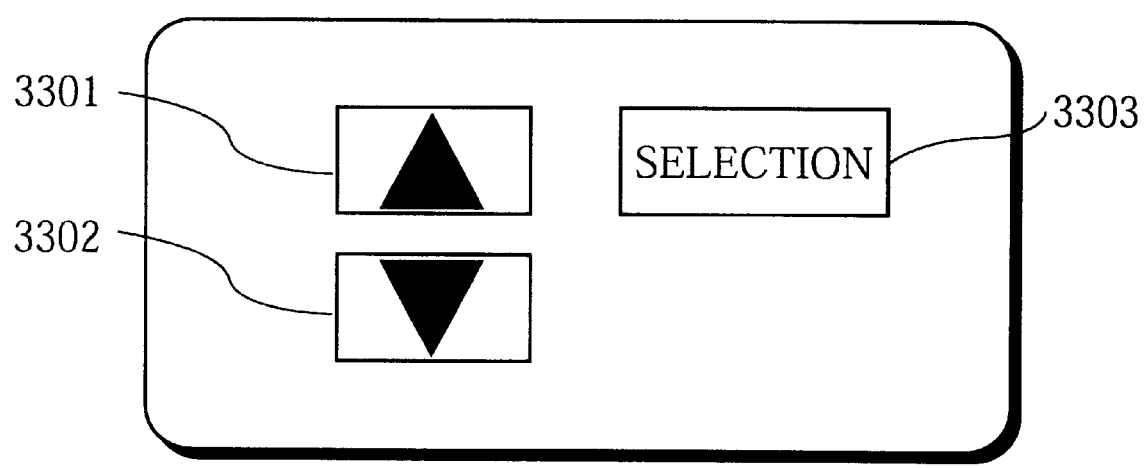
FIG. 42 shows is an example of the input unit of the retrieval menu creation device whose construction is shown in FIG. 28.

Input unit 2109 accepts the input from the user. FIG. 42 shows that input unit 2109 included up-cursor key 3301, down-cursor key 3302, and selection key 3303.

When up-cursor key 3301 is pressed by the user, input unit 2109 outputs the instructions "to move up" to display unit 2108. When down-cursor key 3302 is pressed by the user, input unit 2109 outputs the instructions "to move down" to display unit 2108.

When selection key 3303 is pressed by the user, input unit 2109 outputs the instructions "to select" to display unit 2108.

2.2 The Operation of Creating a Retrieval Menu by Retrieval Menu Creation Device 2100

Figure 43:
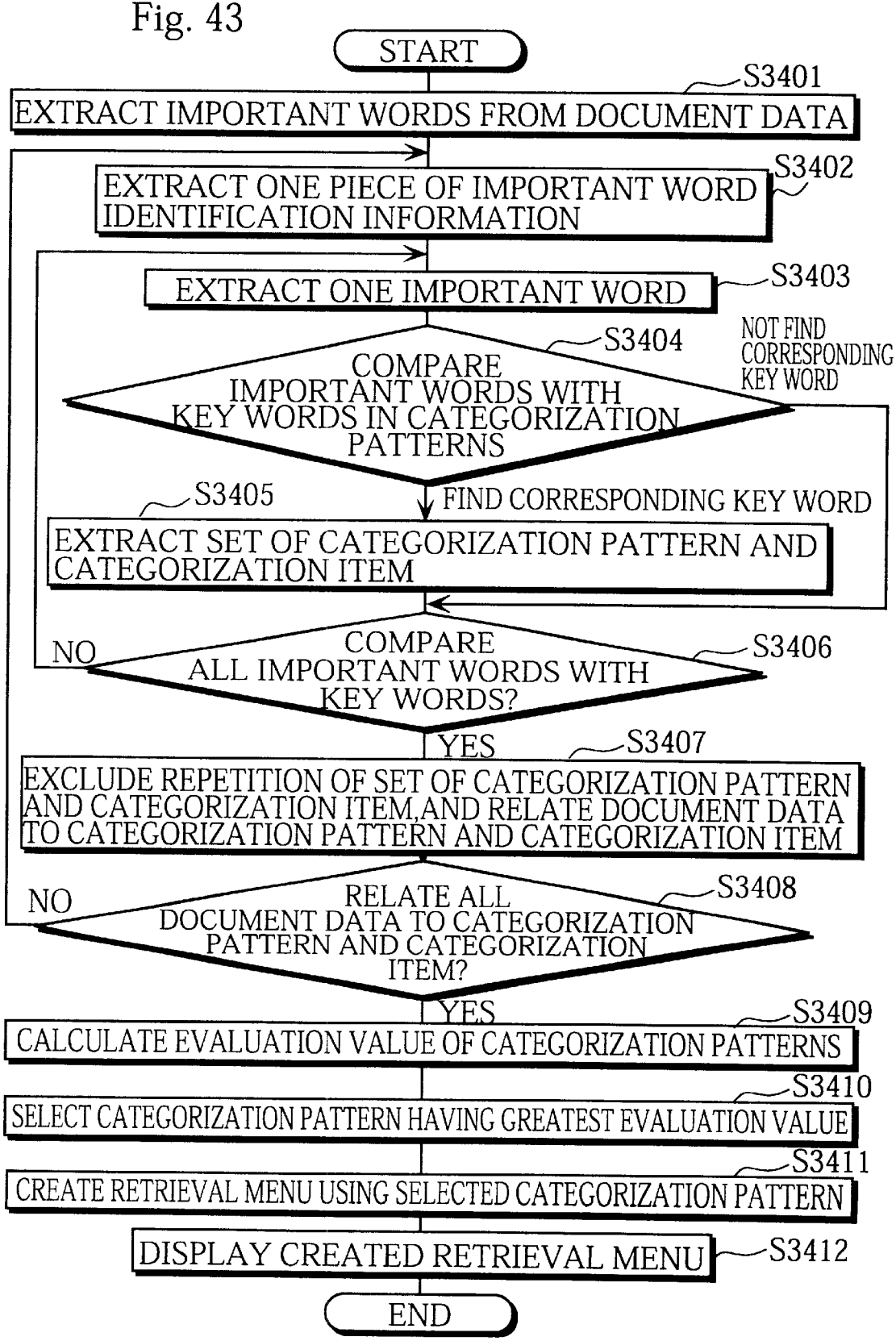
FIG. 43 is a flowchart illustrating the process performed by the retrieval menu creation device whose construction is shown in FIG. 28.

The operation of creating a retrieval menu by retrieval menu creation device 2100 a construction of which is shown in FIG. 28 will be explained with reference to the flowchart shown in FIG. 43.

Important word extraction unit 2102 extracts important words from each piece of the document data that is stored in data storage unit 2101. Important word storage unit 2103 stores the extracted important words as important word information for each piece of the document data (step S3401). Relating unit 2105 extracts the important word identification information that is included in a piece of important word information from important word storage unit 2108 (Step S3402), and extracts one important word from the important word information that is identified by the extracted important word identification information (Step S3403). Relating unit 2105 compares the extracted important word with the key words that are included in the categorization patterns stored in categorization pattern storage unit 2104 (Step S3404), and when finding the key word that corresponds to the important word, extracts the number of the categorization pattern and the number identifying the categorization item that includes the key word (Step S3405).

Relating unit 2105 extracts each of the important words from the important word information that is identified by the extracted important word identification information, and performs the above-described comparison and extraction for each of the important words (Steps S3404 to S3406). Relating unit 2105 excludes the repetition of the set of an extracted categorization pattern number and the extracted number identifying a categorization item, and relates the document data that includes the important words to the categorization items included in the categorization patterns by adding the important word identification information to the corresponding categorization items (Step S3407). Relating unit 2105 performs the above-described comparison and relating for each piece of the document data (Steps S3402 to S3408). When relating unit 2105 relates each piece of the document data to the corresponding categorization items, categorization pattern selection unit 2106 calculates the evaluation value of each of the categorization patterns using expression "1" (Step S3409), and selects the categorization pattern that has the greatest evaluation value (Step S3410). Menu creation unit 2107 creates a retrieval menu that includes the categorization items in the selected categorization pattern as the choices (Step S3411). Display unit 2108 displays the retrieval menu (Step S3412).

3. Other Embodiments

The present invention has been explained according to the first and second embodiments. Hereinafter, the present invention will be explained according to other embodiments.

Figure 44:
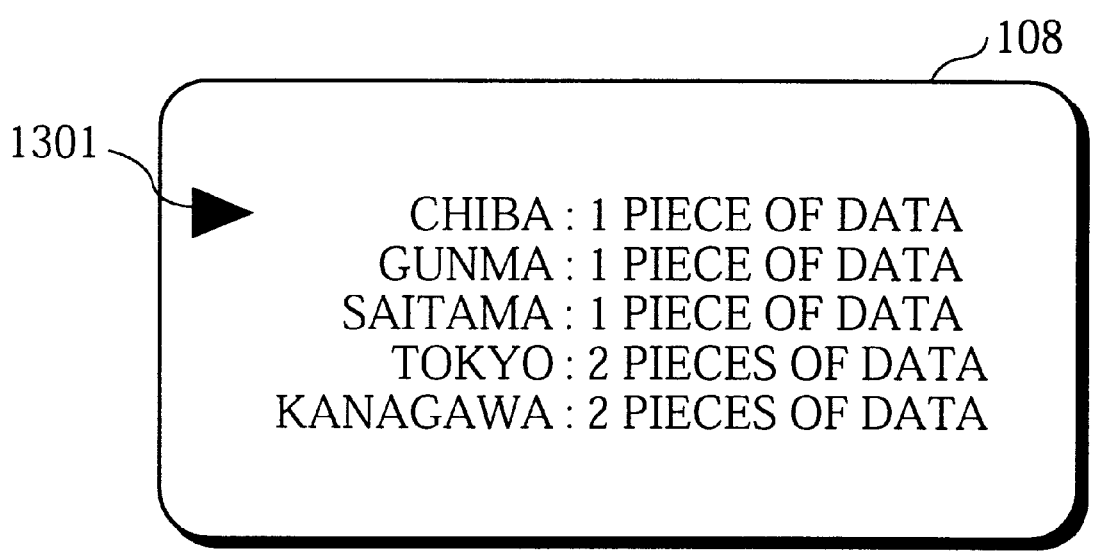
FIG. 44 shows a retrieval menu that the display unit of the retrieval menu creation device whose construction is shown in FIG. 28 displays.

(1) While the retrieval menu creation device displays the input data that is related to the item corresponding to the choice that the user selects from a retrieval menu in the first and second embodiments, when the number of pieces of the input data that is related to the item corresponding to the choice is large, another retrieval menu may be further created based on the input data that is related to the item corresponding to the choice. For instance, the user selects the choice "Kanto" in the retrieval menu shown in FIG. 21. The item "Kanto" corresponding to the choice "Kanto" includes the subitems "Tochigi", "Ibaragi", "Chiba", "Gunma", "Saitama", "Tokyo", "Yamanashi", and "Kanagawa" as shown in FIG. 19. Menu creation unit 107 may extract the five subitems "Chiba", "Gunma", "Saitama", "Tokyo", and "Kanagawa" to which the message board identification information is added from the subitems "Tochigi", "Ibaragi", "Chiba", "Gunma", "Saitama", "Tokyo", "Yamanashi", and "Kanagawa". Menu creation unit 107 may output the extracted five subitems and the number of pieces of the message board identification information that are added to each of the five subitems to display unit 108. Display unit 108 may display the extracted five subitems, the number of pieces of the message board identification information that are added to each of the five subitems, and cursor 1301 as shown in FIG. 44. When the user selects one subitem from the retrieval menu shown in FIG. 44, display unit 108 may display the message board information corresponding to the message board identification information that is added to the selected subitem.

(2) When the user selects one choice from a retrieval menu, the input data that has been related to the item corresponding to the selected choice may be related to the items included in other categorization patterns that has not been selected, and another retrieval menu may be created using one of the categorization patterns including the items to which the input data is newly related.

For instance, the user may select one of the choices from the first retrieval menu in which the choices correspond to the locations in the categorization pattern that has the items in a layer structure. The input data that has been related to the item corresponding to the selected choice may be related to the items included in other categorization patterns to which no selection mark has been added. One categorization pattern may be selected from the categorization patterns that include the items to which the input data is newly related in the same manner as has been described in the first embodiment, and the second retrieval menu may be created and may be displayed using the newly selected categorization pattern. As a result, even when the number of pieces of the input data is large, retrieval menus by which the user retrieves desired data easily may be created.

(3) Whether input data is displayed or another retrieval menu is further created may be determined for each or the categorization patterns according to the number of pieces of the input data that is related to the item corresponding to the selected choice.

For instance, when the number of pieces of the input data that is related to the items corresponding to the selected choice in a categorization pattern is equal to or smaller than a predetermined value, the related input data may be displayed, and when the number of pieces of the input data that is related to the items corresponding to the selected choice in the categorization pattern is larger than the predetermined value, another retrieval menu may be further created. As a result, the number of the choices that are displayed in a retrieval menu may be set to be closer to the predetermined value, and retrieval menus by which the user retrieves desired data easily may be created.

More specifically, in the retrieval menu creation device according to the first embodiment, input unit 109 may receive one choice that the user has selected from the choices in the retrieval menu. When input unit 109 receives the choice selected by the user, menu creation unit 107 may determine whether another retrieval menu in which the subitems that are included in the item corresponding to the selected choice should be further created, or the input data that is related to the item corresponding to the selected choice should be displayed according to a predetermined standard. When determining to further create another retrieval menu, menu creation unit 107 may extract at least one subitem to which at least one piece of input data is added from the item that corresponds to the selected choice, and may create another retrieval menu in which each of the extracted subitems represent the choices. When menu creation unit 107 determines to further create another retrieval menu, display unit 108 may display the retrieval menu in which each of the extracted subitems represent the choices. When menu creation unit 107 determines to display the input data, display unit 108 may read the input data that has been related to the item from data storage unit 101, and may display the read input data.

The predetermined standard represents the predetermined value that is used when menu creation unit 107 determines whether another retrieval menu should be further created or the input data should be displayed. When the number of pieces of the input data that is related to the items included in the selected categorization pattern is equal to or smaller than the predetermined value, the input data is displayed. When the number of pieces of the input data that is related to the items included in the selected categorization pattern is larger than the predetermined value, another retrieval menu is created.

When another retrieval menu is created, the input data that has been related to the item corresponding to the choice that the user has selected may be newly related to the items in other categorization patterns to which no selection mark, which indicates the selected categorization pattern, is added, and the second retrieval menu may be created using one of the categorization patterns including the items to which the input data is newly related.

More specifically, another retrieval menu may be created in the following manner. Input unit 109 receives the choice selected by the user. Relating unit 105 extracts the input data that has been related to the item corresponding to the selected choice as selected data, removes the feature identification information that have been added to the items in order to relate the selected data to the items, and relates the selected data to the corresponding items that are included in the categorization patterns other than the categorization pattern that includes the item corresponding to the selected choice. First categorization pattern selection unit 106 selects at least one categorization pattern from the categorization patterns other than the categorization pattern including the item corresponding to the selected choice according to the predetermined standard. Menu creation unit 107 creates another retrieval menu based on each of the selected categorization patterns. Display unit 108 displays the newly created retrieval menu. For instance, when the user selects the choice "Kanto" from the choices in the retrieval menu, the input data that has been related to the item "Kanto" may be related to the items that are included in the categorization patterns other than the one that is represented by the categorization pattern name "location", and on of the other categorization patterns, for instance, the categorization pattern that is represented by the categorization pattern name "price 2" may be selected. Another retrieval menu in which the items that are included in the categorization pattern represented by the categorization pattern name "price 2" represent the choices may be created and displayed.

(4) A categorization pattern may include items in a layer structure. For instance, in the first embodiment, much sublevel 2 items may belong to the subitems, and sublevel 3 items may belong to the sublevel 2 items. Relating unit 105 may relate input data to items that are included in the layer structure of categorization patterns. First categorization pattern selection unit 106 may select a categorization pattern using one of the items that has been related to the input data and are included in the layer structure of the categorization patterns. Menu creation unit 107 may create a retrieval menu using the selected categorization pattern.

Menu creation unit 107 may create a retrieval menu that includes the items included in the selected categorization pattern as the choices. Menu creation unit 107 may create another retrieval menu that is displayed when the user selects one of the choices in the first retrieval menu, and includes the subitems that belong to one of the items corresponding to the choices in the first retrieval menu. Menu creation unit 107 may create still another retrieval menu that is displayed when the user selects one of the choices in the second retrieval menu, and includes the sublevel 2 items that belong to one of the subitems corresponding to the choices in the second retrieval menu. The retrieval menus included in a layer structure may be created based on the items that are included in the layer structure of a categorization pattern.

When determining whether input data should be displayed or another retrieval menu should be further created according to the number of pieces of the related input data and when determining to create another retrieval menu, menu creation unit 107 may create another retrieval menu that is included in a layer structure. When determining to display input data, menu creation unit 107 may display the input data that has been related to the item corresponding to the selected choice and the input data that has been related to the items that belong to the corresponding item.

The items that are included in a categorization pattern may be included in the layer structure. Relating unit 105 may search for the item corresponding to a feature from categorization pattern storage unit 103 for each of the extracted features, and may relate the input data that includes the feature to the corresponding items. Input unit 109 may receive one of the choices in a retrieval menu from the user. The retrieval menu creation device may further include a judging unit, an item menu creation unit, an input data menu display unit, and a repetition control unit. When input unit 109 receives the choice from the user, the judging unit may determine to create another retrieval menu or to display input data according to a predetermined standard. When the judging unit determines to create another retrieval menu, the item menu creation unit may extract the items to which the input data is related from the items that belong to the item corresponding to the selected choice, and may create another retrieval menu that includes the extracted items as the choices. When the judging unit determines to create another retrieval menu, the input data menu display unit may display the newly created retrieval menu. When the judging unit determines to display input data, the input data menu display unit may read the input data that has been related to the item corresponding to the selected choice and the input data that has been related to the items belonging to the corresponding item from data storage unit 101, and may display the input data. The repetition control unit may control input unit 109, the judging unit, the item menu creation unit, and the input data menu display unit, so that the process in which input unit 109 receives a selected choice, the judging unit determines, the item menu creation unit creates a retrieval menu, and the input data menu display unit displays a retrieval menu may be repeated before the input data menu display unit displays the read input data.

The predetermined standard that is used when the judging unit determines whether another retrieval menu should be created of input data should be displayed may represent a predetermined value. When the number of pieces of the input data that has been related to the item corresponding to the selected choice and to the items that belong to the corresponding item is smaller than or equal to the predetermined value, the input data is displayed. When the number of pieces of the input data that has been related to the item corresponding to the selected choice and to the items that belong to the corresponding item is larger than the predetermined value, another retrieval menu is newly created.

(5) The retrieval menu creation device may further include a categorization pattern edit unit for enabling the user to register a new categorization pattern in and to remove a categorization pattern from categorization pattern storage unit 103.

When a new categorization pattern is registered in categorization pattern storage unit 103, input unit 109 accepts the input of the new categorization pattern from the user, and display unit 108 displays the newly input categorization pattern. Input unit 109 receives the instructions to register the new categorization pattern from the user, and the categorization pattern edit unit registers the newly input categorization pattern in categorization pattern storage unit 103.

When a categorization pattern is removed from categorization pattern storage unit 103, display unit 108 displays the categorization patterns stored in categorization pattern storage unit 103, and input unit 109 receives the designation of the categorization pattern to be removed from the user, and the instructions to remove the categorization pattern from the user. The categorization pattern edit unit removes the categorization pattern designated by the user from categorization pattern storage unit 103.

Each of the processes in which a categorization pattern is registered and removed is called "edit".

As a result, when a new categorization standard or a new technical term is used, a new categorization standard may be easily registered. A categorization pattern that is not used by the user may be removed from the categorization pattern storage unit, so that only the categorization patterns that are demanded by the user may be registered in the categorization pattern storage unit.

(6) The retrieval menu creation device may further include a synonym dictionary unit. When searching for the item corresponding to a feature that is included in input data, relating unit 105 may extract the synonyms for the feature from the synonym dictionary unit using the feature, and may find the item corresponding to one of the synonyms as the item corresponding to the feature.

In this manner, the item corresponding to a feature that is included in input data may be found using the synonyms for the feature. As a result, larger number of pieces of input data may be related to the items included in categorization patterns.

(7) When the user presses switch key 1404, the categorization pattern that has been displayed can represent the categorization pattern that is not demanded by the user. The lower priority ranking of the categorization pattern may be newly registered in priority ranking storage unit 104. More specifically, when the user presses switch key 1404, the value that is calculated by subtracting the value "1" from the original value may be registered as the value representing the new priority ranking of the categorization pattern in priority ranking storage unit 104.

As a result, a new priority ranking of a categorization pattern may be registered according to the user's demand for the categorization pattern.

(8) When the most suitable categorization pattern is determined, categorization patterns are evaluated first by the numbers of the related items and then by the priority rankings in the first embodiment. The categorization patterns may be evaluated by the priority rankings first and then by the numbers of the related items. Another evaluation standard may be created from these two evaluation standards for determining the most suitable categorization pattern.

The most suitable categorization pattern may be determined only using the priority rankings of the categorization patterns.

(9) While data feature extraction unit 102 extracts features from message board information and writes the features in data storage unit 101 in the first embodiment, the features may be extracted and written in the following manner.

Data storage unit 101 stores input data as a relational database. The relational data base represents a group of input data based on a table. The table includes at least one row and at least one column. One row includes at least one value list. One column represents a group of values of the same data type and includes at least one value. One value included in one column represents the smallest unit of input data and is selected from the table and may renew the table. The data type is a character string type or a numeric value type. The column that has the character string type represents a group of character strings. The column that has the numeric value type represents a group of numeric values.

Each of the rows corresponds to each piece of the message board information 260.

Relating unit 105 extracts at least one value from at least one value list that is included in one row that is stored in the relational data base in data storage unit 101, and sets each of the extracted values as a feature. As a result, data feature extraction unit 102 may not be included in the retrieval menu creation device.

Purchase/sale distinguishment 262, address 263, provider's name 264, age 265, and occupation 266 in message board information 260 correspond to the columns.

(10) Message board information 260 is related to item 711 that is included in categorization pattern 701 based on message board information 260 in the first embodiment. Message board information 260 may be related to item 711 based on item 711 that is included in categorization pattern 701 in the following manner.

Relating unit 105 reads each of the items that are included in the categorization patterns one after another from categorization pattern storage unit 103, and reads each piece of the message board information from data storage unit 101. Relating unit 105 extracts at least one of the features that are included in a piece of message board information for each piece of the read message board information, and searches for the read item that corresponds to a feature for each of the extracted feature. When finding the read item that corresponds to an extracted feature, relating unit 105 relates the message board information that includes the extracted feature to the read item.

(11) The evaluation value of each of the categorization patterns is obtained using expression "1" that includes the three evaluation elements, that is, the number of pieces of the document data that has been related to the items, the number of the items to which the document data is related, and the variance of the number of pieces of the related document data for selecting the categorization pattern with the most highest evaluation value in the second embodiment. The evaluation value of each of the categorization patterns may be obtained using an evaluation expression that includes only one of the number of pieces of the document data that has been related to the items, the number of the items to which the document data is related, and the variance of the number of pieces of the related document data for selecting the categorization pattern with the most highest evaluation value. The evaluation value of each of the categorization patterns may be obtained using an evaluation expression that includes two of the number of pieces of the document data that has been related to the items, the number of the items to which the document data is related, and the variance of the number of pieces of the related document data for selecting the categorization pattern with the most highest evaluation value.

(12) The user selects one of the items in the retrieval menu in the first embodiment. The user may select more than one of the items. In this case, input unit 109 further includes a multi-designation key. When display unit 108 displays a retrieval menu and when the user presses the multi-designation key, display unit 108 displays the item that cursor 1301 indicates in inverse video. The item that is displayed in inverse video shows that the item is selected by the user. While the selected item is displayed in inverse video, the user moves cursor 1301 up or down using up-cursor key 1401 or down-cursor key 1402 so that cursor 1301 indicates another item in the retrieval menu.

When cursor 1301 indicates another item and the user presses the multi-designation key, display unit 108 displays the selected item and the item that cursor 1301 newly indicates in inverse video. As a result, more than one of the items are selected by the user. When execution key 1403 is pressed by the user, display unit 108 reads the input data that is related to the selected items from data storage unit 101, and displays the read input data.

When the user selects more than one items, another retrieval menu may be created and displayed using the input data that is related to the selected items as described in embodiments (1) and (2).

The user may also select more than one of the items in the second embodiment.

(13) First categorization pattern selection unit 106 and second categorization pattern selection unit 110 select one categorization pattern in the first embodiment. First categorization pattern selection unit 106 or second categorization pattern selection unit 110 may select more than one categorization patterns. For instance, first categorization pattern selection unit 106 may count the number of the items to which input data is related for each of the categorization patterns, and may select more than one categorization patterns in which the number of the items to which input data is related is closest to the most suitable number of choices "6". When first categorization pattern selection unit 106 or second categorization pattern selection unit 110 selects more than one categorization patterns, menu creation unit 107 extracts the items to which input data is related from the selected categorization patterns, and creates a retrieval menu that includes the extracted items as the choices.

Categorization pattern selection unit 2106 may also select more than one categorization patterns in the second embodiment.

(14) As one embodiment of the present invention, a program that realizes the processes that have been explained in these embodiments may be recorded in a recording medium that a computer may read, for instance, a floppy disk, and may be transmitted via a communication line. As a result, these processes may be easily realized in another computer system.

Although the present invention has been fully described by way of examples with reference to the accompanying drawings, it is to be noted that various changes and modifications will be apparent to those skilled in the art. Therefore, unless such changes and modifications depart from the scope of the present invention, they should bey construed as being included therein.

What is claimed is:

1. A retrieval menu creation device that creates retrieval menus based on a plurality of pieces of input data comprising:

a reception means for receiving a plurality of pieces of input data;

a data storage means for storing the plurality of pieces of input data;

a writing means for writing the received plurality of pieces of input data into the data storage means;

a categorization pattern storage means for storing a plurality of categorization patterns each of which includes a plurality of items a relating means for relating pieces of input data that are stored in the storage means to corresponding items in the categorization patterns;

a categorization pattern selection means for selecting categorization patterns from the plurality of categorization patterns that are stored in the categorization pattern storage means based on a distribution of the input data related to the plurality of categorization patterns;

a menu extraction means for extracting items to which pieces of input data are related from the selected categorization patterns, and for creating a retrieval menu which includes the extracted items as choices; and a display means for displaying the retrieval menu that is created by the menu extraction means.

2. The retrieval menu creation device according to claim 1 wherein:

the data storage means stores pieces of data identification data for identifying the plurality of pieces of input data, the input data represents document data and the relating means includes:
  a feature extraction unit including a data reading element for reading the plurality of pieces of document data from the data storage means, and for extracting features from the read pieces of document data;
  a morphological analysis element for performing a morphological analysis on the read pieces of document data, and for dividing the read pieces of document data into morphemes; and
  an important word extraction element for extracting important words from the morphemes, and for setting the extracted important words as features;
  an item retrieval unit for retrieving items that correspond to extracted features from the categorization pattern storage means; and
  a data relating unit for adding data identification data for read pieces of document data to the retrieved items.

3. The retrieval menu creation device according to claim 2 wherein the important word extraction element includes:
  an important word candidate extraction element for extracting important word candidates from the morphemes;
  a frequency-in-use count element for counting frequency-in-use of each of the extracted important word candidates in a piece of document data; and
  a predetermined frequency extraction element for extracting each important word candidate whose frequency-in-use in a piece of document data is greater than a predetermined value from the extracted important word candidates as an important word, and for setting the extracted important words as features.

4. The retrieval menu creation device according to claim 2 wherein the important word extraction element includes:
  an important word candidate extraction element for extracting important word candidates from the morphemes;
  a frequency-in-use count element for counting frequency-in-use of each of the extracted important word candidates in a piece of document data; and
  a predetermined number extraction element for extracting a first predetermined number of important word candidates as important words from the extracted important word candidates in order of decreasing frequency-in-use in a piece of document data, and for setting the important words as features.

5. The retrieval menu creation device according to claim 1 wherein:

the data storage means stores pieces of data identification data as a relational database for identifying the plurality of pieces of input data wherein one of the plurality of pieces of input data represents one row in the relational database and includes at least one value list;

the relating means includes:
  a feature extraction unit for reading the plurality of pieces of input data from the data storage means, and for extracting features from the read pieces of input data;
  an item retrieval unit for retrieving items that correspond to extracted features from the categorization pattern storage means; and
  a data relating unit for adding data identification data for read pieces of input data to the retrieved items.

6. The retrieval menu creation device according to claim 1 wherein:

the data storage means stores pieces of data identification data for identifying the plurality of pieces of input data; and the relating means includes:
  a feature extraction unit for reading the plurality of pieces of input data from the data storage means, and for extracting features from the read pieces of input data;
  an item retrieval unit for retrieving items that correspond to extracted features from the categorization pattern storage means; and
  a data relating unit for adding data identification data for read pieces of input data to the retrieved items to relate the read piece of input data that includes the extracted features to the retrieved items; and
  the categorization pattern storage means includes the plurality of items included in a categorization pattern in a hierarchy.

7. The retrieval menu creation device according to claim 6 further comprising:

an input reception means for receiving choices that have been selected by a user from the choices in the retrieval menu;

a judging means for judging, when the input reception means receives the selected choices, whether another retrieval menu should be created or whether input data should be displayed based on a second predetermined standard;

an item menu creation means for extracting, when the judging means judges that another retrieval menu should be created, items to which input data has been related from items below items corresponding to the selected choices in the hierarchy, and for creating another retrieval menu in which the extracted items represent choices;

an input data menu display means for displaying, when the judging means judges that another retrieval menu should be created, the created other retrieval menu, and for reading, when the judging means judges that input data should be displayed, input data that has been related to any of the items corresponding to the selected choices and the items below the corresponding item in the hierarchy from the data storage means, and for displaying the read input data; and a repetition control means for controlling the input reception means, the judging means, the item menu creation means, and the input data menu display means so that a process in which the input reception means receives choices, the judging means judges, the item menu creation means creates another retrieval menu, and the input data menu display means displays the created other retrieval menu should be repeated until the input data menu display means displays the read input data.

8. The retrieval menu creation device according to claim 7 wherein the second predetermined standard used by the judging means represents a standard by which, when a number of pieces of the input data that have been related to any of the items corresponding to the selected choices and the items below the corresponding items in the hierarchy is smaller than or equal to a predetermined value, the input data is displayed, while when the number of pieces of the input data that have been related to any of the items corresponding to the selected choices and the items below the corresponding items in the hierarchy is larger than the predetermined value, another retrieval menu is created.

9. The retrieval menu creation device according to claim 1 wherein the categorization pattern selection means includes:
   an item number count unit for counting a number of items related to input data for each of the plurality of categorization patterns; and
   an items number selection unit for selecting categorization patterns in which the number of items related to input data is close to a second predetermined number.

10. The retrieval menu creation device according to claim 9 further comprising:
    a priority ranking storage means for storing a priority ranking for each of the plurality of categorization patterns; and
    a priority ranking selection means for reading, when the item number selection unit selects more than once categorization pattern, a priority ranking for each of the selected categorization patterns, and for selecting categorization patterns using the read priority rankings.

11. The retrieval menu creation device that creates retrieval menus based on a plurality of pieces of input data comprising:
    a reception means for receiving a plurality of pieces of input data;
    a data storage means for storing the plurality of pieces of input data;
    a writing means for writing the received plurality of pieces of input data into the data storage means;
    a categorization pattern storage means for storing a plurality of categorization patterns each of which includes a plurality of items
    a relating means for relating pieces of input data that are stored in the data storage means to corresponding items in the categorization patterns;
    a categorization pattern selection means for selecting categorization patterns from the plurality of categorization patterns that are stored in the categorization pattern storage means based on a distribution of the input data related to the plurality of categorization patterns, wherein in the categorization pattern selection means includes:
       an input data type number count unit for counting a number of types of input data that have been related to items for each of the plurality of categorization patterns; and
       an input data type number selection unit for selecting categorization patterns in which a largest number of types of input data have been related to items; and
    a menu extraction means for extracting items to which pieces of input data are related from the selected categorization patterns, and for creating a retrieval menu which includes the extracted items as choices; and
    a display means for displaying the retrieval menu that is created by the menu extraction means.

12. The retrieval menu creation device according to claim 11 further comprising:
    a priority ranking storage means for storing a priority ranking for each of the plurality of categorization patterns; and
    a priority ranking selection means for reading, when the input data type number selection unit selects more than one categorization pattern, a priority ranking for each of the selected categorization patterns, and for selecting categorization patterns using the read priority rankings.

13. The retrieval menu creation device according to claim 1 wherein the categorization pattern selection means includes:
    a variance calculation unit for calculating a variance in a number of pieces of input data that are related to each item in a categorization pattern, for each categorization pattern; and
    a variance selection unit for selecting categorization patterns that have the smallest calculated variance of the number of pieces of the input data that has been related to items.

14. The retrieval menu creation device according to claim 13 further comprising:
    a priority ranking storage means for storing a priority ranking for each of the plurality of categorization patterns; and
    a priority ranking selection means for reading, when the variance selection unit selects more than one categorization pattern, a priority ranking for each of the selected categorization patterns, and for selecting categorization patterns using the read priority rankings.

15. The retrieval menu creation device according to claim 1 wherein the categorization pattern selection means includes:
    a priority ranking unit for storing a priority ranking for each of the plurality of categorization patterns; and
    a priority ranking selection unit for reading a priority ranking for each of the plurality of categorization patterns, and for selecting categorization patterns using the read priority rankings.

16. The retrieval menu creation device according to claim 1 further comprising:
    a switch reception means for receiving a user indication switch from a retrieval menu that is displayed on the display means to another retrieval menu; and
    a second categorization pattern selection means for selecting, when the switch reception means receives the user indication to switch from a retrieval menu that is displayed on the display means to another retrieval menu, categorization patterns from categorization patterns apart from the categorization patterns that were selected by the categorization pattern selection means, based on the first predetermined standard that was used by the categorization pattern selection means, wherein
    the menu extraction means creates another retrieval menu from the categorization patterns that have been selected by the second categorization pattern selection means.

17. The retrieval menu creation device according to claim 1 further comprising:
    an input reception means for receiving choices that have been selected by a user from the choices in the retrieval menu, wherein
    the relating unit further includes:

a selection input data extraction means for extracting each piece of input data that has been related to items corresponding to the selected choices as selection data;

a relation cancel means for canceling relations between each extracted piece of input data and items; and a selection input data relating means for relating the selection data to items included in categorization patterns apart from categorization patterns that include the item corresponding to the selected choice, wherein the categorization pattern selection means selects categorization patterns that include items to which the selection data was related by the selection input data relating means, based on the first predetermined standard, wherein the menu extraction means creates another retrieval menu from the selected categorization patterns, and wherein the display means displays the other retrieval menu that has been created by the menu extraction means.

18. The retrieval menu creation device according to claim 1 further comprising:

a categorization pattern input reception means for receiving a categorization pattern and instructions to edit the categorization pattern from the user, wherein instructions to edit a categorization pattern include instructions to register the categorization pattern and instructions to delete the categorization pattern; and a categorization pattern editing means for editing the plurality of categorization patterns that are stored in the categorization pattern storage means based on the categorization pattern and the instructions to edit the categorization pattern that have been received by the categorization pattern input reception means.

19. A retrieval menu creation method that is used by a retrieval menu creation device which comprises a data storage means for storing a plurality of pieces of input data, and a categorization pattern storage means for storing a plurality of categorization pattern which each include a plurality of items, wherein no item that is included in a categorization pattern is related to any item that is included in another categorization pattern, and creates retrieval menus based on the plurality of pieces of input data the method comprising:

a receiving step for receiving a plurality of pieces of input data;

a relating step for relating pieces of input data that are stored in the data storage mans to corresponding items;

a writing step for writing the received plurality of pieces of input data into the data storage means;

a categorization pattern selection step for selecting categorization patterns from the plurality of categorization patterns that are stored in the categorization pattern storage means based on a distribution of the input data related to the plurality of categorization patterns;

a menu extraction step for extracting items to which pieces of input data are related from the selected categorization patterns, and for creating a retrieval menu which includes the extracted items as choices; and a display step for displaying the retrieval menu that is created by the menu extraction step.

20. The retrieval menu creation method according to claim 19 wherein the data storage means stores pieces of data identification data for identifying the plurality of pieces of input data; and the relating step includes:

a feature extraction step for reading the plurality of pieces of input data from the data storage means, and for extracting features from the read pieces of input data;

an item retrieval step for retrieving items that correspond to extracted features from the categorization pattern storage means; and a data relating step for adding data identification data for read pieces of input data to the retrieved items, and wherein the plurality of pieces of input data stored in the data storage means represents a plurality of pieces of document data; and the feature extraction step includes:

a data step for reading the plurality of pieces of document data from the data storage means;

a morphological analysis step for performing a morphological analysis on the read pieces of document data, and for dividing the read pieces of document data into morphemes; and an important word extraction step for extracting important words from the morphemes, and for setting the extracted important words as features.

21. The retrieval menu creation method according to claim 20 wherein the important word extraction step includes:

an important word candidate extraction step for extracting important word candidates from the morphemes;

a frequency-in-use count step for counting frequency-in-use of each of the extracted important word candidates in a piece of document data; and a predetermined frequency extraction step for extracting each important word candidate whose frequency-in-use in a piece of document data is greater than a predetermined value from the extracted important word candidates as an important word, and for setting the extracted important words as features.

22. The retrieval menu creation method according to claim 20 wherein the important word extraction step includes:

an important word candidate extraction step for extracting important word candidates from the morphemes;

a frequency-in-use count step for counting frequency-in-use of each of the extracted important word candidates in a piece of document data; and a predetermined number extraction step for extracting a first predetermined number of important word candidates as important words from the extracted important word candidates in order of decreasing frequency-in-use in a piece of document data, and for setting the important words as features.

23. The retrieval menu creation method according to claim 19, the data storage means stores the plurality of pieces of input data as a relational database, with one of the plurality of pieces of input data represents one row in the relational database and includes at least one value list; and the relating step includes:

a feature extraction step for reading the plurality of pieces of input data from the data storage means, and for extracting features from the read pieces of input data;

an item retrieval step for retrieving items that correspond to extracted features from the categorization pattern storage means; and a data relating step for adding data identification data for read pieces of input data to the retrieved items, and wherein the feature extraction step includes:

a data reading step for reading the plurality of pieces of input data from the data storage means; and a data extraction for extracting values from the read piece of input data as features.

24. The retrieval menu creation method according to claim 19 wherein the categorization pattern storage means includes the plurality of items included in a categorization pattern in a hierarchy, wherein the relating step includes:

a feature extraction step for reading the plurality of pieces of input data from the data storage means, and for extracting features from the read pieces of input data;

an item retrieval step for retrieving items that corresponding to extracted features from the categorization pattern storage means; and a data relating step for adding data identification data for read pieces of input data to the retrieved items, and wherein the relating step further includes an item retrieval step for retrieving the items that correspond to the features from the categorization pattern storage means, and the data relating step relates the read piece of input data that includes the extracted features to the retrieved items.

25. The retrieval menu creation method according to claim 24 further comprising:

an input reception step for receiving choices that have been selected by a user from the choices in the retrieval menu;

a judging step for judging, when the input reception step receives the selected choices, whether another retrieval menu should be created or whether input data should be displayed based on a second predetermined standard;

an item menu creation step for extracting, when the judging step judges that another retrieval menu should be created, items to which input data has been related from items below items corresponding to the selected choices in the hierarchy, and for creating another retrieval menu in which the extracted items represent choices;

an input data menu display step for displaying, when the judging step judges that another retrieval menu should be created, the created other retrieval menu, and for reading, when the judging step judges that input data should be displayed, input data that has been related to any of the items corresponding to the selected choices and the items below the corresponding item in the hierarchy from the data storage means, and for displaying the read input data; and a repetition control step for controlling the input reception step, the judging step, the item menu creation step, and the input data menu display step so that a process in which the input reception step receives choices, the judging step judges, the item menu creation step creates another retrieval menu, and the input data menu display step displays the created other retrieval menu should be repeated until the input data menu display step displays the read input data.

26. The retrieval menu creation method according to claim 25 wherein the second predetermined standard used by the judging step represents a standard by which, when a number of pieces of the input data that have been related to any of the items corresponding to the selected choices and the items below the corresponding items in the hierarchy is smaller than or equal to a predetermined value, the input data is displayed, while when the number of pieces of the input data that have been related to any of the items corresponding to the selected choices and the items below the corresponding items in the hierarchy is larger than the predetermined value, another retrieval menu is created.

27. The retrieval menu creation method according to claim 19 wherein the categorization pattern selection step includes:

an item number count step for counting a number of items related to input data for each of the plurality of categorization patterns; and an item number selection step for selecting categorization patterns in which the number of items related to input data is close to a second predetermined number.

28. The retrieval menu creation method according to claim 27 wherein the retrieval menu creation device further comprises a priority ranking storage means for storing a priority ranking for each of the plurality of categorization patterns; and the method further comprises a priority ranking selection step for reading, when the item number selection step selects more than one categorization pattern, a priority ranking for each of the selected categorization patterns, and for selecting categorization patterns using the read priority rankings.

29. The retrieval menu creation method according to claim 19 wherein the retrieval menu creation device further comprises a priority ranking storage means for storing a priority ranking for each of the plurality of categorization patterns; and the method further comprises a priority ranking selection step for reading a priority ranking for each of the plurality of categorization patterns, and for selecting categorization patterns using the read priority rankings.

30. The retrieval menu creation method according to claim 19 further comprising:

an input reception step for receiving choices that have been selected by a user from the choices in the retrieval menu, wherein the relating step further includes:

a selection input data extraction step for extracting each piece of input data that has been related to items corresponding to the selected choices as selection data;

a relation cancel step for canceling relations between each extracted piece of input data and items; and a selection input data relating step for relating the selection data to items included in categorization patterns apart from categorization patterns that include the item corresponding to the selected choice, wherein the categorization pattern selection step selects categorization patterns that include items to which the selection data was related by the selection input data relating step, based on the first predetermined standard, wherein the menu extraction step creates another retrieval menu from the selected categorization patterns, and wherein the display step displays the other retrieval menu that has been created by the menu extraction step.

31. A computer-readable storage medium for use by a computer which comprises a data storage means for storing a plurality of pieces of input data and a categorization pattern storage means for storing a plurality of categorization patterns which each include a plurality of items, wherein no item that is included in a categorization pattern is related to any item that is included in another categorization pattern, the storage medium storing a program in which retrieval menus are created based on the plurality of pieces of input data, the storage medium comprising:

a relating step for relating pieces of input data that are stored in the data storage means to corresponding items;

a categorization pattern selection step for selecting categorization patterns from the plurality of categorization patterns that are stored in the categorization pattern storage means based on a distribution of the input data related to the plurality of categorization patterns; and a menu extraction step for extracting items to which pieces of input data are related from the selected categorization patterns, and for creating a retrieval menu which includes the extracted items as choices.

32. A retrieval menu creation device that creates retrieval menus based on a plurality of pieces of input data comprising:

a reception means for receiving a plurality of pieces of input data;

a data storage means for storing the plurality of pieces of input data;

a writing means for writing the received plurality of pieces of input data into the data storage means;

a categorization pattern storage means for storing a plurality of categorization patterns each of which includes a plurality of items, wherein each item included in each one of the plurality of categorization patterns is exclusive to that categorization pattern;

a relating means for relating pieces of input data with items in the plurality of categorization patterns;

a categorization pattern selection means for selecting categorization patterns from the plurality of categorization patterns that are stored in the categorization pattern storage means based on a distribution of the input data related to the plurality of categorization patterns;

a menu extraction means for extracting items to which pieces of input data are related from the selected categorization patterns, and for creating a retrieval menu which includes the extracted items as choices in the retrieval menu; and a display means enabling a display of the retrieval menu that is created by the menu extraction means.

33. A method of creating retrieval menus based on input data, comprising the steps of:

receiving a plurality of pieces of input data;

storing the plurality of pieces of input data;

storing a plurality of categorization patterns each of which includes a plurality of items that are exclusive to at least one of the plurality of categorization patterns;

relating pieces of input data with items in the plurality of categorization patterns;

selecting categorization patterns from the plurality of categorization patterns that are stored based on a distribution of the input data related to the plurality of categorization patterns;

creating a retrieval menu by extracting items which relate to the piece of input data determined with the categorization patterns, the retrieval menu includes the extracted items as choices in the retrieval menu; and displaying the retrieval menu.

34. A machine readable medium for storing executable data instructions that can create retrieval menus based on a plurality of pieces of input data, comprising:

writing data for writing the plurality of pieces of input data into a data storage memory;

a plurality of categorization pattern data, each categorization pattern includes a plurality of items, wherein no item that is included in each one of the categorization patterns is related to any item that is included in another categorization pattern;

relating data for relating pieces of input data that are stored in the storage memory to corresponding items in the categorization patterns;

a categorization pattern selection data for selecting categorization patterns from the plurality of categorization patterns based on a distribution of the input data related to the plurality of categorization patterns;

a menu extraction data for extracting items to which pieces of input data are related from the selected categorization patterns, and for creating a retrieval menu which includes the extracted items as choices; and a display data for enabling the displaying of the retrieval menu that is created by the menu extraction data.

* * * * *